United States Patent
Abotabl et al.

(10) Patent No.: US 12,532,361 B2
(45) Date of Patent: Jan. 20, 2026

(54) CELL DISCONTINUOUS TRANSMISSION-BASED RANDOM ACCESS RESPONSE WINDOW CONFIGURATION

(71) Applicant: QUALCOMM Incorporated, San Diego, CA (US)

(72) Inventors: Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 18/183,290

(22) Filed: Mar. 14, 2023

(65) Prior Publication Data

US 2024/0314844 A1    Sep. 19, 2024

(51) Int. Cl.
*H04W 74/08* (2024.01)
*H04W 74/00* (2009.01)
*H04W 74/0833* (2024.01)
*H04W 76/28* (2018.01)

(52) U.S. Cl.
CPC ..... *H04W 74/0833* (2013.01); *H04W 74/002* (2013.01); *H04W 76/28* (2018.02)

(58) Field of Classification Search
CPC ........... H04W 74/0833; H04W 74/002; H04W 76/28; H04W 72/0446; H04W 52/16; H04W 52/325; H04L 5/0092; H04L 1/1642; H04L 5/009

See application file for complete search history.

(56) References Cited

U.S. PATENT DOCUMENTS

| 9,729,295 | B2 * | 8/2017 | Zhang | H04L 1/1861 |
| 2016/0219557 | A1 * | 7/2016 | He | H04L 5/0091 |
| 2017/0332288 | A1 | 11/2017 | Sadek et al. | |
| 2020/0214049 | A1 | 7/2020 | Deenoo et al. | |
| 2021/0045105 | A1 * | 2/2021 | Yoon | H04W 72/21 |

(Continued)

OTHER PUBLICATIONS

Huawei: "New SI: Study on Network Energy Savings for NR," 3GPP Draft, 3GPP TSG RAN Meeting #94e, RP-213554 (revision of RP-212709), Electronic Meeting, Dec. 6-17, 2021, 16 Pages.

(Continued)

*Primary Examiner* — Wei Zhao
(74) *Attorney, Agent, or Firm* — Holland & Hart LLP / QUALCOMM Incorporated

(57) ABSTRACT

Methods, systems, and devices for wireless communications are described. A user equipment (UE) and a network entity may communicate according to a discontinuous transmission (DTX) cycle that includes an active duration and an inactive duration. The network entity may indicate timing information for one or more random access response (RAR) windows associated with a random access channel (RACH) message that triggers a RAR message. A RAR window may be misaligned with the active duration of the DTX cycle based on the timing information. Based on the misalignment, the UE and the network entity may communicate a RAR message during the RAR window in accordance with an alignment rule to align at least one boundary of the RAR window with at least one boundary of the active duration. Alternatively, the UE and the network entity may refrain from communicating the RAR message during the RAR window based on the misalignment.

49 Claims, 33 Drawing Sheets

(56) References Cited

U.S. PATENT DOCUMENTS

2021/0105585 A1\*  4/2021  Shrivastava ......... H04W 48/12
2022/0141869 A1   5/2022  Jeon et al.

OTHER PUBLICATIONS

International Search Report and Written Opinion—PCT/US2024/019403—ISA/EPO—Jun. 18, 2024.
GSMA Intelligence; 5G Energy Efficiencies, Green is the New Black; Nov. 2020, 26 pgs; Hatt, et al.
Energy Efficiency Concerns and Trends in Future 5G Network Infrastructures; Aug. 30, 2021, 14 pgs.; Chochliouros et al.

\* cited by examiner

CELL DISCONTINUOUS TRANSMISSION-BASED RANDOM ACCESS RESPONSE WINDOW CONFIGURATION

INTRODUCTION

The following relates to wireless communications, including managing random access response (RAR) window configurations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a UE is described. The method may include receiving a first control message that indicates one or more parameters for a discontinuous transmission (DTX) cycle associated with a serving cell, the DTX cycle including an active duration of the serving cell and an inactive duration of the serving cell. The method may also include receiving a second control message that indicates timing information for a RAR window associated with transmission of a random access channel (RACH) message that triggers a RAR message. The method may also include receiving the RAR message during the RAR window in accordance with an alignment rule to align at least one boundary of the RAR window with at least one boundary of the active duration.

An apparatus for wireless communication at a UE is described. The apparatus may include a processor and memory coupled with the processor. The processor may be configured to receive a first control message that indicates one or more parameters for a DTX cycle associated with a serving cell, the DTX cycle including an active duration of the serving cell and an inactive duration of the serving cell. The processor may also be configured to receive a second control message that indicates timing information for a RAR window associated with transmission of a RACH message that triggers a RAR message. The processor may also be configured to receive the RAR message during the RAR window in accordance with an alignment rule to align at least one boundary of the RAR window with at least one boundary of the active duration.

Another apparatus for wireless communication at a UE is described. The apparatus may include means for receiving a first control message that indicates one or more parameters for a DTX cycle associated with a serving cell, the DTX cycle including an active duration of the serving cell and an inactive duration of the serving cell. The apparatus may also include means for receiving a second control message that indicates timing information for a RAR window associated with transmission of a RACH message that triggers a RAR message. The apparatus may also include means for receiving the RAR message during the RAR window in accordance with an alignment rule to align at least one boundary of the RAR window with at least one boundary of the active duration.

A non-transitory computer-readable medium storing code for wireless communication at a UE is described. The code may include instructions executable by a processor to receive a first control message that indicates one or more parameters for a DTX cycle associated with a serving cell, the DTX cycle including an active duration of the serving cell and an inactive duration of the serving cell. The instructions may also be executable by the processor to receive a second control message that indicates timing information for a RAR window associated with transmission of a RACH message that triggers a RAR message. The instructions may also be executable by the processor to receive the RAR message during the RAR window in accordance with an alignment rule to align at least one boundary of the RAR window with at least one boundary of the active duration.

Some examples of the method, apparatuses, and non-transitory computer-readable medium described herein may further include operations, features, means, or instructions for transmitting the RACH message that triggers the RAR message, the at least one boundary of the RAR window being misaligned with the at least one boundary of the active duration based on a time of the transmission of the RACH message.

In some examples of the method, apparatuses, and non-transitory computer-readable medium described herein, the RAR window, the active duration, or a combination thereof, may be adjusted in accordance with the alignment rule based on the misalignment.

In some examples of the method, apparatuses, and non-transitory computer-readable medium described herein, adjusting, in accordance with the alignment rule, the RAR window to align a start boundary of the RAR window with a start boundary of the active duration based on, prior to the adjustment, the start boundary of the RAR window being before the start boundary of the active duration.

In some examples of the method, apparatuses, and non-transitory computer-readable medium described herein, delaying, in accordance with the alignment rule, the RAR window to align a start boundary of the RAR window with a start boundary of the active duration based on, prior to the delay, the start boundary of the RAR window being before the start boundary of the active duration.

Some examples of the method, apparatuses, and non-transitory computer-readable medium described herein may further include operations, features, means, or instructions for applying, in accordance with the alignment rule, a time offset to the RAR window to align a start boundary of the RAR window with a start boundary of the active duration based on the start boundary of the RAR window being before the start boundary of the active duration prior to the application of the time offset.

In some examples of the method, apparatuses, and non-transitory computer-readable medium described herein, truncating, in accordance with the alignment rule, the RAR window to align a start boundary of the RAR window with a start boundary of the active duration based on the start boundary of the RAR window being before the start boundary of the active duration prior to the truncation.

In some examples of the method, apparatuses, and non-transitory computer-readable medium described herein, truncating, in accordance with the alignment rule, the RAR window to align an end boundary of the RAR window with an end boundary of the active duration based on the end boundary of the RAR window being after the end boundary of the active duration prior to the truncation.

In some examples of the method, apparatuses, and non-transitory computer-readable medium described herein, the active duration may be extended to at least an end boundary of the RAR window in accordance with the alignment rule based on the end boundary of the RAR window being after an end boundary of the active duration prior to the extension of the active duration.

In some examples of the method, apparatuses, and non-transitory computer-readable medium described herein, adjusting, in accordance with the alignment rule, the end boundary of the RAR window to align with the end boundary of the active duration based on the extension of the active duration.

In some examples of the method, apparatuses, and non-transitory computer-readable medium described herein, a portion of the active duration that was extended may be specific to communication of the RAR message and excludes communication of other messages.

Some examples of the method, apparatuses, and non-transitory computer-readable medium described herein may further include operations, features, means, or instructions for receiving a downlink message during a portion of the active duration that was extended.

A method for wireless communication at a UE is described. The method may include receiving a first control message that indicates one or more parameters for a DTX cycle associated with a serving cell, the DTX cycle including an active duration of the serving cell and an inactive duration of the serving cell. The method may also include receiving a second control message that indicates timing information for one or more RAR windows associated with transmission of a RACH message that triggers a RAR message. The method may also include refraining from receiving the RAR message in a first RAR window of the one or more RAR windows in accordance with a rule based on the active duration and at least the first RAR window being misaligned.

An apparatus for wireless communication at a UE is described. The apparatus may include a processor and memory coupled with the processor. The processor may be configured to receive a first control message that indicates one or more parameters for a DTX cycle associated with a serving cell, the DTX cycle including an active duration of the serving cell and an inactive duration of the serving cell. The processor may also be configured to receive a second control message that indicates timing information for one or more RAR windows associated with transmission of a RACH message that triggers a RAR message. The processor may also be configured to refrain from receiving the RAR message in a first RAR window of the one or more RAR windows in accordance with a rule based on the active duration and at least the first RAR window being misaligned.

Another apparatus for wireless communication at a UE is described. The apparatus may include means for receiving a first control message that indicates one or more parameters for a DTX cycle associated with a serving cell, the DTX cycle including an active duration of the serving cell and an inactive duration of the serving cell. The apparatus may also include means for receiving a second control message that indicates timing information for one or more RAR windows associated with transmission of a RACH message that triggers a RAR message. The apparatus may also include means for refraining from receiving the RAR message in a first RAR window of the one or more RAR windows in accordance with a rule based on the active duration and at least the first RAR window being misaligned.

A non-transitory computer-readable medium storing code for wireless communication at a UE is described. The code may include instructions executable by a processor to receive a first control message that indicates one or more parameters for a DTX cycle associated with a serving cell, the DTX cycle including an active duration of the serving cell and an inactive duration of the serving cell. The instructions may also be executable by the processor to receive a second control message that indicates timing information for one or more RAR windows associated with transmission of a RACH message that triggers a RAR message. The instructions may also be executable by the processor to refrain from receiving the RAR message in a first RAR window of the one or more RAR windows in accordance with a rule based on the active duration and at least the first RAR window being misaligned.

Some examples of the method, apparatuses, and non-transitory computer-readable medium described herein may further include operations, features, means, or instructions for transmitting the RACH message during a first RACH occasion (RO), the first RAR window and the active duration being misaligned based on the timing information and a timing of the first RO and retransmitting the RACH message during a second RO based on the refraining.

Some examples of the method, apparatuses, and non-transitory computer-readable medium described herein may further include operations, features, means, or instructions for receiving the RAR message in a second RAR window of the one or more RAR windows in accordance with the rule based on the active duration and the second RAR window being aligned.

Some examples of the method, apparatuses, and non-transitory computer-readable medium described herein may further include operations, features, means, or instructions for refraining from transmitting the RACH message during a RO based on the active duration and the first RAR window corresponding to the RO being misaligned.

Some examples of the method, apparatuses, and non-transitory computer-readable medium described herein may further include operations, features, means, or instructions for transmitting the RACH message during a second RO based on the active duration and a second RAR window corresponding to the second RO being aligned and receiving the RAR message during the second RAR window.

In some examples of the method, apparatuses, and non-transitory computer-readable medium described herein, refraining from receiving the RAR message based on the active duration and at least the first RAR window being misaligned may include operations, features, means, or instructions for refraining from receiving the RAR message based on a start boundary of the first RAR window being before a start boundary of the active duration.

A method for wireless communication at a network entity is described. The method may include outputting a first control message that indicates one or more parameters for a DTX cycle associated with a serving cell, the DTX cycle including an active duration of the serving cell and an inactive duration of the serving cell. The method may also include outputting a second control message that indicates timing information for a RAR window associated with reception of a RACH message that triggers a RAR message. The method may also include outputting the RAR message during the RAR window in accordance with an alignment rule to align at least one boundary of the RAR window with at least one boundary of the active duration.

An apparatus for wireless communication at a network entity is described. The apparatus may include a processor and memory coupled with the processor. The processor may be configured to output a first control message that indicates one or more parameters for a DTX cycle associated with a serving cell, the DTX cycle including an active duration of the serving cell and an inactive duration of the serving cell. The processor may also be configured to output a second control message that indicates timing information for a RAR window associated with reception of a RACH message that triggers a RAR message. The processor may also be configured to output the RAR message during the RAR window in accordance with an alignment rule to align at least one boundary of the RAR window with at least one boundary of the active duration.

Another apparatus for wireless communication at a network entity is described. The apparatus may include means for outputting a first control message that indicates one or more parameters for a DTX cycle associated with a serving cell, the DTX cycle including an active duration of the serving cell and an inactive duration of the serving cell. The apparatus may also include means for outputting a second control message that indicates timing information for a RAR window associated with reception of a RACH message that triggers a RAR message. The apparatus may also include means for outputting the RAR message during the RAR window in accordance with an alignment rule to align at least one boundary of the RAR window with at least one boundary of the active duration.

A non-transitory computer-readable medium storing code for wireless communication at a network entity is described. The code may include instructions executable by a processor to output a first control message that indicates one or more parameters for a DTX cycle associated with a serving cell, the DTX cycle including an active duration of the serving cell and an inactive duration of the serving cell. The instructions may also be executable by the processor to output a second control message that indicates timing information for a RAR window associated with reception of a RACH message that triggers a RAR message. The instructions may also be executable by the processor to output the RAR message during the RAR window in accordance with an alignment rule to align at least one boundary of the RAR window with at least one boundary of the active duration.

Some examples of the method, apparatuses, and non-transitory computer-readable medium described herein may further include operations, features, means, or instructions for receiving the RACH message that triggers the RAR message, the at least one boundary of the RAR window being misaligned with the at least one boundary of the active duration based on a time of the transmission of the RACH message.

In some examples of the method, apparatuses, and non-transitory computer-readable medium described herein, the RAR window, the active duration, or a combination thereof, may be adjusted in accordance with the alignment rule based on the misalignment.

Some examples of the method, apparatuses, and non-transitory computer-readable medium described herein may further include operations, features, means, or instructions for extending the active duration to at least an end boundary of the RAR window in accordance with the alignment rule based on the end boundary of the RAR window being after an end boundary of the active duration prior to the extension of the active duration.

Some examples of the method, apparatuses, and non-transitory computer-readable medium described herein may further include operations, features, means, or instructions for outputting a downlink message during a portion of the active duration that was extended.

In some examples of the method, apparatuses, and non-transitory computer-readable medium described herein, a portion of the active duration that was extended may be specific to communication of the RAR message and excludes communication of other messages.

In some examples of the method, apparatuses, and non-transitory computer-readable medium described herein, the end boundary of the RAR window response window may be adjusted to align with the end boundary of the active duration based on the extension of the active duration.

In some examples of the method, apparatuses, and non-transitory computer-readable medium described herein, the RAR window may be truncated to align an end boundary of the RAR window with an end boundary of the active duration based on the end boundary of the RAR window being after the end boundary of the active duration prior to the truncation.

In some examples of the method, apparatuses, and non-transitory computer-readable medium described herein, a time offset may be applied to the RAR window to align a start boundary of the RAR window with a start boundary of the active duration based on the start boundary of the RAR window being before the start boundary of the active duration prior to the application of the time offset.

In some examples of the method, apparatuses, and non-transitory computer-readable medium described herein, the RAR window may be truncated to align a start boundary of the RAR window with a start boundary of the active duration based on the start boundary of the RAR window being before the start boundary of the active duration prior to the truncation.

A method for wireless communication at a network entity is described. The method may include outputting a first control message that indicates one or more parameters for a DTX cycle associated with a serving cell, the DTX cycle including an active duration of the serving cell and an inactive duration of the serving cell. The method may also include outputting a second control message that indicates timing information for one or more RAR windows associated with transmission of a RACH message that triggers a RAR message. The method may also include refraining from outputting the RAR message in a first RAR window of the one or more RAR windows in accordance with a rule based on the active duration and at least the first RAR window being misaligned.

An apparatus for wireless communication at a network entity is described. The apparatus may include a processor and memory coupled with the processor. The processor may be configured to output a first control message that indicates one or more parameters for a DTX cycle associated with a serving cell, the DTX cycle including an active duration of the serving cell and an inactive duration of the serving cell. The processor may also be configured to output a second control message that indicates timing information for one or more RAR windows associated with transmission of a RACH message that triggers a RAR message. The processor may also be configured to refrain from outputting the RAR message in a first RAR window of the one or more RAR windows in accordance with a rule based on the active duration and at least the first RAR window being misaligned.

Another apparatus for wireless communication at a network entity is described. The apparatus may include means for outputting a first control message that indicates one or more parameters for a DTX cycle associated with a serving cell, the DTX cycle including an active duration of the serving cell and an inactive duration of the serving cell. The apparatus may also include means for outputting a second control message that indicates timing information for one or more RAR windows associated with transmission of a RACH message that triggers a RAR message. The apparatus may also include means for refraining from outputting the RAR message in a first RAR window of the one or more RAR windows in accordance with a rule based on the active duration and at least the first RAR window being misaligned.

A non-transitory computer-readable medium storing code for wireless communication at a network entity is described. The code may include instructions executable by a processor to output a first control message that indicates one or more parameters for a DTX cycle associated with a serving cell, the DTX cycle including an active duration of the serving cell and an inactive duration of the serving cell. The instructions may also be executable by the processor to output a second control message that indicates timing information for one or more RAR windows associated with transmission of a RACH message that triggers a RAR message. The instructions may also be executable by the processor to refrain from outputting the RAR message in a first RAR window of the one or more RAR windows in accordance with a rule based on the active duration and at least the first RAR window being misaligned.

Some examples of the method, apparatuses, and non-transitory computer-readable medium described herein may further include operations, features, means, or instructions for receiving the RACH message during a first RO, the first RAR window and the active duration being misaligned based on the timing information and a timing of the first RO and receiving a retransmission of the RACH message during a second RO based on the refraining.

Some examples of the method, apparatuses, and non-transitory computer-readable medium described herein may further include operations, features, means, or instructions for outputting the RAR message in a second RAR window of the one or more RAR windows in accordance with the rule based on the active duration and the second RAR window being aligned.

In some examples of the method, apparatuses, and non-transitory computer-readable medium described herein, refraining from outputting the RAR message based on the active duration and at least the first RAR window being misaligned may include operations, features, means, or instructions for refraining from outputting the RAR message based on a start boundary of the first RAR window being before a start boundary of the active duration.

DETAILED DESCRIPTION

Figure 1:
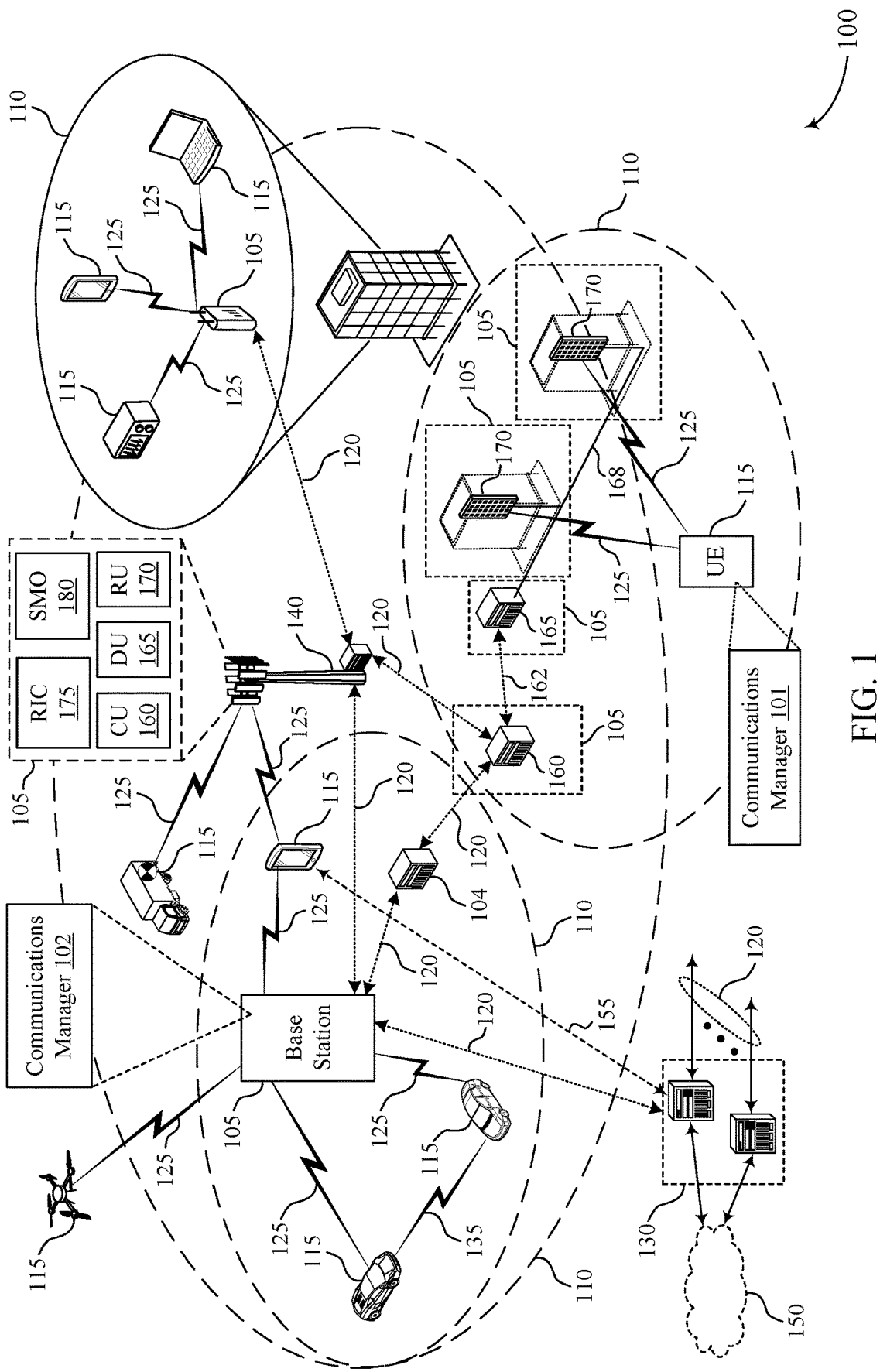
FIG. 1 illustrates an example of a wireless communications system that supports a cell DTX-based RAR window configuration in accordance with one or more aspects of the present disclosure.

In some wireless communications systems, a network entity may operate (e.g., communicate) according to a DTX cycle. The DTX cycle may be a transmission cycle that includes an active duration during which the network entity may transmit one or more messages, and an inactive duration during which the network entity may refrain from transmitting (e.g., not transmit) messages. During the inactive duration, the network entity may power down one or more components used to transmit messages (e.g., enter a power saving state, such as an OFF state or a sleep state). As such, operating according to the DTX cycle may increase network power savings. The DTX cycle may be periodic (e.g., cyclical). For example, the active duration may be followed by the inactive duration, which may be followed by an active duration, and so on. The network entity may support communications via a serving cell. As such, in some examples, operation of the network entity according to the DTX cycle may be referred to as cell-based DTX (e.g., a cell-DTX cycle).

In some cases, however, the active duration of the DTX cycle may be at least partially misaligned with another transmission configuration at the network entity. For example, the network entity may support a RACH procedure with a UE during which the network entity and the UE may communicate various RACH messages, such as part of an initial access procedure for the UE to achieve uplink synchronization with the network entity, among other purposes. As part of a RACH procedure, the UE may transmit a RACH preamble (e.g., a RACH msg1, a RACH msgA) via a RO. In response to the RACH preamble, the network entity may transmit a random access response (RAR) (e.g., a RACH msg2, a RACH msgB) during a RAR window, where the RAR window is a duration of time during which the network entity may transmit the RAR to the UE. A timing of the RAR window (e.g., a start of the RAR window) may be based on the RACH occasion (e.g., the start of the RAR window may begin a duration after the RACH occasion), and in some cases, the RAR window may begin before and/or extend beyond the active duration of the DTX cycle. Thus, the RAR window may overlap with the inactive duration of the DTX cycle, and monitoring of the full RAR window by the UE may include unnecessarily monitoring portions of the RAR window that are non-overlapping with the DTX active duration, resulting in increased and wasted energy consumption at the UE.

Techniques, systems, and devices described herein support RAR window and DTX active duration alignment. For example, a UE may transmit a RACH message via an RO to a network entity, and a RAR window for a RAR to the RACH message may be at least partially misaligned with an active duration of a DTX cycle according to which the network entity communicates. To resolve the misalignment, the UE may adjust the RAR window, the network entity may adjust the DTX active duration (e.g., or the RAR window), or both, in accordance with an alignment rule. For example, if the misalignment is such that the RAR window begins before DTX active duration, the UE may adjust a start boundary of the RAR window to align with a start boundary of the DTX active duration in accordance with the alignment rule. Additionally or alternatively, if the misalignment is such that the RAR window extends beyond the DTX active duration, the network entity may extend an end boundary of the DTX active duration to at least an end boundary of the RAR window such that the RAR window entirely overlaps with the DTX active duration in accordance with the alignment rule. The network entity and the UE may communicate the RAR during the RAR window that is aligned with the DTX active duration. As used herein, a start boundary and an end boundary of a duration of time or window refer to temporal moments when the duration of time or window either begins or ends, respectively.

Adjusting the RAR window, the DTX active duration, or both, in accordance with the alignment rule may reduce power consumption, increase battery life, increase resource usage efficiency, reduce processing, and increase coordination between devices. For example, aligning a RAR window with a DTX active duration may eliminate the monitoring of portions of a RAR window during which no RAR may be communicated, thereby eliminating the unnecessary monitoring of such RAR window portions and reducing power consumption and increasing battery life at a UE, such as due to the reduced power consumption. Also, power savings associated with the DTX cycle at the network entity may be preserved, for example, if the RAR window is adjusted and the DTX active duration remains the same to resolve the misalignment. Additionally, eliminating the unnecessary monitoring of non-overlapping RAR window portions may eliminate a processing at the UE associated with monitoring these RAR window portions. Further, coordination between the network entity and the UE may be increased as misalignment between various DTX and RAR window configurations may be resolved. Also, alignment between the RAR window and DTX active duration may enable the resources of the RAR window and DTX active duration to be used more efficiently, such as by avoiding wasting misaligned resources.

Additionally or alternatively, techniques, systems, and devices described herein support RACH message communications that eliminate unnecessary monitoring of a RAR window that is misaligned with a DTX active duration. For example, if the RAR window is misaligned with the DTX active duration, a rule may indicate that the RAR window is dropped. For instance, the rule may indicate that the UE and the network entity are to refrain from communicating a RAR during a RAR window that is misaligned with the DTX active duration. In accordance with the rule, the UE may refrain from monitoring the RAR window, and the network entity may refrain from transmitting the RAR during the RAR window. In some examples, the rule may indicate that the UE is to avoid transmitting a RACH preamble via an RO having a corresponding RAR window that is misaligned with the DTX active duration. Here, the UE may refrain from transmitting the RACH preamble and may instead transmit the RACH preamble during an RO having a corresponding RAR window that is aligned with the DTX active duration in accordance with the rule.

Communicating RACH messages in accordance with the rule may reduce power consumption, increase battery life, increase resource usage efficiency, reduce processing, and increase coordination between devices. For example, dropping a misaligned RAR window may eliminate the monitoring of portions of the RAR window during which no RAR may be communicated, thereby eliminating the unnecessary monitoring of such RAR window portions and reducing power consumption and processing associated with such monitoring and increasing battery life at a UE, such as due to the reduced power consumption. Additionally, avoiding transmission of a RACH message during an RO having a corresponding RAR window that is misaligned with the DTX active duration may similarly eliminate such unnecessary monitoring and eliminate the transmission of the RACH message, thereby further reducing power consumption, processing, and resource waste and increasing battery life at the UE. Power consumption may also be reduced at the network entity by avoiding transmission of the RAR during the misaligned RAR window. Further, coordination between the network entity and the UE may be increased as misalignment between various DTX and RAR window configurations may be resolved or avoided. Also, dropping of a RAR window and/or a RACH message may enable resources of the RAR window and/or RO to be used more efficiently, such as being used for the communication of other signaling.

Aspects of the disclosure are initially described in the context of wireless communications systems and a network architecture. Aspects of the disclosure are additionally described in the context of communication diagrams and process flows. Aspects of the disclosure are further illustrated by and described with reference to apparatus diagrams, system diagrams, and flowcharts that relate to a cell DTX-based RAR window configuration.

FIG. 1 illustrates an example of a wireless communications system 100 that supports a cell DTX-based RAR window configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node, which may be referred to as a node, a network node, a network entity 105, or a wireless node, may be a base station 140 (e.g., any base station 140 described herein), a UE 115 (e.g., any UE 115 described herein), a network controller, an apparatus, a device, a computing system, one or more components, and/or another suitable processing entity configured to perform any of the techniques described herein. For example, a network node may be a UE 115. As another example, a network node may be a network entity 105 or a base station 140. As another example, a first network node may be configured to communicate with a second network node or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples. Similarly, reference to a UE 115, base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station also discloses that a first network node is configured to receive information from a second network node), the broader example of the narrower example may be interpreted in the reverse, but in a broad open-ended way. In the example above where a UE 115 being configured to receive information from a base station 140 also discloses that a first network node being configured to receive information from a second network node, the first network node may refer to a first UE 115, a first base station 140, a first apparatus, a first device, a first computing system, a first one or more components, a first processing entity, or the like configured to receive the information; and the second network node may refer to a second UE 115, a second base station 140, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*. F1-*u*), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a cell DTX-based RAR window configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Operation of the wireless communications system 100 may be associated with various costs. Network energy consumption may be associated with relatively high costs (e.g., around 23% of the total expense). In some examples, energy consumption associated with operation of a RAN may constitute a relatively large portion of the network energy consumption (e.g., around 50% or more). Accordingly, network energy saving features may support increased adoption and expansion of cellular networks.

One such network energy saving feature may include operation of network nodes, such as a network entity 105, according to a DTX cycle. For example, the DTX cycle may include an active duration and an inactive duration. During the active duration, the network entity 105 may transmit messages, while during the inactive duration, the network may not transmit messages and may instead power down one or more components (e.g., enter a power saving state) to reduce power consumption. The network entity 105 may be associated with a serving cell (e.g., may serve the serving cell), and the DTX cycle according to which the network entity 105 operates may be referred to as a cell-DTX cycle. The DTX cycle may enable the network entity 105 to align (e.g., schedule) transmissions to various UE 115 in a given interval (e.g., the active duration) to allow the network entity 105 to sleep for the longest possible duration, thereby further reducing power consumption.

In some cases, however, the network entity 105 may support various transmission configurations according to which the network entity 105 transmits messages to UEs 115, and such transmissions may be misaligned with the active duration of the DTX cycle (which may be referred to herein as the DTX active duration). For example, in response to the transmission of a RACH preamble during an RO by a UE 115, the network entity 105 may transmit a RAR during a RAR window whose timing is based on the RO. Based on a timing of the RO, the RAR window may be partially misaligned (e.g., partially non-overlapping) with the DTX active duration. Thus, the RAR window may overlap with the inactive duration of the DTX cycle (which may be referred to herein as the DTX inactive duration), and monitoring of the full RAR window by the UE 115 may include unnecessarily monitoring portions of the RAR window that are non-overlapping with the DTX active duration, resulting in increased and wasted energy consumption at the UE 115. That is, operation according to the DTX cycle may supersede the operation in accordance with the RAR window such that the network entity 105 may not transmit signaling during the DTX inactive duration and power and resources associated with monitoring during for signaling from the network entity 105 by the UE 115 during the DTX inactive duration may be wasted.

Various aspects of the described techniques support rules that support RAR window and DTX active duration misalignment handling, and such aspects may be implemented by wireless communications system 100. For example, UEs 115 may include a communications manager 101 and network entities 105 may include a communications manager 102 that may each support RAR window and DTX active duration misalignment handling implementations. The communications manager 101 may be an example of aspects of a communications manager as described in FIGS. 8 through 11. The communications manager 102 may be an example of aspects of a communications manager as described in FIGS. 12 through 15.

By way of example, a network entity 105 (e.g., using a communications manager 102) may indicate, to a UE 115, one or more parameters of a DTX cycle according to which the network entity 105 operates, such as timings for the DTX active duration and the DTX inactive duration. The network entity 105 may also indicate timing information for a RAR window, such as a duration of the RAR window and a start time of the RAR window relative to a corresponding RO. In some examples, the UE 115 (e.g., using a communications manager 101) may transmit a RACH message via (e.g., during) an RO to the network entity 105, where, in accordance with the timing information, the corresponding RAR window may be misaligned with the DTX active duration. To resolve the misalignment, the UE 115 may adjust the RAR window, the network entity 105 may adjust the DTX active duration (e.g., or the RAR window), or both, in accordance with an alignment rule. For example, the UE 115 (e.g., and the network entity 105) may adjust a start boundary of the RAR window to align with a start boundary of the DTX active duration in accordance with the alignment rule. Additionally or alternatively, the network entity 105 may extend an end boundary of the DTX active duration to at least an end boundary of the RAR window in accordance with the alignment rule. The network entity 105 and the UE 115 may communicate a RAR during the RAR window that is aligned with the DTX active duration.

Alternatively, a rule for handling RAR window and DTX active duration misalignment may indicate for the UE 115 and the network entity 105 to drop the RAR window that is misaligned with the DTX active duration. For example, the UE 115 and the network entity may refrain from communicating (e.g., monitoring for and transmitting, respectively) a RAR during a RAR window that is misaligned with the DTX active duration in accordance with the rule. In some examples, the rule may indicate that the UE 115 is to avoid transmitting a RACH preamble via an RO having a corresponding RAR window that is misaligned with the DTX active duration. Here, the UE 115 may refrain from transmitting the RACH preamble and may instead transmit the RACH preamble during an RO having a corresponding RAR window that is aligned with the DTX active duration in accordance with the rule.

Figure 2:
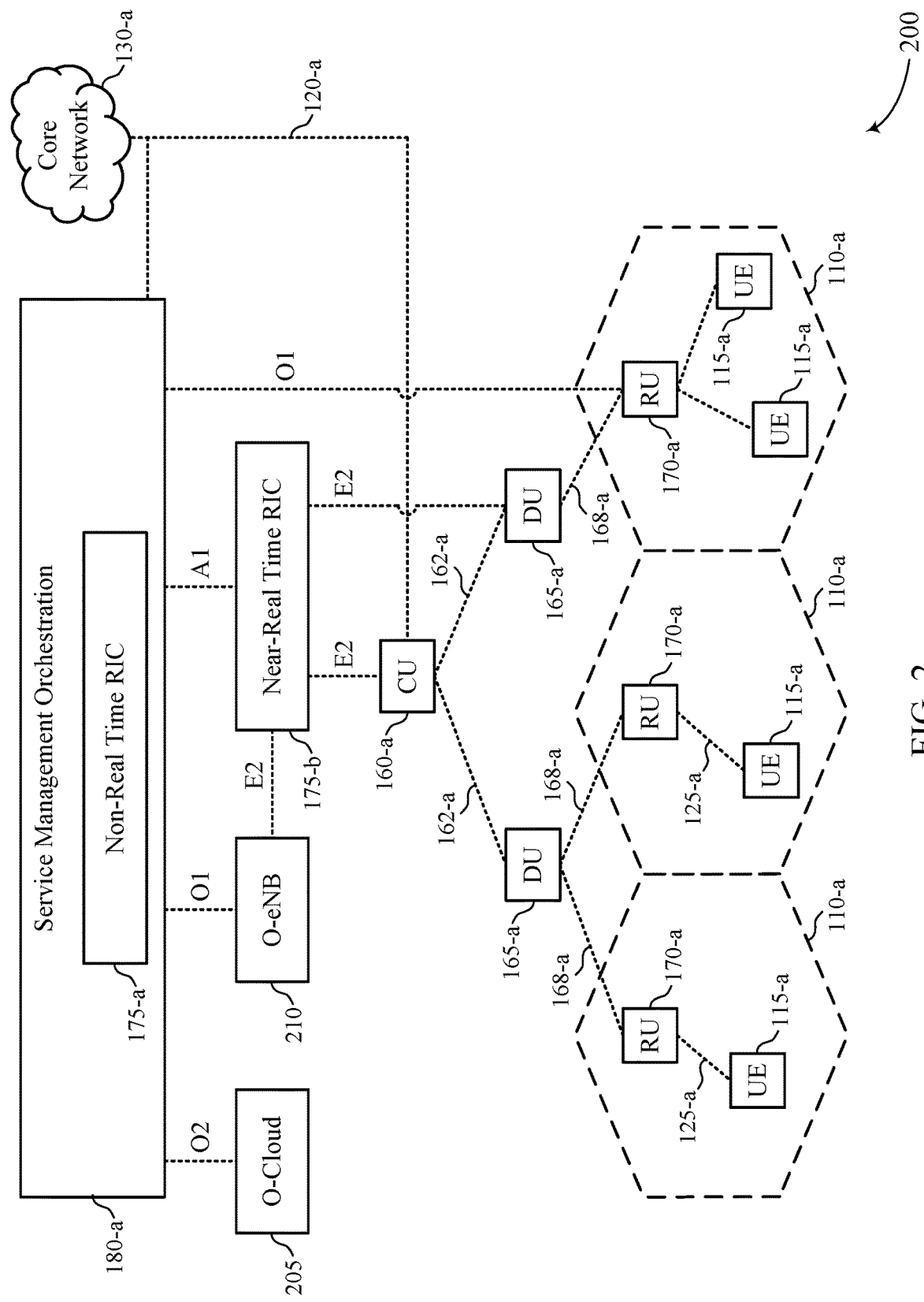
FIG. 2 illustrates an example of a network architecture that supports a cell DTX-based RAR window configuration in accordance with one or more aspects of the present disclosure.

FIG. 2 illustrates an example of a network architecture 200 (e.g., a disaggregated base station architecture, a disaggregated RAN architecture) that supports a cell DTX-based RAR window configuration in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*. DUs 165-*a*. RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP. SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an 02 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via 01) or via generation of RAN management policies (e.g., A1 policies).

In accordance with examples described herein, a UE 115-*a* and a network entity 105 of the network architecture 200 may support RAR window and DTX active duration misalignment handling. For example, a UE 115-*a*, a network entity 105, or both, may support RAR window adjustment, DTX active duration adjustment, RACH message communication adjustment, or a combination thereof, in accordance with a rule to handle misalignment between a RAR window and a DTX active duration in accordance with examples as described herein.

Figure 3:
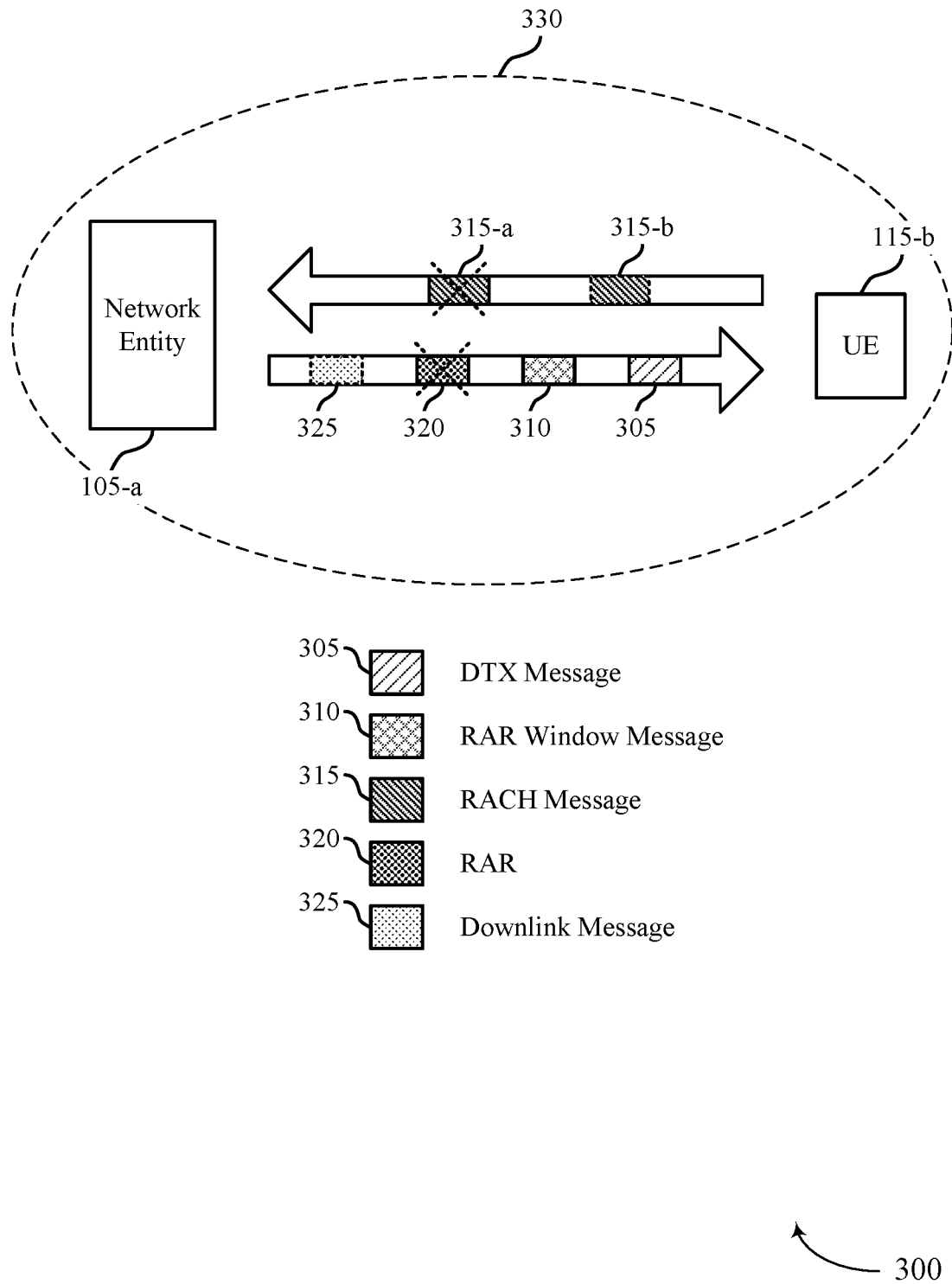
FIG. 3 illustrates an example of a wireless communications system that supports a cell DTX-based RAR window configuration in accordance with one or more aspects of the present disclosure.

FIG. 3 illustrates an example of a wireless communications system 300 that supports a cell DTX-based RAR window configuration in accordance with one or more aspects of the present disclosure. The wireless communications system 300 may implement or be implemented by aspects of wireless communications system 100 or network architecture 200 as described with reference to FIGS. 1 and 2, respectively. For example, the wireless communications system 300 may include a UE 115-*b* and a network entity 105-*a*, which may be examples of the corresponding devices described herein, including with reference to FIGS. 1 and 2.

The network entity 105-*a* may support communications with the UE 115-*b* via a cell 330. For example, the network entity 105-*a* may support a coverage area (e.g., a coverage area 110) of the cell 330, which may be a serving cell 330 of the UE 115-*b* via which the UE 115-*b* may communicate with the network entity 105-*a*.

The serving cell 330 may be associated with a DTX cycle. For example, the network entity 105-*a* may operate according to a DTX cycle that includes a DTX active duration and DTX inactive duration, such a DTX cycle 405 or a DTX cycle 505 described with reference to FIGS. 4A through 5E. The network entity 105-*a* may indicate parameters for the DTX cycle to the UE 115-*b*. For example, the network entity 105-*a* may transmit a DTX message 305 to the UE 115-*b* that indicates one or more parameters of the DTX cycle, such as a duration of the DTX active duration, a duration of the DTX inactive duration, a duration of the DTX cycle, start and stop times of the DTX active and inactive durations, or a combination thereof, among others.

The network entity 105-*a* and the UE 115-*b* may also support performing a RACH procedure that includes the communication of one or more RACH messages. For example, the UE 115-*b* may transmit a RACH message 315-*a*, such as a RACH preamble (e.g., a RACH msg1, a RACH msgA) to the network entity 105-*a* to support an initial access procedure for the UE 115-*b* to achieve uplink synchronization with the network entity 105-*a*, among other purposes. The UE 115-*b* may transmit the RACH message 315-*a* via (e.g., during) an RO, and the RACH message 315-*a* may trigger the transmission of a RAR 320 (e.g., a msg2 of a 4 step RACH procedure, a msgB of a 2 step RACH procedure). For example, in response to the RACH message 315-*a*, the network entity 105-*a* may transmit a RAR 320 during a RAR window corresponding to the RO. Timing information for the RAR window may be indicated by the network entity 105-*a*. For example, the network entity 105-*a* may transmit a RAR window message 310 (e.g., before transmission of the RACH message 315-*a*) that indicates the timing information for the RAR window, such as a duration of the RAR window and a start time of the RAR window relative to a given RO via which the RACH message 315-*a* that triggers the RAR 320 is transmitted.

The network entity 105-*a* may transmit the RAR 320 in accordance with the DTX cycle and the RAR window. For example, the network entity 105-*a* may transmit the RAR 320 during the RAR window and during the DTX active duration. In some cases, however, the RAR window and the DTX active duration may be misaligned. For example, as described with reference to FIGS. 4A through 4E, a start boundary (e.g., a start time) of the RAR window may be before a start boundary (e.g., a start time) of the DTX active duration. Additionally or alternatively, an end boundary (e.g., an end time) of the RAR window may be after (e.g., the RAR window may extend beyond) an end boundary (e.g., an end time) of the DTX active duration. The UE 115-*b* may monitor the RAR window for the transmission of the RAR 320. However, misalignment between the RAR window and the DTX active duration may result in unnecessary monitoring of the non-overlapping portions of the RAR window during which the network entity 105-*a* may not transmit the RAR 320 due to being outside of the DTX active duration, thereby resulting in increased power consumption and resource waste.

The network entity 105-*a* and the UE 115-*b* may manage (e.g., handle, resolve) RAR window and DTX active duration alignments in accordance with a rule. For example, the rule may be an alignment rule to align at least one boundary of the RAR window with at least one boundary of the DTX active duration. For instance, the UE 115-*b* (e.g., and the network entity 105-*a*) may adjust the RAR window, the network entity 105-*a* may adjust the DTX active duration, or both, in accordance with the alignment rule.

In some examples, the alignment rule may indicate for the UE 115-*b* to adjust the RAR window to align a start boundary of the RAR window with a start boundary of the DTX active duration, such as by delaying the RAR window as described with reference to FIG. 4D or by truncating the RAR window as described with reference to FIG. 4E. In some examples, the alignment rule may indicate for the UE 115-*b* to adjust the RAR window to align an end boundary of the RAR window with an end boundary of the DTX active duration, such as by truncating the RAR window as described with reference to FIG. 5C.

In some examples, the alignment rule may indicate for the network entity 105-*a* to extend an end boundary of the DTX active duration to at least an end boundary of the RAR window, such as by extending the DTX active duration as described with reference to FIGS. 5D and 5E or by extending the DTX active duration in a restricted manner as described with reference to FIG. 5B. In some cases, the network entity 105-*a* may support the transmission of additional messages during the extended DTX active duration, such as the transmission of one or more downlink messages 325, as described with reference to FIG. 5E.

Alternatively, the rule may indicate for dropping the RAR window and/or the RACH message 315-*a*. For example, the rule may indicate for the UE 115-*b* and the network entity 105-*a* to drop the RAR window as described with reference to FIG. 4B (which may include the retransmission of the RACH message 315-*a*, such as the transmission of a RACH message 315-*b*). Additionally, or alternatively, the rule may indicate for the UE 115-*b* to drop (e.g., avoid, refrain from) transmission of a RACH message 315 during an RO having a corresponding RAR window that is misaligned with the DTX active duration, as described with reference to FIG. 4C.

FIGS. 4A, 4B, 4C, 4D, and 4E illustrate examples of communication diagrams 400 that support a cell DTX-based RAR window configuration in accordance with one or more aspects of the present disclosure. The communication diagrams 400 may be implemented by aspects of the wireless communications systems 100 or 300. For example, the communication diagrams 400 may be implemented by a network entity 105-*b* and a UE 115-*c*, which may be examples of the corresponding devices described herein, including with reference to FIGS. 1 through 3.

The communication diagrams 400 may depict communication between the network entity 105-*b* and the UE 115-*c* in accordance with a DTX cycle 405. The DTX cycle 405 may include a DTX active duration 410 and a DTX inactive duration 415. The DTX active duration 410 may be a duration during which the network entity 105-*b* may transmit one or more downlink messages to the UE 115-*b*. The DTX inactive duration 415 may be a duration during which the network entity 105-*b* may enter a power saving state. The network entity 105-*b* may not transmit downlink messages during the DTX inactive duration 415, for example, to support power savings at the network entity 105-*b*. In the example of the communication diagrams 400, the DTX inactive duration 415 may be after the DTX active duration 410 within the DTX cycle 405, however, in other examples, the DTX inactive duration 415 may be before the DTX active duration 410. The DTX cycle 405 may be periodic (e.g., repetitive). For example, DTX active duration 410 (e.g., of a next occurrence of the DTX cycle 405) may follow the DTX inactive duration 415 and may be followed by the DTX inactive duration (e.g., of the next occurrent of the DTX cycle 405), and so on.

Figure 4A:
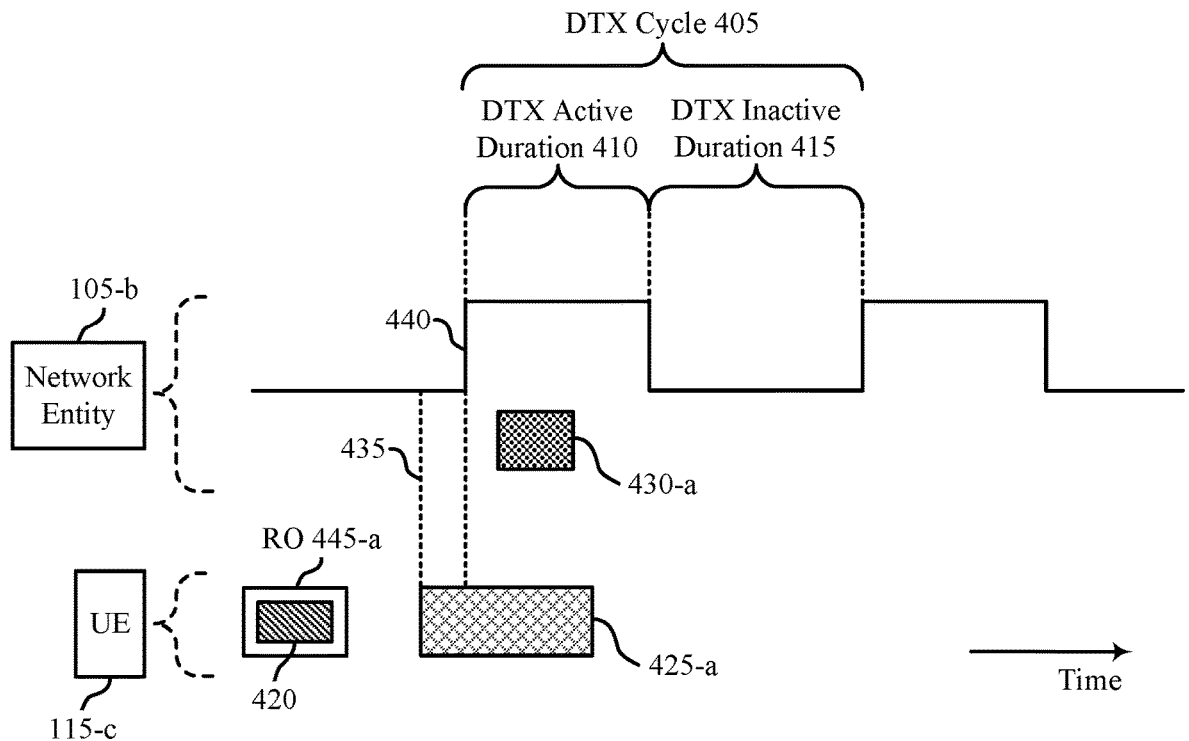
FIGS. 4A, 4B, 4C, 4D, 4E, 5A, 5B, 5C, 5D, and 5E illustrate examples of communication diagrams that supports a cell DTX-based RAR window configuration in accordance with one or more aspects of the present disclosure.

FIG. 4A depicts a communication diagram 400-*a* that illustrates a misalignment between a RAR window 425-*a* and the DTX active duration 410. For example, in the example of FIG. 4A, the UE 115-*c* may transmit a RACH message 420, which may be an example of a RACH message 315 described with reference to FIG. 3. The UE 115-*c* may transmit the RACH message 420 during an RO 445-*a* prior to the DTX active duration 410, and the RACH message 420 may trigger the transmission of a RAR 430-*a* by the network entity 105-*b*, which may be an example of RAR 320 described with reference to FIG. 3. The network entity 105-*b* may transmit the RAR 430-*a* during the RAR window 425-*a* and in accordance with (e.g., during) the DTX active duration 410.

A timing of the RAR window 425-*a* may be based on a timing of the RO 445-*a* during which the RACH message 420 is transmitted. For example, the network entity 105-*b* may indicate timing information to the UE 115-*c* (e.g., via a RAR window message 310) that indicates a duration of a RAR window 425 and a start of the RAR window 425 relative to a given RO 445 (e.g., an time offset of the RAR window 425 relative to the RO 445). In the example of FIG. 4A, the timing information may indicate that the RAR window 425-*a* begins before the DTX active duration 410 in accordance with the transmission of the RACH message 420 during the RO 445-*a*. For example, a start boundary 435 (e.g., a start time) of the RAR window 425-*a* may begin before a start boundary 440 (e.g., a start time) of the DTX active duration 410. As such, the RAR window 425-*a* and the DTX active duration 410 may be misaligned. That is, a portion of the RAR window 425-*a* (e.g., a portion from the start boundary 435 to the start boundary 440) may be non-overlapping with the DTX active duration 410 (e.g., may overlap with the DTX inactive duration 415).

FIGS. 4B through 4E depict communication diagrams 400 that illustrate one or more operations performed by the UE 115-*c*, the network entity 105-*b*, or both, to manage the misalignment between the RAR window 425-*a* and the DTX active duration 410 in accordance with a rule.

Figure 4B:
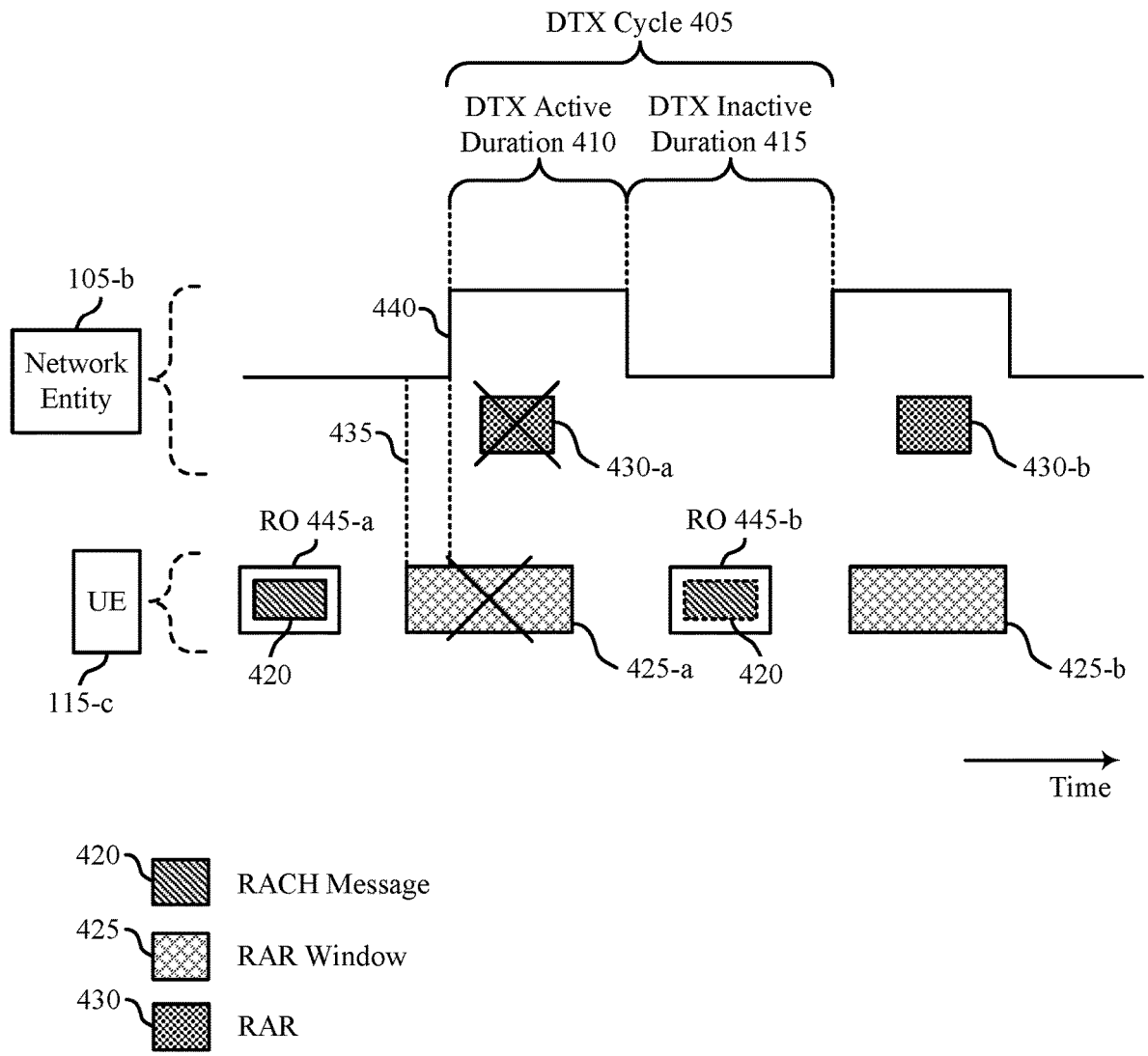

FIG. 4B illustrates a communication diagram 400-*b* in which the rule indicates for the dropping of the RAR window 425-*a* to resolve the misalignment between the RAR window 425-*a* and the DTX active duration 410. For example, the rule may indicate that, if the RAR window 425-*a* and the DTX active duration 410 are misaligned, the RAR window 425-*a* is to be dropped by the UE 115-*c* and the network entity 105-*b*. Accordingly, in accordance with the rule, the UE 115-*c* may refrain from receiving (e.g., not receive, refrain from monitoring for) the RAR 430-*a* during the RAR window 425-*a* (e.g., the UE 115-*c* may drop the RAR window 425-*a*). Additionally, the network entity 105-*b* may refrain from transmitting the RAR 430-*a* during the RAR window 425-*a*. For example, the network entity 105-*b* may drop transmission of the RAR 430-*a* in accordance with the rule.

In some examples, the rule may specify that, if the RAR window 425-*a* begins before the DTX active duration 410 (e.g., the misalignment is due to the start boundary 435 being before the start boundary 440), the RAR window 425-*a* is to be dropped by the UE 115-*c* and the network entity 105-*b*. For example, in some cases, the UE 115-*c* and the network entity 105-*b* may manage RAR window 425 and DTX active duration misalignment differently (e.g., there may be different rules) based on whether the misalignment is in relation to the start boundaries or end boundaries of the RAR window and DTX active duration. Here, the UE 115-*c* and the network entity 105-*b* may refrain from communicating (e.g., not communicate) the RAR 430-*a* based on the start boundary 435 being before the start boundary 440.

In some examples, the rule may indicate that the UE 115-*c* is to retransmit the RACH message 420 on another RO 445 (e.g., an RO 445-*b*). For example, in accordance with the rule and dropping the RAR window 425-*a* (e.g., refraining from receiving and monitoring for the RAR 430-*a*), the UE 115-*c* may retransmit the RACH message 420 during an RO 445-*b* that is subsequent to RO 445-*a*. In the example of FIG. 4B, a RAR window 425-*b* corresponding to the RO 445-*b* may be aligned with the DTX active duration 410. For example, the RAR window 425-*b* may be entirely within the DTX active duration 410 or at least the start boundary 435 may be aligned with (e.g., start at the same time as) the start boundary 440 or be after the start boundary 440 and within the DTX active duration 410. Accordingly, in accordance with the rule, the network entity 105-*b* may transmit a RAR 430-*b* during the RAR window 425-*b* (e.g., and during the DTX active duration 410), and the UE 115-*c* may monitor for and receive the RAR 430-*b* during the RAR window 425-*b*. It is noted, that in some cases, the RAR window 425-*b* may also be misaligned with the DTX active duration 410, and the RAR window 425-*b* may similarly dropped along with additional retransmission of the RACH message 420 during a subsequent RO 445 (e.g., and so on until a corresponding RAR window 425 is aligned with the DTX active duration 410).

In some examples, the rule may indicate that the UE 115-*c* is to receive the RAR 430 during a subsequent RAR window 425 that is aligned with the DTX active duration 410, such as if such a RAR window 425 is available (e.g., exists). For example, the timing information may indicate a timing for multiple RAR windows 425 corresponding to a given RO 445. For instance, the timing information may indicate a timing (e.g., a duration, a start time) of one or more additional RAR windows 425 (e.g., the RAR window 425-*b*) relative to a given RO 445 (e.g., relative to a prior RAR window 425, such as the RAR window 425-*a*). In some examples, one of the one or more additional RAR windows 425 corresponding to the RO 445-*a* may be aligned with the DTX active duration 410. For example, the RAR window 425-*b* may be aligned with the DTX active duration 410, and in accordance with the rule, the network entity 105-*b* may transmit the RAR 430-*b* (e.g., which may be the RAR 430-*a*) to the UE 115-*c* during the RAR window 425-*b* and the DTX active duration 410. Additionally, in accordance with the rule, the UE 115-*c* may monitor for and receive the RAR 430-*b* during the RAR window 425-*b* based on the RAR window 425-*b* being aligned with the DTX active duration 410.

Figure 4C:
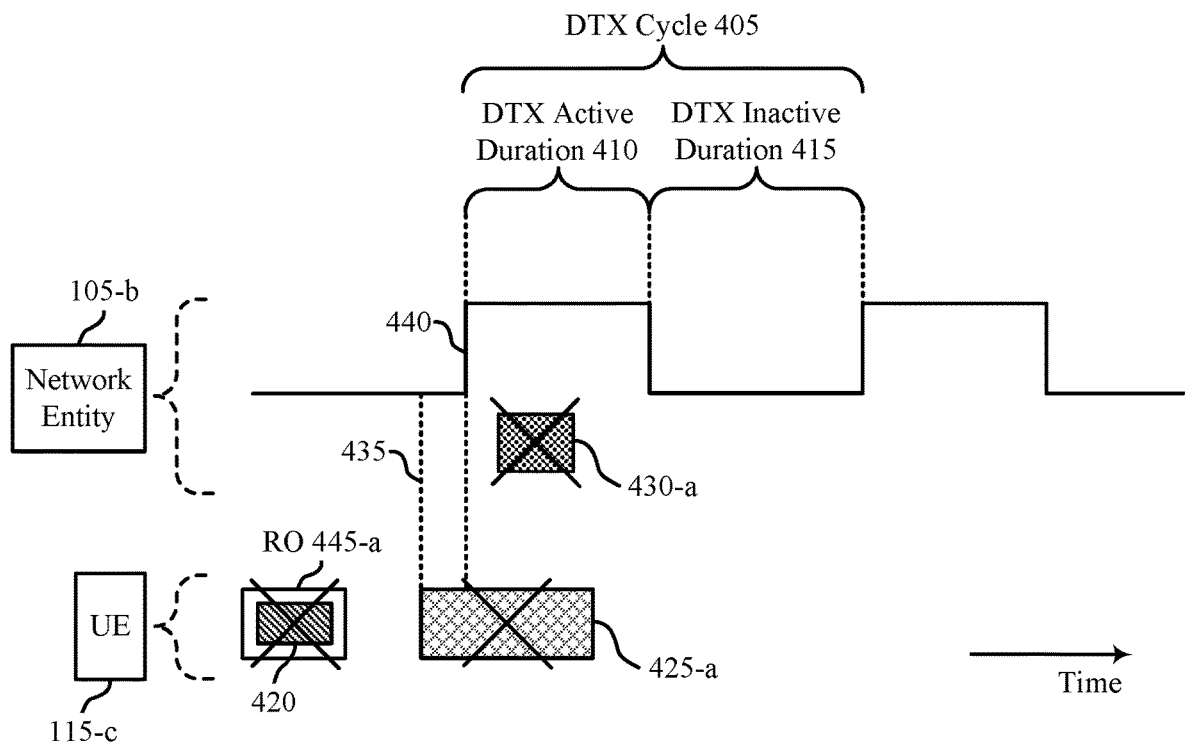

FIG. 4C illustrates a communication diagram 400-*c* in which the rule indicates for the dropping of the RACH message 420 to resolve the misalignment between the RAR window 425-*a* and the DTX active duration 410. For example, the rule may indicate that the UE 115-*c* shall not transmit (e.g., is to refrain from transmitting) the RACH message 420 during a RO 445 having a corresponding RAR window that is misaligned with the DTX active duration 410. Accordingly, in accordance with the rule, the UE 115-*c* may refrain from transmitting the RACH message 420 during the RO 445-*a* due to the corresponding RAR window 425-*a* being misaligned with the DTX active duration 410. For example, the UE 115-*c* may use the timing information for a RAR window 425 and parameters indicated for the DTX cycle 405 (e.g., timings of the DTX active duration 410, the DTX inactive duration 415, or both) to determine whether a RAR window 425 corresponding to a given RO 445 will be misaligned with the DTX active duration.

In the example of FIG. 4C, the UE 115-*c* may determine that the RAR window 425-*a* corresponding to the RO 445-*a* is misaligned with the DTX active duration 410, and may thus refrain from transmitting the RACH message 420 during the RO 445-*a* in accordance with the rule. Here, because the RACH message 420 is not transmitted, the transmission of the RAR 430-*a* may not be triggered and the RAR window 425-*a* may not occur.

Figure 4D:
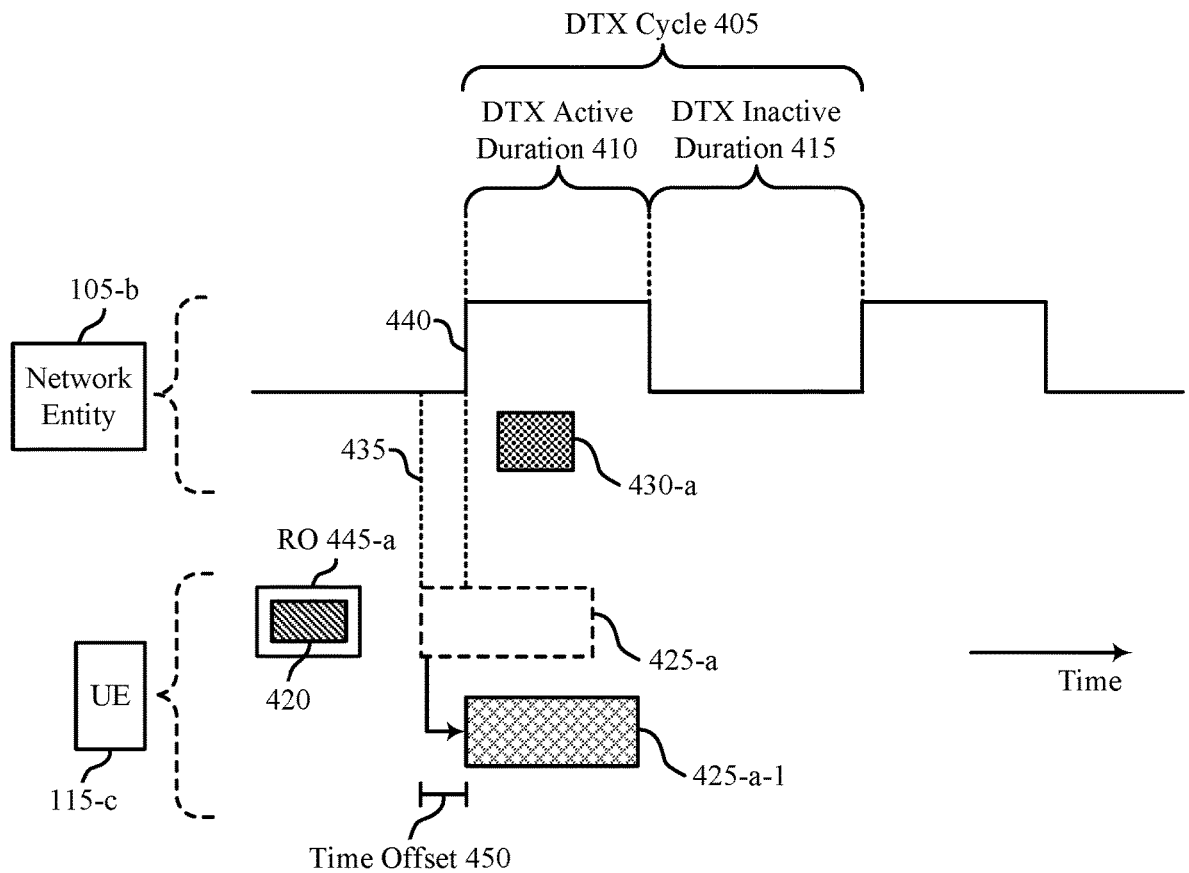

FIG. 4D illustrates a communication diagram 400-*d* in which the rule is an alignment rule that indicates for a delay to the RAR window 425-*a* to align the RAR window 425-*a* with the DTX active duration 410. For example, the alignment rule may indicate that, if the RAR window 425-*a* begins before the DTX active duration 410 (e.g., the start boundary 435 is before the start boundary 440), the UE 115-*c* may delay the RAR window 425-*a* to align the start boundary 435 with the start boundary 440. Accordingly, in accordance with the alignment rule, the UE 115-*c* may delay the RAR window 425-*a* (e.g., to be the RAR window 425-*a*-1) such that the start boundary 435 is aligned with (e.g., starts at the same time as) the start boundary 440 based on (e.g., in response to) the start boundary 435 being before the start boundary 440 prior to the UE 115-*c* delaying the RAR window 425-*a*. The network entity 105-*b* and the UE 115-*c* may communicate the RAR 430-*a* during the aligned RAR window 425-*a*-1.

In some examples, the alignment rule may indicate how the UE 115-*c* is to delay the RAR window 425-*a*. For example, the alignment rule may indicate that the UE 115-*c* is to apply a time offset 450 to the RAR window 425-*a* to align the start boundary 435 with the start boundary 440

(e.g., to shift the RAR window 425-*a* in time to be the RAR window 425-*a*-1 such that the start boundary 435 and the start boundary 440 are aligned). Accordingly, in accordance with the alignment rule, the UE 115-*c* may apply the time offset 450 to the RAR window 425-*a* (e.g., to be the RAR window 425-*a*-1) such that the start boundary 435 is aligned with the start boundary 440 based on (e.g., in response to) the start boundary 435 being before the start boundary 440 prior to the UE 115-*c* applying the time offset 450.

In some examples, the network entity 105-*b* may implement the alignment rule in addition to the UE 115-*c*. For example, the network entity 105-*b* may also apply the time offset 450 to the RAR window 425-*a* to align the start boundary 435 with the start boundary 440 (e.g., from the perspective of the network entity 105-*b*). That is, the network entity 105-*b* may independently apply the time offset 450 in accordance with the alignment rule to align the start boundaries.

Figure 4E:
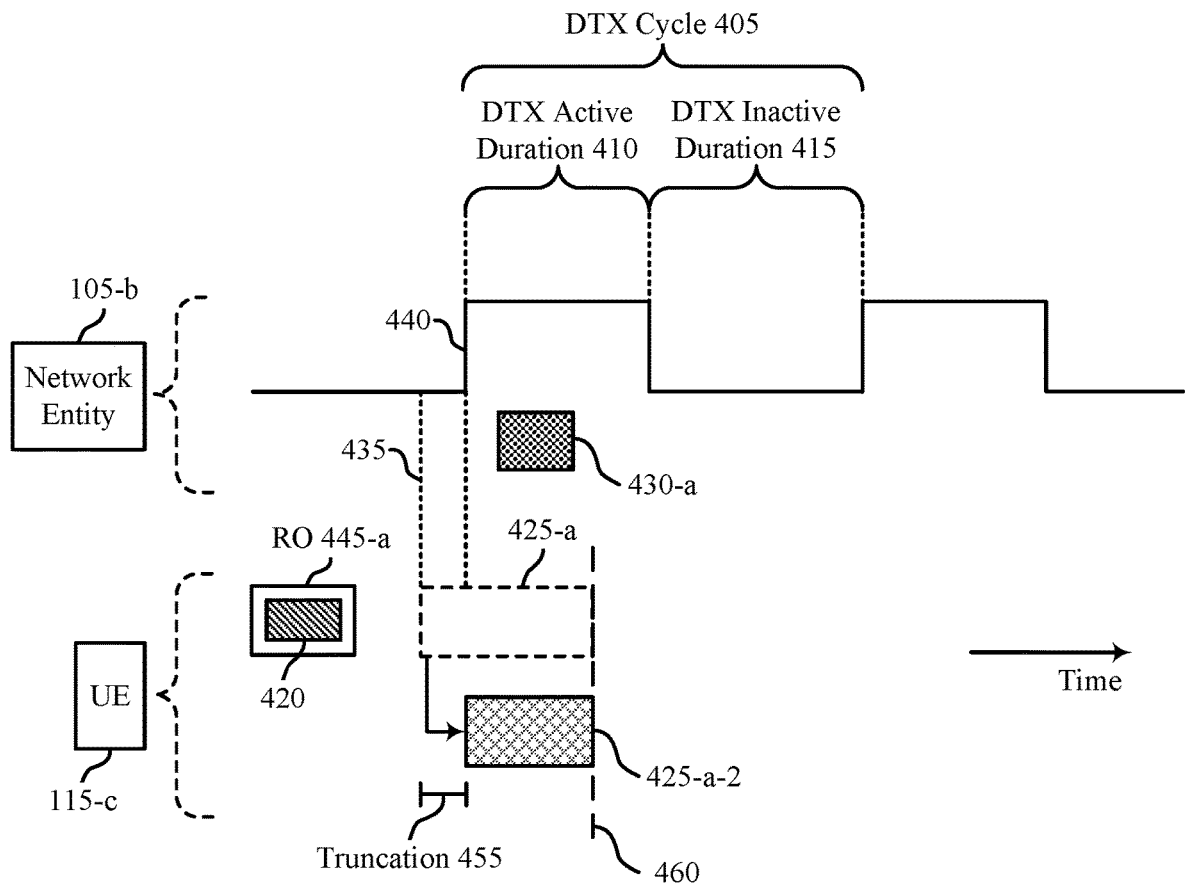
Figure 4E:
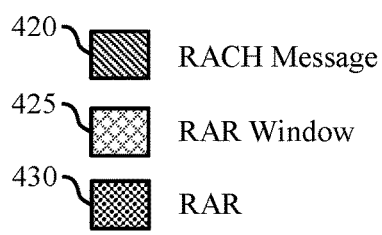

FIG. 4E illustrates a communication diagram 400-*e* in which the rule is an alignment rule that indicates for a truncation of the RAR window 425-*a* to align the RAR window 425-*a* with the DTX active duration 410. For example, the alignment rule may indicate that, if the RAR window 425-*a* begins before the DTX active duration 410 (e.g., the start boundary 435 is before the start boundary 440), the UE 115-*c* may truncate (e.g., shorten, trim) the RAR window 425-*a* to align the start boundary 435 with the start boundary 440. Accordingly, in accordance with the alignment rule, the UE 115-*c* may truncate the RAR window 425-*a* (e.g., to be the RAR window 425-*a*-2) such that the start boundary 435 is aligned with the start boundary 440 based on (e.g., in response to) the start boundary 435 being before the start boundary 440 prior to the UE 115-*c* truncating the RAR window 425-*a*. For example, a truncation 455 of the RAR window 425-*a* may correspond to a removal of a portion of the RAR window 425-*a* that overlaps with the DTX inactive duration 415 prior to the DTX active duration 410. Additionally, an end boundary 460 of the RAR window 425-*a* may remain unchanged based on truncating the RAR window 425-*a*. That is, rather than shifting the RAR window 425-*a* with an overall duration of the RAR window 425-*a* remaining unchanged, as shown in FIG. 4D, the duration of the RAR window 425-*a* may be shortened from the beginning of the RAR window 425-*a* such that the start boundary 435 is aligned with the start boundary 440. The network entity 105-*b* and the UE 115-*c* may communicate the RAR 430-*a* during the aligned RAR window 425-*a*-2.

FIGS. 5A, 5B, 5C, 5D, and 5E illustrate examples of communication diagrams 500 that support a cell DTX-based RAR window configuration in accordance with one or more aspects of the present disclosure. The communication diagrams 500 may be implemented by aspects of the wireless communications systems 100 or 300. For example, the communication diagrams 500 may be implemented by a network entity 105-*c* and a UE 115-*d*, which may be examples of the corresponding devices described herein, including with reference to FIGS. 1 through 4.

The communication diagrams 500 may depict communication between the network entity 105-*c* and the UE 115-*d* in accordance with a DTX cycle 505, which may be an example of a DTX cycle 405 described with reference to FIG. 4. For example, the DTX cycle 505 may include a DTX active duration 510 and a DTX inactive duration 515, which may be examples of the DTX active duration 410 and the DTX inactive duration 415, respectively, as described with reference to FIG. 4.

Figure 5A:
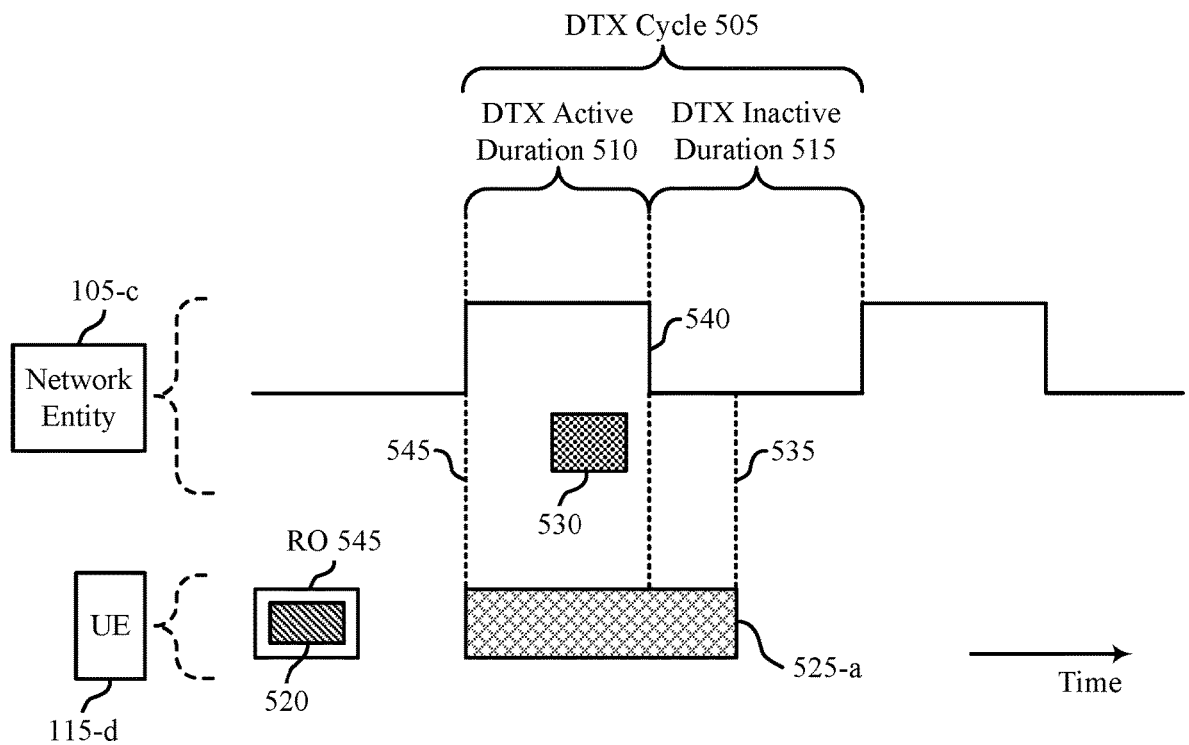

FIG. 5A depicts a communication diagram 500-*a* that illustrates a misalignment between a RAR window 525-*a* and the DTX active duration 510. For example, in the example of FIG. 5A, the UE 115-*d* may transmit a RACH message 520, which may be an example of a RACH message 315 or a RACH message 420. The UE 115-*c* may transmit the RACH message 520 during an RO 545 prior to the DTX active duration 510, and the RACH message 520 may trigger the transmission of a RAR 530 by the network entity 105-*c*, which may be an example of RAR 320 or a RAR 430. The network entity 105-*c* may transmit the RAR 530 during the RAR window 525-*a* and in accordance with (e.g., during) the DTX active duration 510.

A timing of the RAR window 525-*a* may be based on a timing of the RO 545 during which the RACH message 520 is transmitted, for example, in accordance with timing information for a RAR window 525 indicated by the network entity 105-*c* (e.g., via a RAR window message 310). In the example of FIG. 5A, the timing information may indicate that the RAR window 525-*a* extends beyond the DTX active duration 510 in accordance with the transmission of the RACH message 520 during the RO 545. For example, an end boundary 535 (e.g., an end time) of the RAR window 525-*a* may be after a start boundary 540 (e.g., an end time) of the DTX active duration 510. As such, the RAR window 525-*a* and the DTX active duration 510 may be misaligned. That is, a portion of the RAR window 525-*a* (e.g., a portion from the end boundary 540 to the end boundary 535) may be non-overlapping with the DTX active duration 510 (e.g., may overlap with the DTX inactive duration 515). In the example of FIG. 5A, respective start boundaries 550 of the DTX active duration 510 and the RAR window 525-*a* may be aligned (e.g., such as after performing an alignment of the start boundaries as described with reference to FIGS. 4D and 4E). In some other examples, the start boundary 550 of the RAR window 525-*a* may be after the start boundary 550 of the DTX active duration 510 and within the DTX active duration 510, such as in accordance with the timing information and the transmission of the RACH message 520 during the RO 545.

FIGS. 5B through 5E depict communication diagrams 500 that illustrate one or more operations performed by the UE 115-*d*, the network entity 105-*c*, or both, to manage the misalignment between the RAR window 525-*a* and the DTX active duration 510 in accordance with an alignment rule.

Figure 5B:
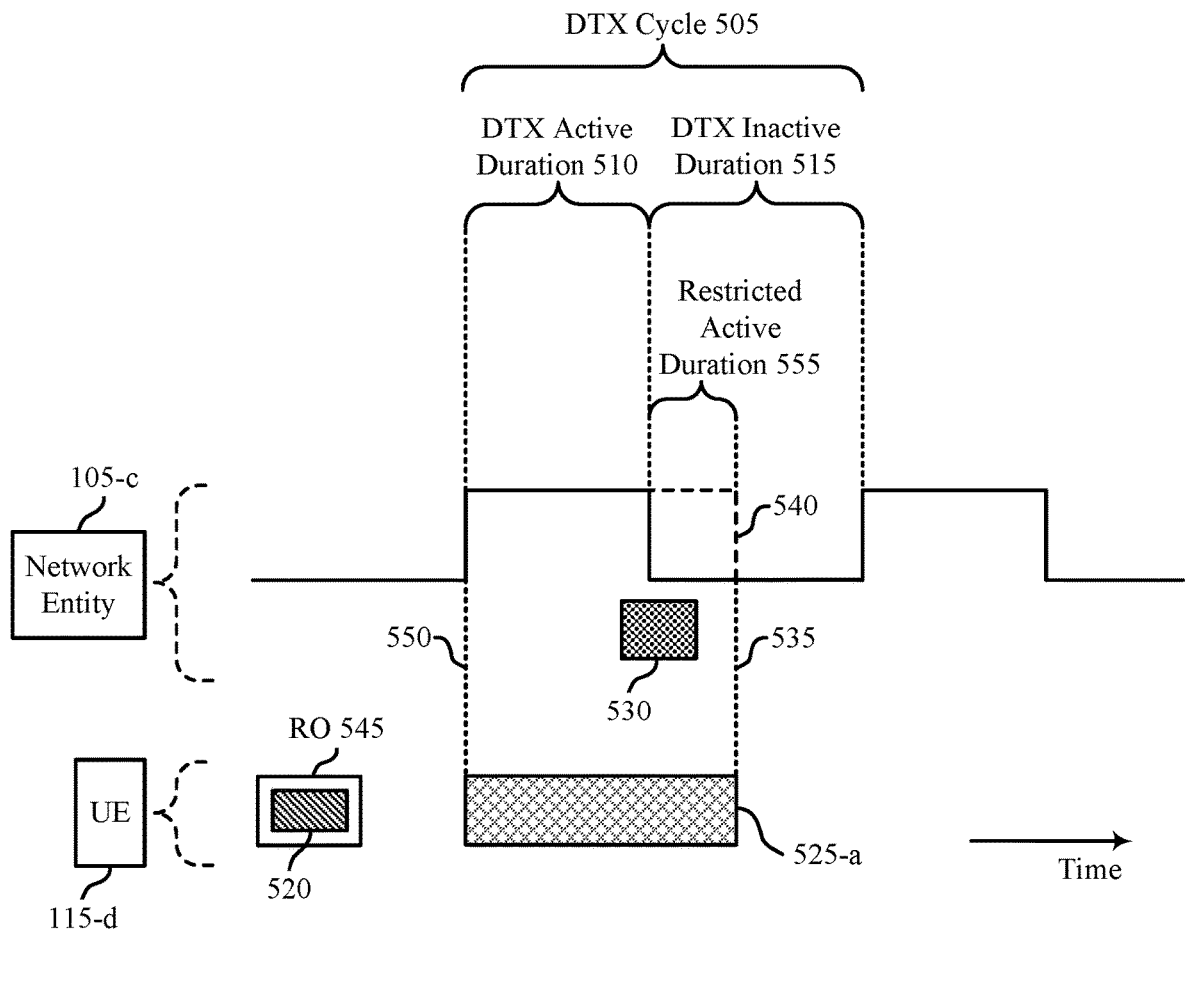

FIG. 5B illustrates a communication diagram 500-*b* in which the alignment rule indicates for the network entity 105-*c* to extend the DTX active duration 510 to at least the end boundary 535 in a restricted manner. For example, the alignment rule may indicate that, if the RAR window 525-*a* extends beyond the DTX active duration 510 (e.g., the end boundary 535 is after the end boundary 540), the network entity 105-*c* may extend the DTX active duration 510 for a duration that is specific to the communication of the RAR 530 and excludes the communication of other messages. For instance, in accordance with the alignment rule, the network entity 105-*c* may extend the DTX active duration 510 for a restricted active duration 555 such that the end boundary 540 (e.g., of the restricted active duration 555) is aligned with the end boundary 535. Accordingly, in accordance with the alignment rule, the network entity 105-*c* may extend the DTX active duration 510 for the restricted active duration 555 such that the end boundary 535 is aligned with the end boundary 540 based on (e.g., in response to) the end boundary 535 being after the end boundary 540 prior to the network entity 105-*c* extending the DTX active duration 510.

During the restricted active duration 555, the network entity 105-c may be limited to transmitting the RAR 530 and may be unable to transmit other messages to the UE 115-d (e.g., or other UEs 115). As such, in some examples, the extension of the DTX active duration 510 for the restricted active duration 555 may not be considered a change to the DTX active duration 510 and the DTX inactive duration 515. That is, the alignment rule may indicate that the RAR window 525-a is active until the end of the configured length for the RAR window 525-a regardless of the end boundary 540 of the DTX active duration 510 and indicate that the network entity 105-c may transmit the RAR 530 during the restricted active duration 555 (e.g., if not transmitted before the restricted active duration 555).

Figure 5C:
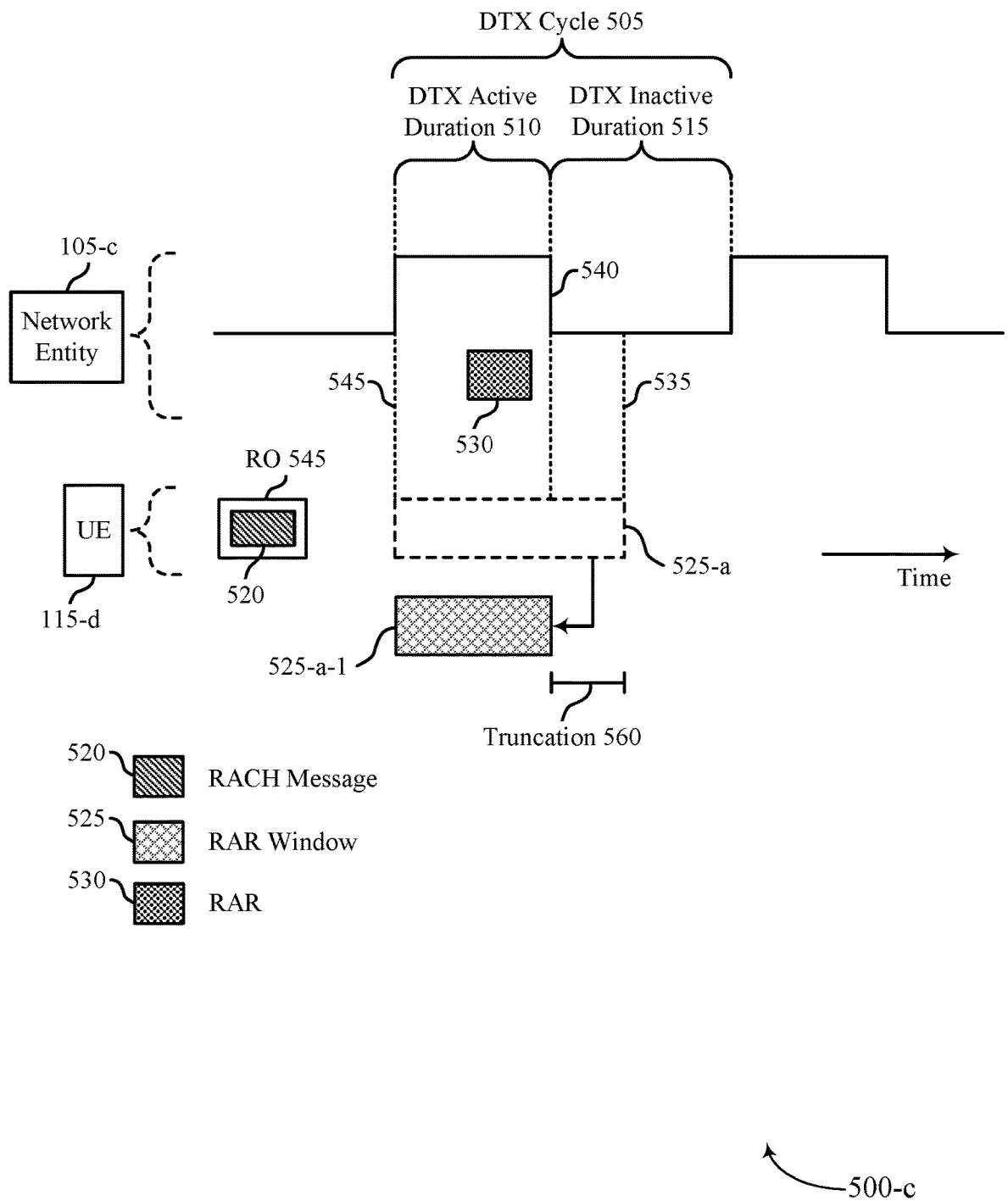

FIG. 5C illustrates a communication diagram 500-c in which the alignment rule indicates for a truncation of the RAR window 525-a to align the RAR window 525-a with the DTX active duration 510. For example, the alignment rule may indicate that, if the RAR window 525-a extends beyond the DTX active duration 510 (e.g., the end boundary 535 is after the end boundary 540), the UE 115-d may truncate (e.g., shorten, trim) the RAR window 525-a to align the end boundary 535 with the end boundary 540. Accordingly, in accordance with the alignment rule, the UE 115-d may truncate the RAR window 525-a (e.g., to be the RAR window 525-a-1) such that the end boundary 535 is aligned with the end boundary 540 based on (e.g., in response to) the end boundary 535 being after the end boundary 540 prior to the UE 115-d truncating the RAR window 525-a. For example, a truncation 560 of the RAR window 525-a may correspond to a removal of a portion of the RAR window 525-a that overlaps with the DTX inactive duration 515 after the DTX active duration 510. The network entity 105-c and the UE 115-d may communicate the RAR 530 during the aligned RAR window 525-a-1.

Figure 5D:
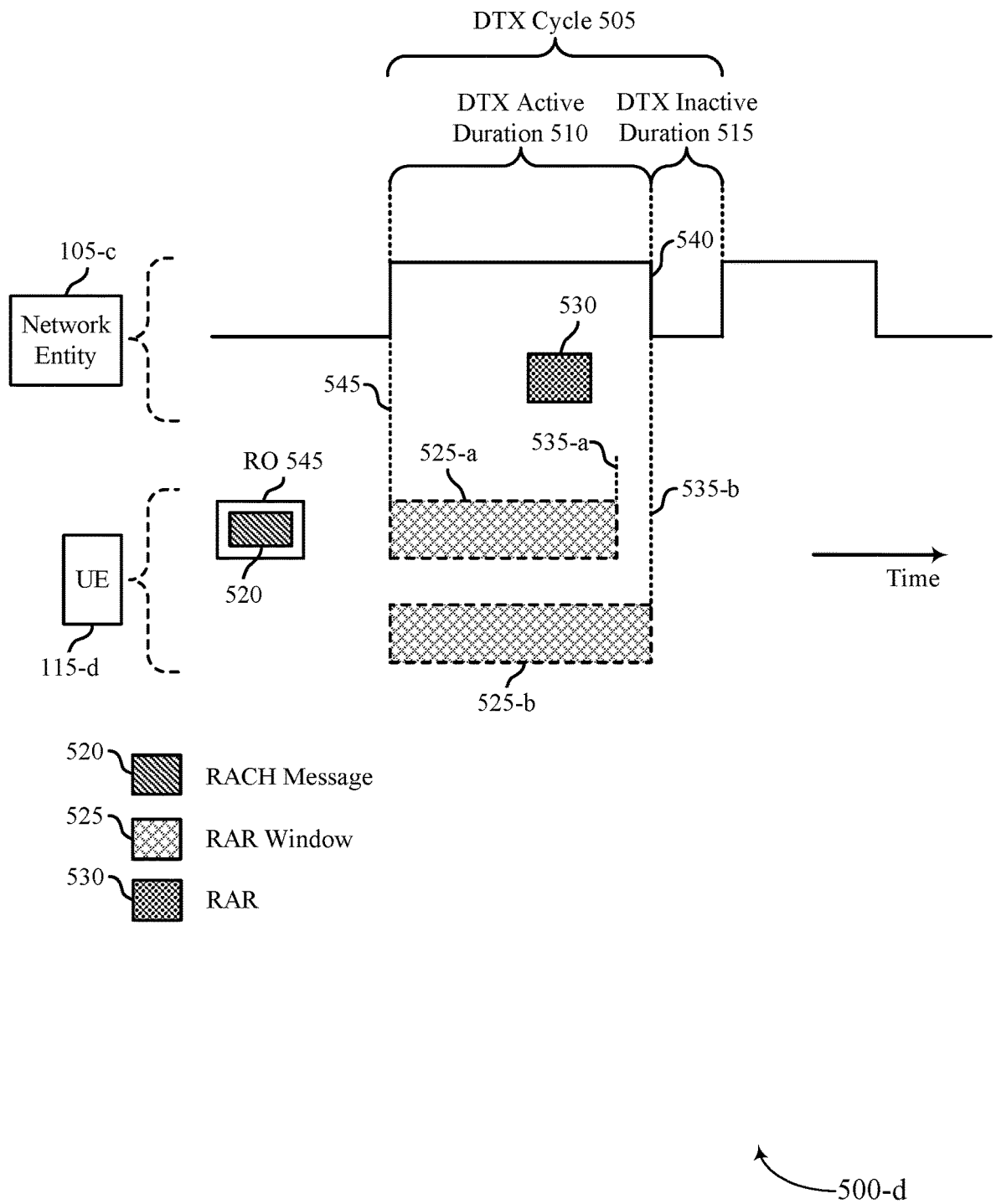
Figure 5E:
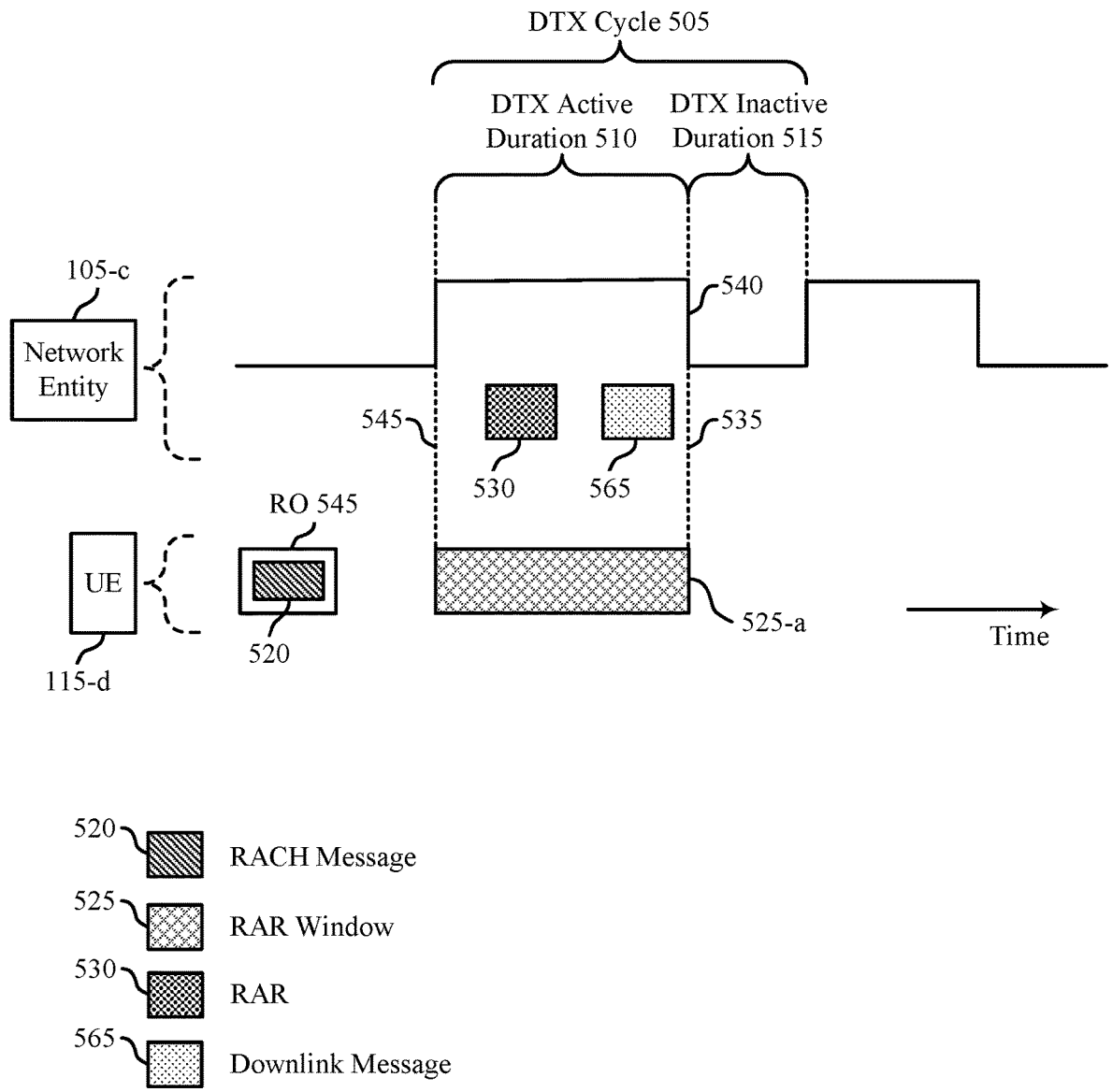

FIGS. 5D and 5E illustrate communication diagrams 500-d and 500-e, respectively, in which the alignment rule indicates for the network entity 105-c to extend the DTX active duration 510 to at least the end boundary 535 in an unrestricted manner. For example, the alignment rule may indicate that, if the RAR window 525-a extends beyond the DTX active duration 510 (e.g., the end boundary 535 is after the end boundary 540), the network entity 105-c may extend the DTX active duration 510 to at least the end boundary 535 (e.g., during which the network entity 105-c may support the transmission of other downlink messages 565 in addition to the RAR 530). Accordingly, in accordance with the alignment rule, the network entity 105-c may extend the DTX active duration 510 (e.g., to be the RAR window 425-a-2) such that the end boundary 540 is aligned with or is after the end boundary 535 based on (e.g., in response to) the end boundary 535 being after the end boundary 540 prior to the network entity 105-c extending the DTX active duration 510.

In the example of FIG. 5D, the network entity 105-c may extend the DTX active duration 510 to extend beyond the end boundary 535 of the (e.g., the original end boundary 535-a of the RAR window 525-a). That is, the network entity 105-c may extend the DTX active duration 510 such that the end boundary 540 is after the end boundary 535-a of the RAR window 525-a. In some examples, the alignment rule may indicate that the RAR window 525-a is to remain unchanged. That is, regardless of whether the DTX active duration 510 is extend to align with the end boundary 535-a or extend beyond the end boundary 535-a, the duration of the RAR window 525-a may be the same and the end boundary 535-a may remain unchanged. In some other examples, the alignment rule may indicate that the UE 115-d (e.g., and the network entity 105-c) may extend the RAR window 525-a to the end boundary 540, such as if the end boundary 540 is extended beyond the end boundary 535-a. For example, in accordance with the alignment rule, the UE 115-d (e.g., and the network entity 105-c) may extend the RAR window 525-a to be the RAR window 525-b having an end boundary 535-b that aligns with the extended end boundary 540. In some examples, the alignment rule may indicate whether the extension of the end boundary 535-a to the extended end boundary 540 is optional or mandatory. The network entity 105-c and the UE 115-d may communicate the RAR 530 during the aligned RAR window 525-a (e.g., during the extended DTX active duration 510).

In the example of FIG. 5E, the network entity 105-c may extend the DTX active duration 510 to the end boundary 535 (e.g., extend the end boundary 540 to align with the end boundary 535). The network entity 105-c may also support the transmission of one or more downlink messages 565 during the extended DTX active duration 510. For example, the extension of the DTX active duration 510 may be an unrestricted extension during which the network entity 105-c may transmit one or more downlink messages 565 to the UE 115-d, one or more other UEs 115, or a combination thereof.

Figure 6:
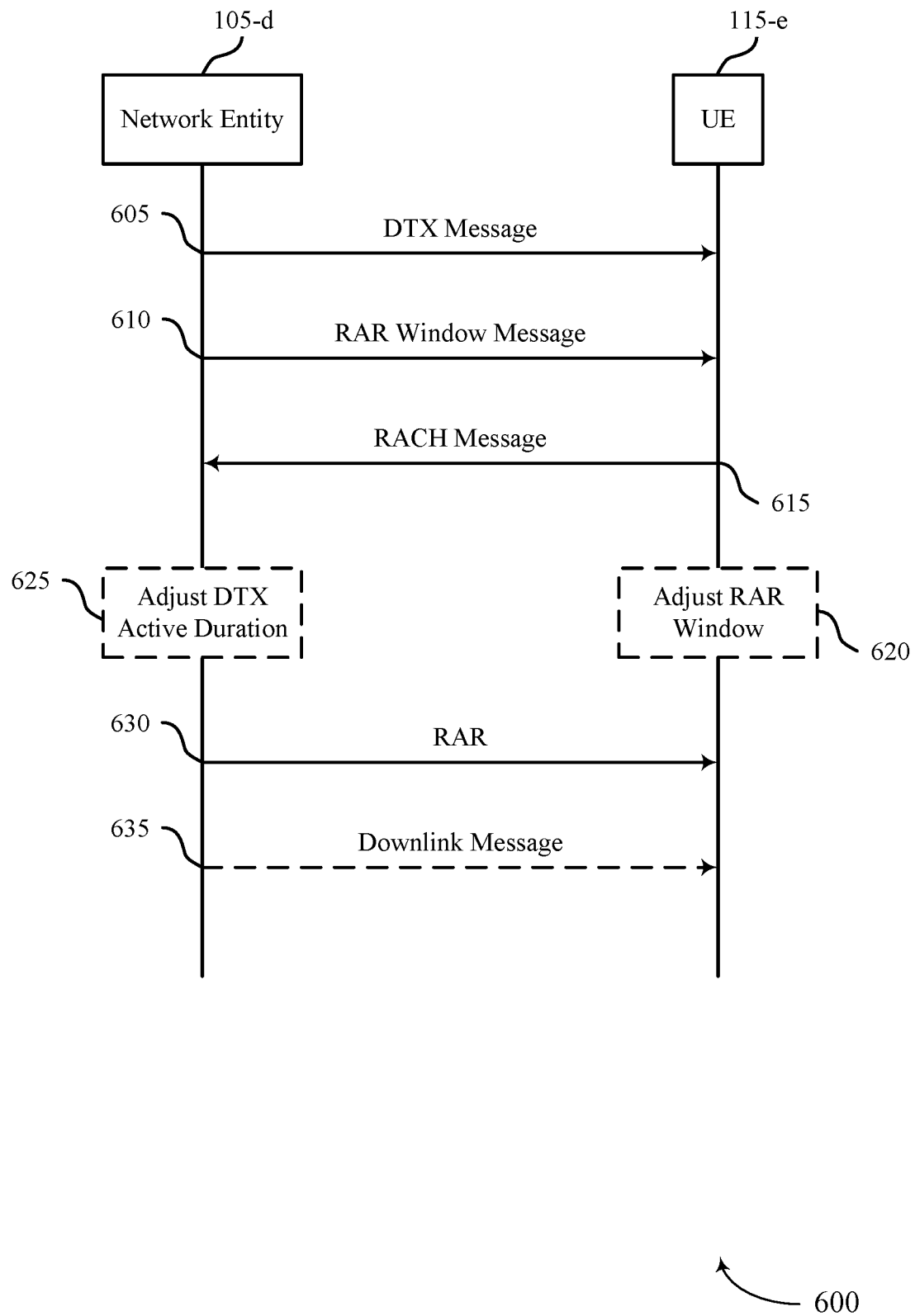
FIGS. 6 and 7 illustrate examples of process flows that support a cell DTX-based RAR window configuration in accordance with one or more aspects of the present disclosure.

FIG. 6 illustrates an example of a process flow 600 that supports a cell DTX-based RAR window configuration in accordance with one or more aspects of the present disclosure. The process flow 600 may be implemented by aspects of the wireless communications systems 100 or 300. For example, the process flow 600 may illustrate communication between a UE 115-e and a network entity 105-d, which may be examples of corresponding devices described herein, including with reference to FIGS. 1 through 5E.

In the following description of the process flow 600, the operations may be performed in a different order than the order shown. Specific operations also may be left out of the process flow 600, or other operations may be added to the process flow 600. Further, although some operations or signaling may be shown to occur at different times for discussion purposes, these operations may actually occur at the same time.

At 605, the network entity 105-d may transmit a DTX message to the UE 115-e that indicates one or more parameters for a DTX cycle associated with a serving cell (e.g., a DTX cycle according to which the network entity 105-d that supports the serving cell operates). The one or more parameters may indicate various timing information for the DTX cycle, such as a duration of the DTX cycle, a duration a DTX active duration of the DTX cycle, a duration of a DTX inactive duration of the DTX cycle, or a combination thereof, among other information that may be indicated via the DTX message.

At 610, the network entity 105-d may transmit a RAR window message to the UE 115-e that indicates timing information for a RAR window associated with transmission of a RACH message (e.g., a RACH preamble) that triggers a RAR. For example, the RAR window message may indicate a duration of the RAR window and a timing of the RAR window relative to a given RO via which the RACH message may be transmitted.

At 615, the UE 115-e may transmit the RACH message to the network entity 105-d. For example, the UE 115-e may transmit the RACH message during an RO, where a RAR window corresponding to the RO may be misaligned with the DTX active duration based on the timing information for the RAR window and a time of the transmission of the RACH message (e.g., a time of the RO).

At 620, the UE 115-*e* may adjust the RAR window to align at least one boundary of the RAR window with at least one boundary (e.g., a corresponding boundary) of the DTX active duration. For example, in accordance with an alignment rule, the UE 115-*e* may delay (e.g., apply a time offset), truncate, and/or extend the RAR window to align a start boundary of the RAR window with a start boundary of the DTX active duration, align an end boundary of the RAR window with an end boundary of the DTX active duration, or a combination thereof, as described with reference to FIGS. 4D, 4E, 5C, and 5D. In some examples, the UE 115-*e* may adjust both the start boundary and the end boundary of the RAR window, for example, if an adjustment to the start boundary of the RAR window (e.g., a delay to the start boundary of the RAR window) cause the end boundary of the RAR window to extend beyond the end boundary of the DTX active duration.

At 625, the network entity 105-*d* may adjust the DTX active duration to align at least one boundary of the DTX active duration with at least one boundary (e.g., a corresponding boundary) of the RAR window. For example, in accordance with the alignment rule (e.g., or a different alignment rule), the network entity 105-*d* may extend the DTX active duration (e.g., in a restricted or unrestricted manner) to align the end boundary of the DTX active duration with the end boundary of the RAR window (e.g., or extend the end boundary of the DTX active duration beyond the end boundary of the RAR window) based on the end boundary of the RAR window being after the end boundary of the DTX active duration prior to the extension of the DTX active duration, as described with reference to FIGS. 5B, 5D, and 5E. In some examples, alignment of (e.g., adjustments to) the start boundary of the RAR window may trigger the extension of the DTX active duration in accordance with the alignment rule, such as if the alignment of the start boundary of the RAR window causes the end boundary of the RAR window to extend beyond the end boundary of the DTX active duration.

At 630, the network entity 105-*d* may transmit the RAR triggered by the transmission of the RACH message. The network entity 105-*d* may transmit the RAR to the UE 115-*e* during the RAR window that has been aligned with the DTX active duration in accordance with the alignment rule.

At 635, the network entity 105-*d* may transmit a downlink message to the UE 115-*e* during a portion of the DTX active duration that was extended (e.g., if extended in an unrestricted manner).

Figure 7:
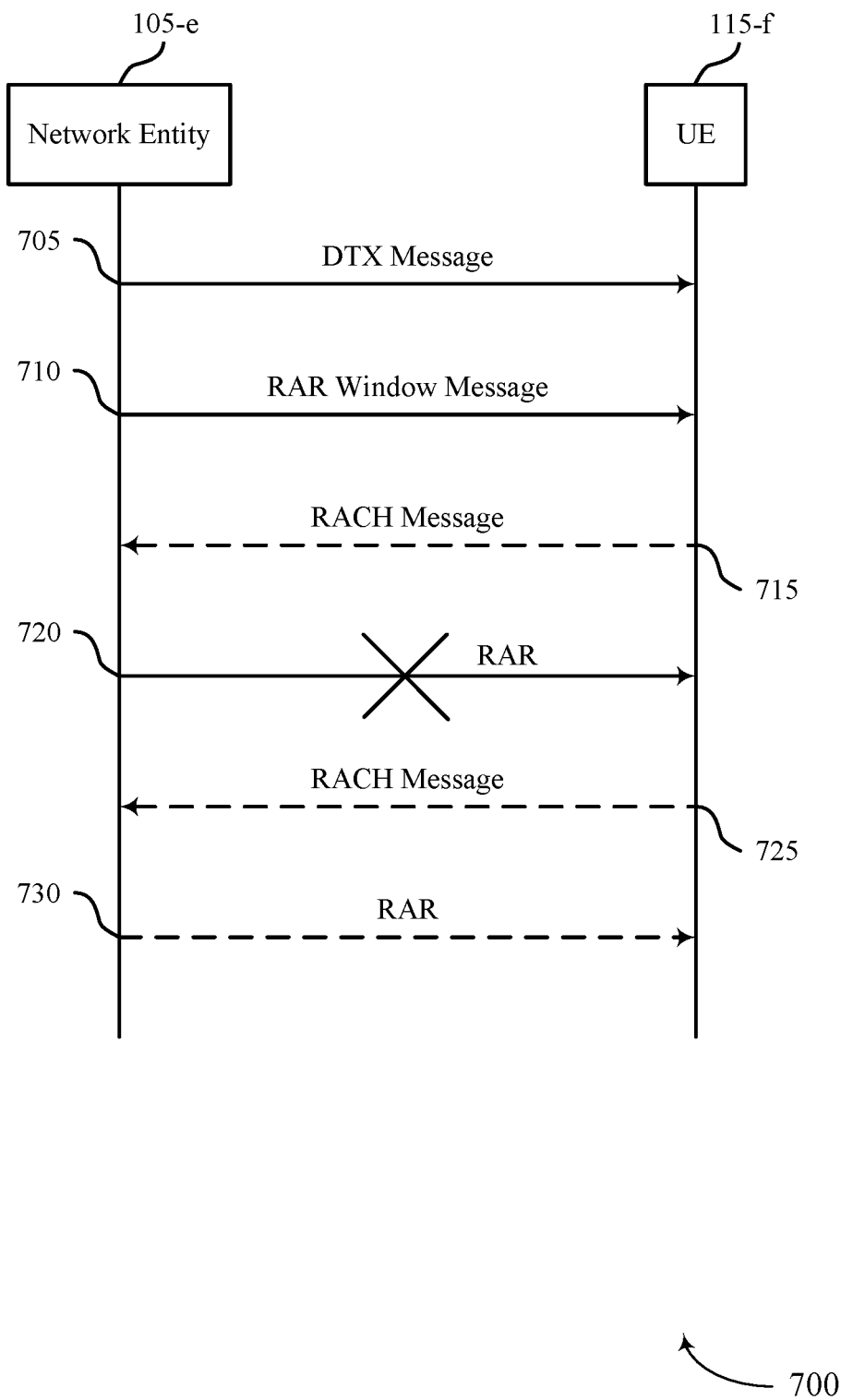

FIG. 7 illustrates an example of a process flow 700 that supports a cell DTX-based RAR window configuration in accordance with one or more aspects of the present disclosure. The process flow 700 may be implemented by aspects of the wireless communications systems 100 or 300. For example, the process flow 700 may illustrate communication between a UE 115-*f* and a network entity 105-*e*, which may be examples of corresponding devices described herein, including with reference to FIGS. 1 through 5E.

In the following description of the process flow 700, the operations may be performed in a different order than the order shown. Specific operations also may be left out of the process flow 700, or other operations may be added to the process flow 700. Further, although some operations or signaling may be shown to occur at different times for discussion purposes, these operations may actually occur at the same time.

At 705, the network entity 105-*e* may transmit a DTX message to the UE 115-*f* that indicates one or more parameters for a DTX cycle associated with a serving cell (e.g., a DTX cycle according to which the network entity 105-*e* that supports the serving cell operates). The one or more parameters may indicate various timing information for the DTX cycle, such as a duration of the DTX cycle, a duration a DTX active duration of the DTX cycle, a duration of a DTX inactive duration of the DTX cycle, or a combination thereof, among other information that may be indicated via the DTX message.

At 710, the network entity 105-*e* may transmit a RAR window message to the UE 115-*f* that indicates timing information for one or more RAR windows associated with transmission of a RACH message (e.g., a RACH preamble) that triggers a RAR. For example, the RAR window message may indicate a duration of the one or more RAR windows and a timing of the one or more RAR windows relative to a given RO via which the RACH message may be transmitted.

At 715, the UE 115-*f* may transmit the RACH message to the network entity 105-*e*. For example, the UE 115-*f* may transmit the RACH message during an RO, where a RAR window corresponding to the RO may be misaligned with the DTX active duration based on the timing information for the RAR window and a time of the transmission of the RACH message (e.g., a time of the RO).

In some examples, a rule associated with managing RAR window and DTX active duration misalignment may indicate that the UE 115-*f* is to avoid transmitting the RACH message during the RO if the corresponding RAR window will be misaligned with the DTX active duration. Here, the UE 115-*f* may refrain from transmitting the RACH message during the RO in accordance with the rule, as described with reference to FIG. 4C.

At 720, the network entity 105-*e* and the UE 115-*f* may drop communication of the RAR triggered in response to the RACH message. For example, the rule may (e.g., instead) indicate that a RAR window that is misaligned with the DTX active duration is to be dropped by the network entity 105-*e* and the UE 115-*f*. Here, the UE 115-*f* may refrain from monitoring for and receiving the RAR during the RAR window, and the network entity 105-*e* may refrain from transmitting (e.g., drop transmission of) the RAR based on the RAR window being misaligned with the DTX active duration, as described with reference to FIG. 4B.

At 725, the UE 115-*f* may retransmit the RACH message. For example, the rule may indicate that the UE 115-*f* is to retransmit the RACH message during a subsequent RO if the RAR window and the DTX active duration are misaligned. Accordingly, the UE 115-*f* may retransmit the RACH message during a second RO subsequent to the RO in accordance with the rule.

At 730, the network entity 105-*e* may transmit the RAR during a second RAR window that is aligned with the DTX active duration. In some examples, the network entity 105-*e* may transmit the RAR in response to the retransmission of the RACH message. In some examples, the timing information for the one or more RAR windows may indicate a second RAR window subsequent to the misaligned RAR window, where the second RAR window is aligned with the DTX active duration. In some examples, the rule may indicate that the network entity 105-*e* may transmit the RAR during a subsequent RAR window that is aligned with the DTX active duration. Here, the network entity 105-*e* may transmit the RAR in response to the RACH message (e.g., the original RACH message transmission) during the second RAR window.

Figure 8:
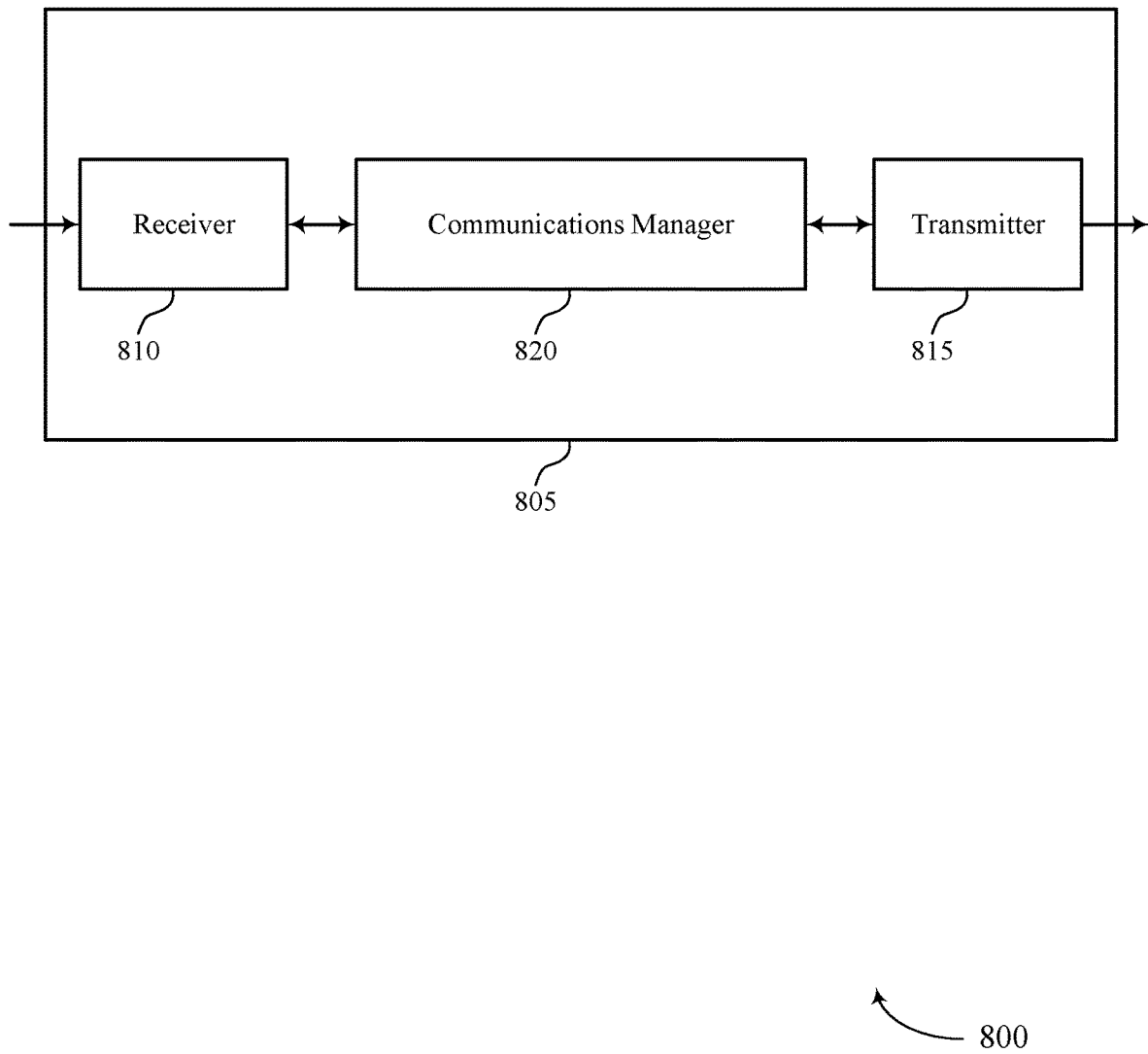
FIGS. 8 and 9 illustrate block diagrams of devices that support a cell DTX-based RAR window configuration in accordance with one or more aspects of the present disclosure.

FIG. 8 illustrates a block diagram 800 of a device 805 that supports a cell DTX-based RAR window configuration in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to a cell DTX-based RAR window configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a cell DTX-based RAR window configuration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of a cell DTX-based RAR window configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving a first control message that indicates one or more parameters for a DTX cycle associated with a serving cell, the DTX cycle including an active duration of the serving cell and an inactive duration of the serving cell. The communications manager 820 may be configured as or otherwise support a means for receiving a second control message that indicates timing information for a RAR window associated with transmission of a RACH message that triggers a RAR message. The communications manager 820 may be configured as or otherwise support a means for receiving the RAR message during the RAR window in accordance with an alignment rule to align at least one boundary of the RAR window with at least one boundary of the active duration.

Additionally, or alternatively, the communications manager 820 may support wireless communication at a UE in accordance with examples as disclosed herein. For example, the communications manager 820 may be configured as or otherwise support a means for receiving a first control message that indicates one or more parameters for a DTX cycle associated with a serving cell, the DTX cycle including an active duration of the serving cell and an inactive duration of the serving cell. The communications manager 820 may be configured as or otherwise support a means for receiving a second control message that indicates timing information for one or more RAR windows associated with transmission of a RACH message that triggers a RAR message. The communications manager 820 may be configured as or otherwise support a means for refraining from receiving the RAR message in a first RAR window of the one or more RAR windows in accordance with a rule based on the active duration and at least the first RAR window being misaligned.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
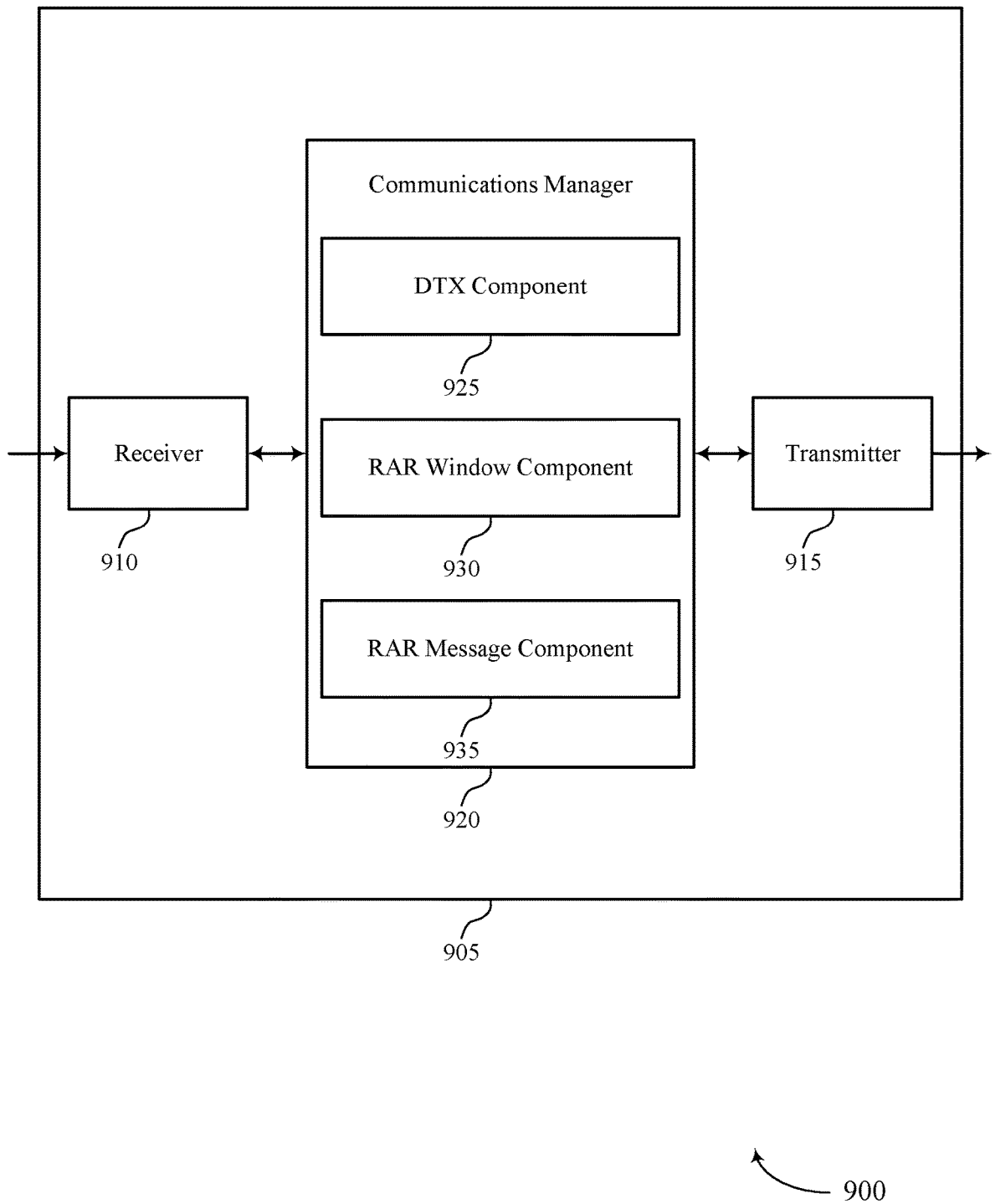

FIG. 9 illustrates a block diagram 900 of a device 905 that supports a cell DTX-based RAR window configuration in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a cell DTX-based RAR window configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a cell DTX-based RAR window configuration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of a cell DTX-based RAR window configuration as described herein. For example, the communications manager 920 may include a DTX component 925, a RAR window component 930, a RAR message component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The DTX component 925 may be configured as or otherwise support a means for receiving a first control message that indicates one or more parameters for a DTX cycle associated with a serving cell, the DTX cycle including an active duration of the serving cell and an inactive duration of the serving cell. The RAR window component 930 may be configured as or otherwise support a means for receiving a second control message that indicates timing information for a RAR window associated with transmission of a RACH message that triggers a RAR message. The RAR message component 935 may be configured as or otherwise support a means for receiving the RAR message during the RAR window in accordance with an alignment rule to align at least one boundary of the RAR window with at least one boundary of the active duration.

Additionally, or alternatively, the communications manager 920 may support wireless communication at a UE in accordance with examples as disclosed herein. The DTX component 925 may be configured as or otherwise support a means for receiving a first control message that indicates one or more parameters for a DTX cycle associated with a serving cell, the DTX cycle including an active duration of the serving cell and an inactive duration of the serving cell. The RAR window component 930 may be configured as or otherwise support a means for receiving a second control message that indicates timing information for one or more RAR windows associated with transmission of a RACH message that triggers a RAR message. The RAR message component 935 may be configured as or otherwise support a means for refraining from receiving the RAR message in a first RAR window of the one or more RAR windows in accordance with a rule based on the active duration and at least the first RAR window being misaligned.

Figure 10:
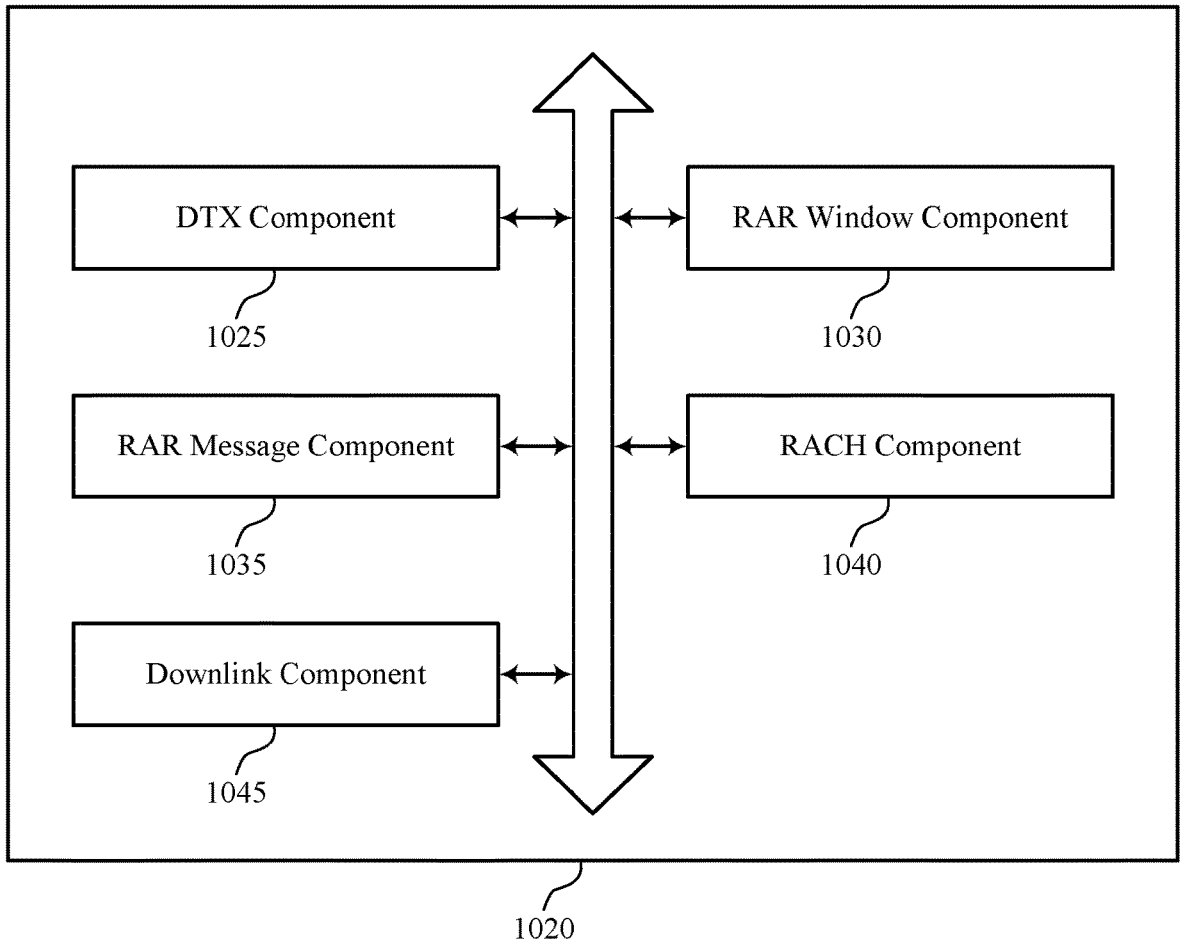
FIG. 10 illustrates a block diagram of a communications manager that supports a cell DTX-based RAR window configuration in accordance with one or more aspects of the present disclosure.

FIG. 10 illustrates a block diagram 1000 of a communications manager 1020 that supports a cell DTX-based RAR window configuration in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of a cell DTX-based RAR window configuration as described herein. For example, the communications manager 1020 may include a DTX component 1025, a RAR window component 1030, a RAR message component 1035, a RACH component 1040, a downlink component 1045, or any combination thereof. Each of these components may communicate, directly or indirectly, with one another (e.g., via one or more buses).

The communications manager 1020 may support wireless communication at a UE in accordance with examples as disclosed herein. The DTX component 1025 may be configured as or otherwise support a means for receiving a first control message that indicates one or more parameters for a DTX cycle associated with a serving cell, the DTX cycle including an active duration of the serving cell and an inactive duration of the serving cell. The RAR window component 1030 may be configured as or otherwise support a means for receiving a second control message that indicates timing information for a RAR window associated with transmission of a RACH message that triggers a RAR message. The RAR message component 1035 may be configured as or otherwise support a means for receiving the RAR message during the RAR window in accordance with an alignment rule to align at least one boundary of the RAR window with at least one boundary of the active duration.

In some examples, the RACH component 1040 may be configured as or otherwise support a means for transmitting the RACH message that triggers the RAR message, the at least one boundary of the RAR window being misaligned with the at least one boundary of the active duration based on a time of the transmission of the RACH message, where the RAR window, the active duration, or a combination thereof, are adjusted in accordance with the alignment rule based on the misalignment.

In some examples, the RAR window component 1030 may be configured as or otherwise support a means for adjusting, in accordance with the alignment rule, the RAR window to align a start boundary of the RAR window with a start boundary of the active duration based on, prior to the adjustment, the start boundary of the RAR window being before the start boundary of the active duration.

In some examples, the RAR window component 1030 may be configured as or otherwise support a means for delaying, in accordance with the alignment rule, the RAR window to align a start boundary of the RAR window with a start boundary of the active duration based on, prior to the delay, the start boundary of the RAR window being before the start boundary of the active duration.

In some examples, the RAR window component 1030 may be configured as or otherwise support a means for applying, in accordance with the alignment rule, a time offset to the RAR window to align a start boundary of the RAR window with a start boundary of the active duration based on the start boundary of the RAR window being before the start boundary of the active duration prior to the application of the time offset.

In some examples, the RAR window component 1030 may be configured as or otherwise support a means for truncating, in accordance with the alignment rule, the RAR window to align a start boundary of the RAR window with a start boundary of the active duration based on the start boundary of the RAR window being before the start boundary of the active duration prior to the truncation.

In some examples, the RAR window component 1030 may be configured as or otherwise support a means for truncating, in accordance with the alignment rule, the RAR window to align an end boundary of the RAR window with an end boundary of the active duration based on the end boundary of the RAR window being after the end boundary of the active duration prior to the truncation.

In some examples, the active duration is extended to at least an end boundary of the RAR window in accordance with the alignment rule based on the end boundary of the RAR window being after an end boundary of the active duration prior to the extension of the active duration.

In some examples, the RAR window component 1030 may be configured as or otherwise support a means for adjusting, in accordance with the alignment rule, the end boundary of the RAR window to align with the end boundary of the active duration based on the extension of the active duration.

In some examples, a portion of the active duration that was extended is specific to communication of the RAR message and excludes communication of other messages.

In some examples, the downlink component 1045 may be configured as or otherwise support a means for receiving a downlink message during a portion of the active duration that was extended.

Additionally, or alternatively, the communications manager 1020 may support wireless communication at a UE in accordance with examples as disclosed herein. In some examples, the DTX component 1025 may be configured as or otherwise support a means for receiving a first control message that indicates one or more parameters for a DTX cycle associated with a serving cell, the DTX cycle including an active duration of the serving cell and an inactive duration of the serving cell. In some examples, the RAR window component 1030 may be configured as or otherwise support a means for receiving a second control message that indicates timing information for one or more RAR windows associated with transmission of a RACH message that triggers a RAR message. In some examples, the RAR message component 1035 may be configured as or otherwise support a means for refraining from receiving the RAR message in a first RAR window of the one or more RAR windows in accordance with a rule based on the active duration and at least the first RAR window being misaligned.

In some examples, the RACH component 1040 may be configured as or otherwise support a means for transmitting the RACH message during a first RACH occasion, the first RAR window and the active duration being misaligned based on the timing information and a timing of the first RACH occasion. In some examples, the RACH component 1040 may be configured as or otherwise support a means for retransmitting the RACH message during a second RACH occasion based on the refraining.

In some examples, the RAR message component 1035 may be configured as or otherwise support a means for receiving the RAR message in a second RAR window of the one or more RAR windows in accordance with the rule based on the active duration and the second RAR window being aligned.

In some examples, the RACH component 1040 may be configured as or otherwise support a means for refraining from transmitting the RACH message during a RACH occasion based on the active duration and the first RAR window corresponding to the RACH occasion being misaligned.

In some examples, the RACH component 1040 may be configured as or otherwise support a means for transmitting the RACH message during a second RACH occasion based on the active duration and a second RAR window corresponding to the second RACH occasion being aligned. In some examples, the RAR message component 1035 may be configured as or otherwise support a means for receiving the RAR message during the second RAR window.

In some examples, to support refraining from receiving the RAR message based at least in part on the active duration and at least the first RAR window being misaligned, the RAR message component 1035 may be configured as or otherwise support a means for refraining from receiving the RAR message based on a start boundary of the first RAR window being before a start boundary of the active duration.

Figure 11:
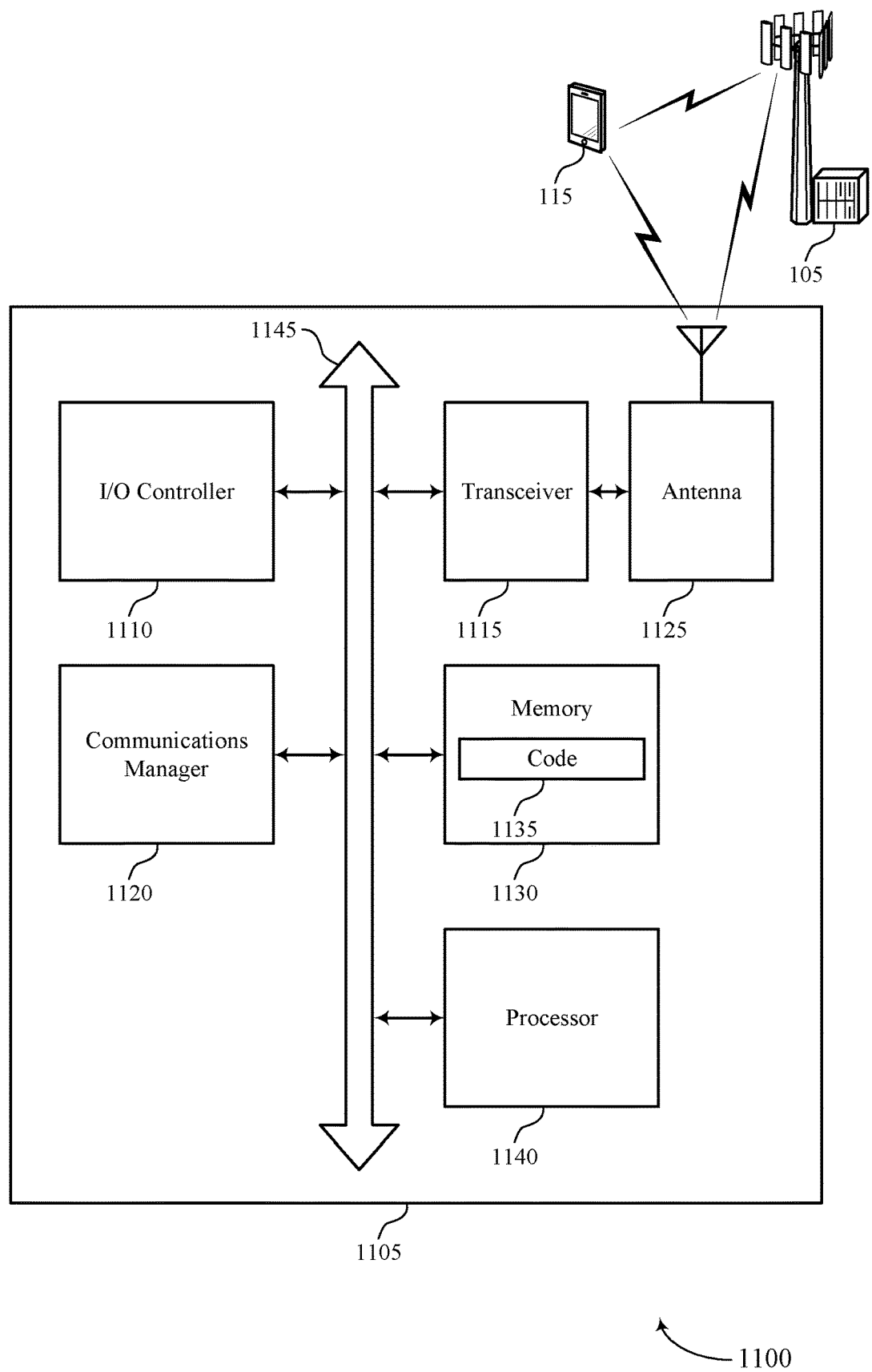
FIG. 11 illustrates a diagram of a system including a device that supports a cell DTX-based RAR window configuration in accordance with one or more aspects of the present disclosure.

FIG. 11 illustrates a diagram of a system 1100 including a device 1105 that supports a cell DTX-based RAR window configuration in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a cell DTX-based RAR window configuration). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a first control message that indicates one or more parameters for a DTX cycle associated with a serving cell, the DTX cycle including an active duration of the serving cell and an inactive duration of the serving cell. The communications manager 1120 may be configured as or otherwise support a means for receiving a second control message that indicates timing information for a RAR window associated with transmission of a RACH message that triggers a RAR message. The communications manager 1120 may be configured as or otherwise support a means for receiving the RAR message during the RAR window in accordance with an alignment rule to align at least one boundary of the RAR window with at least one boundary of the active duration.

Additionally, or alternatively, the communications manager 1120 may support wireless communication at a UE in accordance with examples as disclosed herein. For example, the communications manager 1120 may be configured as or otherwise support a means for receiving a first control message that indicates one or more parameters for a DTX cycle associated with a serving cell, the DTX cycle including an active duration of the serving cell and an inactive duration of the serving cell. The communications manager 1120 may be configured as or otherwise support a means for receiving a second control message that indicates timing information for one or more RAR windows associated with transmission of a RACH message that triggers a RAR message. The communications manager 1120 may be configured as or otherwise support a means for refraining from receiving the RAR message in a first RAR window of the one or more RAR windows in accordance with a rule based on the active duration and at least the first RAR window being misaligned.

By including or configuring the communications manager 1120 in accordance with examples as described herein, the device 1105 may support techniques for reduced power consumption, more efficient utilization of communication resources, increased coordination between devices, and longer battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of a cell DTX-based RAR window configuration as described herein, or the processor 1140 and the memory 1130 may be otherwise configured to perform or support such operations.

Figure 12:
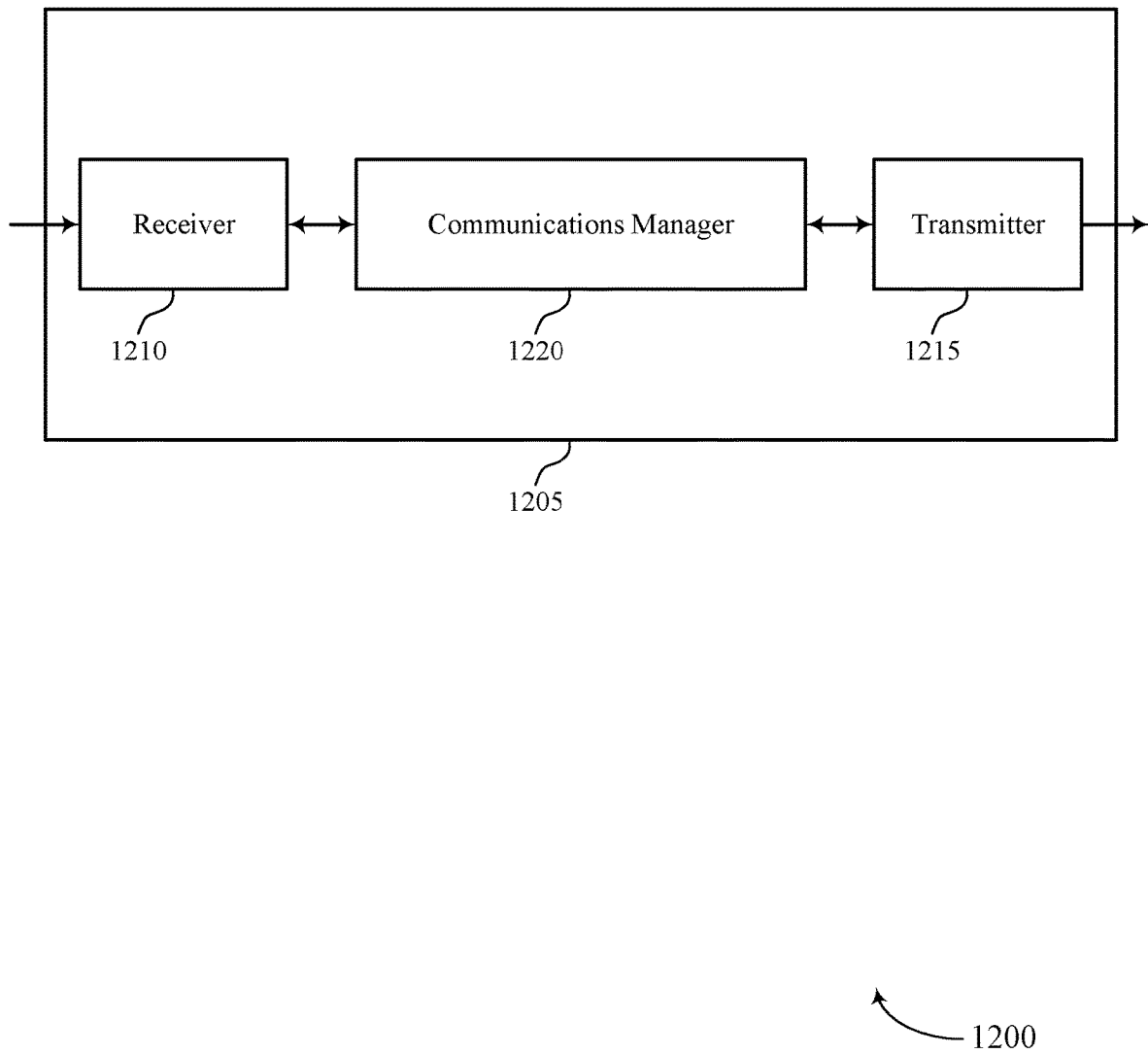
FIGS. 12 and 13 illustrate block diagrams of devices that support a cell DTX-based RAR window configuration in accordance with one or more aspects of the present disclosure.

FIG. 12 illustrates a block diagram 1200 of a device 1205 that supports a cell DTX-based RAR window configuration in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of a cell DTX-based RAR window configuration as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for outputting a first control message that indicates one or more parameters for a DTX cycle associated with a serving cell, the DTX cycle including an active duration of the serving cell and an inactive duration of the serving cell. The communications manager 1220 may be configured as or otherwise support a means for outputting a second control message that indicates timing information for a RAR window associated with reception of a RACH message that triggers a RAR message. The communications manager 1220 may be configured as or otherwise support a means for outputting the RAR message during the RAR window in accordance with an alignment rule to align at least one boundary of the RAR window with at least one boundary of the active duration.

Additionally, or alternatively, the communications manager 1220 may support wireless communication at a network entity in accordance with examples as disclosed herein. For example, the communications manager 1220 may be configured as or otherwise support a means for outputting a first control message that indicates one or more parameters for a DTX cycle associated with a serving cell, the DTX cycle including an active duration of the serving cell and an inactive duration of the serving cell. The communications manager 1220 may be configured as or otherwise support a means for outputting a second control message that indicates timing information for one or more RAR windows associated with transmission of a RACH message that triggers a RAR message. The communications manager 1220 may be configured as or otherwise support a means for refraining from outputting the RAR message in a first RAR window of the one or more RAR windows in accordance with a rule based on the active duration and at least the first RAR window being misaligned.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
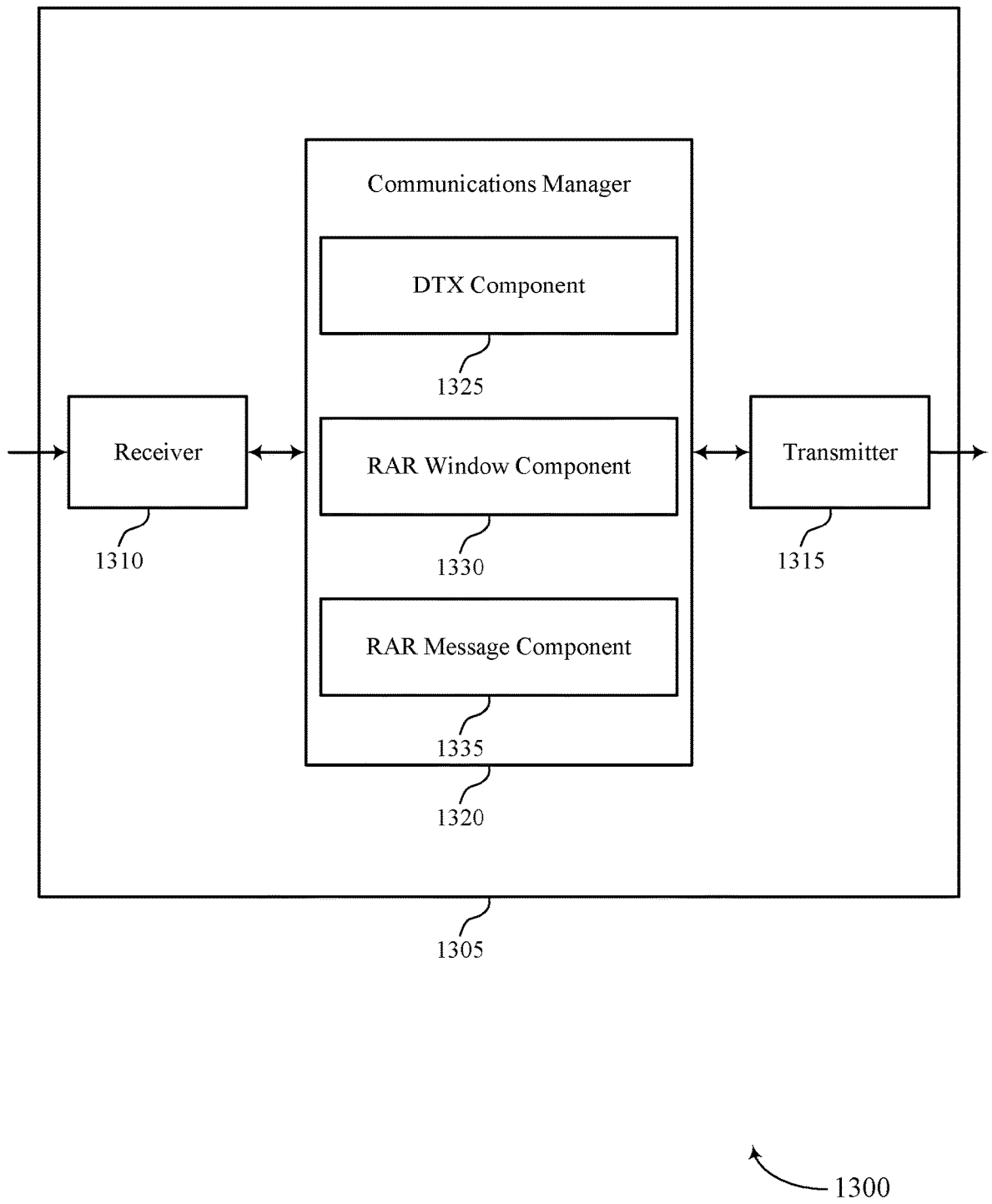

FIG. 13 illustrates a block diagram 1300 of a device 1305 that supports a cell DTX-based RAR window configuration in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of a cell DTX-based RAR window configuration as described herein. For example, the communications manager 1320 may include a DTX component 1325, a RAR window component 1330, a RAR message component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The DTX component 1325 may be configured as or otherwise support a means for outputting a first control message that indicates one or more parameters for a DTX cycle associated with a serving cell, the DTX cycle including an active duration of the serving cell and an inactive duration of the serving cell. The RAR window component 1330 may be configured as or otherwise support a means for outputting a second control message that indicates timing information for a RAR window associated with reception of a RACH message that triggers a RAR message. The RAR message component 1335 may be configured as or otherwise support a means for outputting the RAR message during the RAR window in accordance with an alignment rule to align at least one boundary of the RAR window with at least one boundary of the active duration.

Additionally, or alternatively, the communications manager 1320 may support wireless communication at a network entity in accordance with examples as disclosed herein. The DTX component 1325 may be configured as or otherwise support a means for outputting a first control message that indicates one or more parameters for a DTX cycle associated with a serving cell, the DTX cycle including an active duration of the serving cell and an inactive duration of the serving cell. The RAR window component 1330 may be configured as or otherwise support a means for outputting a second control message that indicates timing information for one or more RAR windows associated with transmission of a RACH message that triggers a RAR message. The RAR message component 1335 may be configured as or otherwise support a means for refraining from outputting the RAR message in a first RAR window of the one or more RAR windows in accordance with a rule based on the active duration and at least the first RAR window being misaligned.

Figure 14:
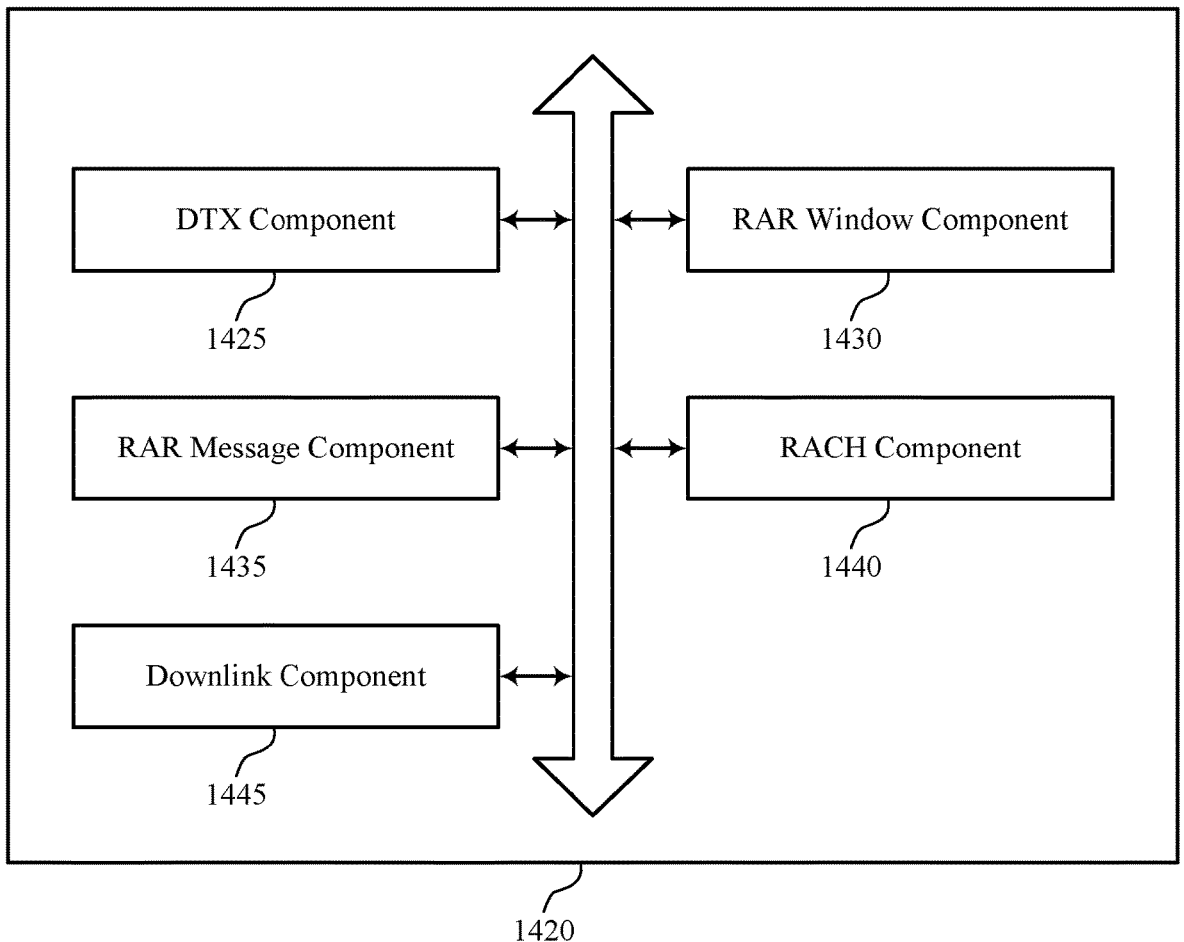
FIG. 14 illustrates a block diagram of a communications manager that supports a cell DTX-based RAR window configuration in accordance with one or more aspects of the present disclosure.

FIG. 14 illustrates a block diagram 1400 of a communications manager 1420 that supports a cell DTX-based RAR window configuration in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of a cell DTX-based RAR window configuration as described herein. For example, the communications manager 1420 may include a DTX component 1425, a RAR window component 1430, a RAR message component 1435, a RACH component 1440, a downlink component 1445, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The DTX component 1425 may be configured as or otherwise support a means for outputting a first control message that indicates one or more parameters for a DTX cycle associated with a serving cell, the DTX cycle including an active duration of the serving cell and an inactive duration of the serving cell. The RAR window component 1430 may be configured as or otherwise support a means for outputting a second control message that indicates timing information for a RAR window associated with reception of a RACH message that triggers a RAR message. The RAR message component 1435 may be configured as or otherwise support a means for outputting the RAR message during the RAR window in accordance with an alignment rule to align at least one boundary of the RAR window with at least one boundary of the active duration.

In some examples, the RACH component 1440 may be configured as or otherwise support a means for receiving the RACH message that triggers the RAR message, the at least one boundary of the RAR window being misaligned with the at least one boundary of the active duration based on a time of the transmission of the RACH message, where the RAR window, the active duration, or a combination thereof, are adjusted in accordance with the alignment rule based on the misalignment.

In some examples, the RAR window component 1430 may be configured as or otherwise support a means for extending the active duration to at least an end boundary of the RAR window in accordance with the alignment rule based on the end boundary of the RAR window being after an end boundary of the active duration prior to the extension of the active duration.

In some examples, the downlink component 1445 may be configured as or otherwise support a means for outputting a downlink message during a portion of the active duration that was extended.

In some examples, a portion of the active duration that was extended is specific to communication of the RAR message and excludes communication of other messages.

In some examples, the end boundary of the RAR window response window is adjusted to align with the end boundary of the active duration based on the extension of the active duration.

In some examples, the RAR window is truncated to align an end boundary of the RAR window with an end boundary of the active duration based on the end boundary of the RAR window being after the end boundary of the active duration prior to the truncation.

In some examples, a time offset is applied to the RAR window to align a start boundary of the RAR window with a start boundary of the active duration based on the start boundary of the RAR window being before the start boundary of the active duration prior to the application of the time offset.

In some examples, the RAR window is truncated to align a start boundary of the RAR window with a start boundary of the active duration based on the start boundary of the RAR window being before the start boundary of the active duration prior to the truncation.

Additionally, or alternatively, the communications manager 1420 may support wireless communication at a network entity in accordance with examples as disclosed herein. In some examples, the DTX component 1425 may be configured as or otherwise support a means for outputting a first control message that indicates one or more parameters for a DTX cycle associated with a serving cell, the DTX cycle including an active duration of the serving cell and an inactive duration of the serving cell. In some examples, the RAR window component 1430 may be configured as or otherwise support a means for outputting a second control message that indicates timing information for one or more RAR windows associated with transmission of a RACH message that triggers a RAR message. In some examples, the RAR message component 1435 may be configured as or otherwise support a means for refraining from outputting the RAR message in a first RAR window of the one or more RAR windows in accordance with a rule based on the active duration and at least the first RAR window being misaligned.

In some examples, the RACH component 1440 may be configured as or otherwise support a means for receiving the RACH message during a first RACH occasion, the first RAR window and the active duration being misaligned based on the timing information and a timing of the first RACH occasion. In some examples, the RACH component 1440 may be configured as or otherwise support a means for receiving a retransmission of the RACH message during a second RACH occasion based on the refraining.

In some examples, the RAR message component 1435 may be configured as or otherwise support a means for outputting the RAR message in a second RAR window of the one or more RAR windows in accordance with the rule based on the active duration and the second RAR window being aligned.

In some examples, to support refraining from outputting the RAR message based at least in part on the active duration and at least the first RAR window being misaligned, the RAR message component 1435 may be configured as or otherwise support a means for refraining from outputting the RAR message based on a start boundary of the first RAR window being before a start boundary of the active duration.

Figure 15:
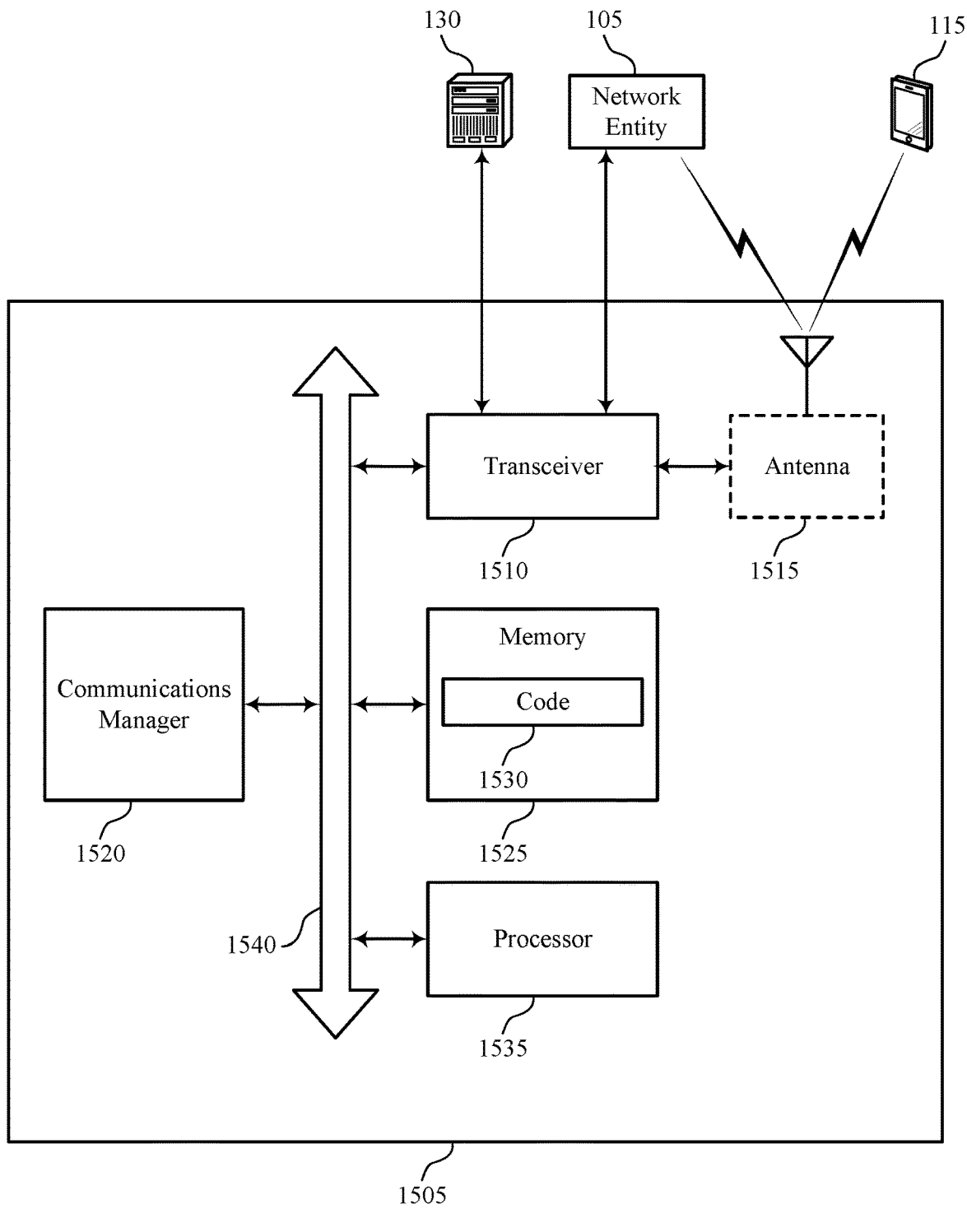
FIG. 15 illustrates a diagram of a system including a device that supports a cell DTX-based RAR window configuration in accordance with one or more aspects of the present disclosure.

FIG. 15 illustrates a diagram of a system 1500 including a device 1505 that supports a cell DTX-based RAR window configuration in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting a cell DTX-based RAR window configuration). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for outputting a first control message that indicates one or more parameters for a DTX cycle associated with a serving cell, the DTX cycle including an active duration of the serving cell and an inactive duration of the serving cell. The communications manager 1520 may be configured as or otherwise support a means for outputting a second control message that indicates timing information for a RAR window associated with reception of a RACH message that triggers a RAR message. The communications manager 1520 may be configured as or otherwise support a means for outputting the RAR message during the RAR window in accordance with an alignment rule to align at least one boundary of the RAR window with at least one boundary of the active duration.

Additionally, or alternatively, the communications manager 1520 may support wireless communication at a network entity in accordance with examples as disclosed herein. For example, the communications manager 1520 may be configured as or otherwise support a means for outputting a first control message that indicates one or more parameters for a DTX cycle associated with a serving cell, the DTX cycle including an active duration of the serving cell and an inactive duration of the serving cell. The communications manager 1520 may be configured as or otherwise support a means for outputting a second control message that indicates timing information for one or more RAR windows associated with transmission of a RACH message that triggers a RAR message. The communications manager 1520 may be configured as or otherwise support a means for refraining from outputting the RAR message in a first RAR window of the one or more RAR windows in accordance with a rule based on the active duration and at least the first RAR window being misaligned.

By including or configuring the communications manager 1520 in accordance with examples as described herein, the device 1505 may support techniques for increased communication reliability, reduced latency, reduced power consumption, more efficient utilization of communication resources, increased coordination between devices, and longer battery life.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of a cell DTX-based RAR window configuration as described herein, or the processor 1535 and the memory 1525 may be otherwise configured to perform or support such operations.

Figure 16:
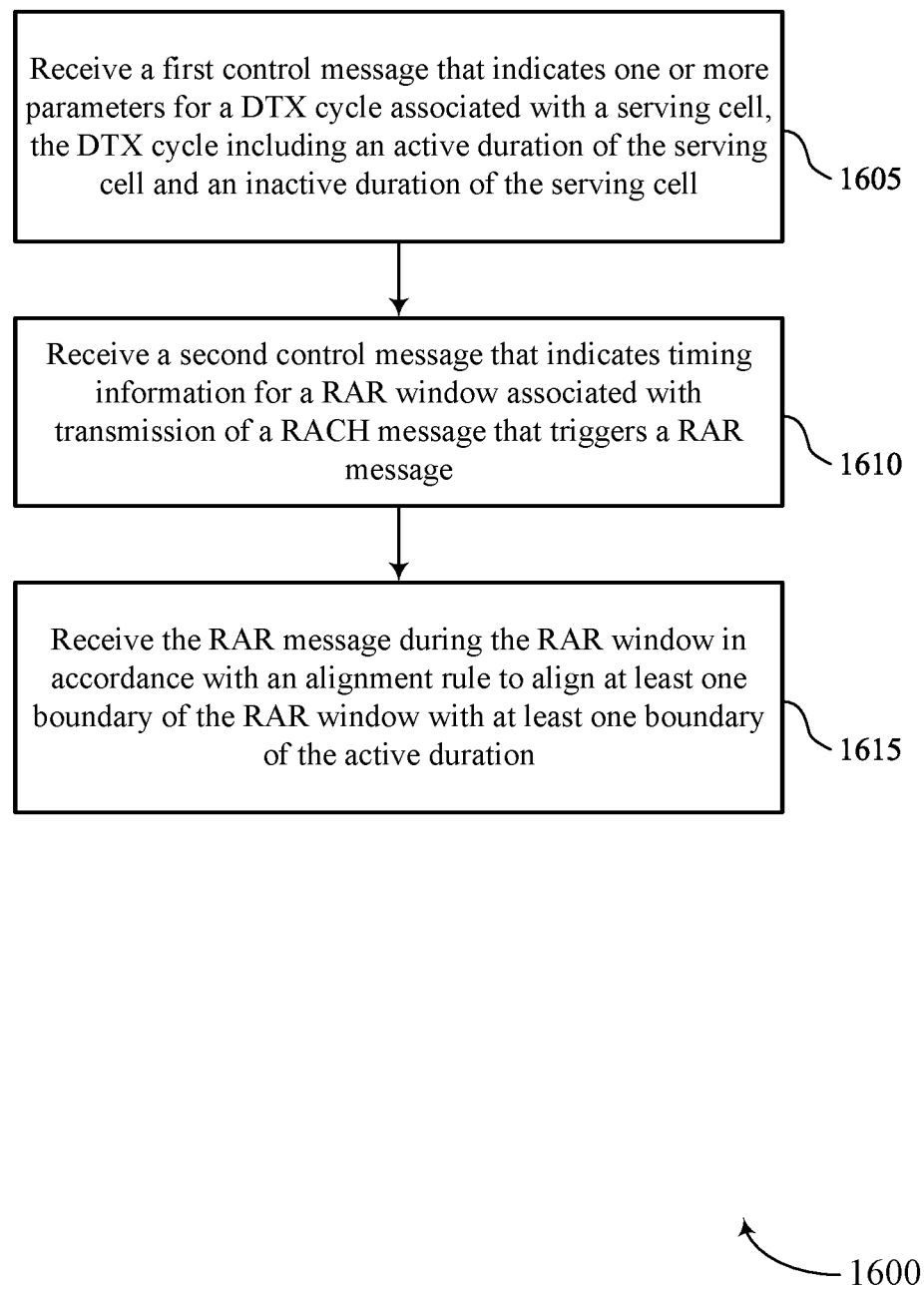
FIGS. 16 through 25 illustrate flowcharts showing methods that support a cell DTX-based RAR window configuration in accordance with one or more aspects of the present disclosure.

FIG. 16 illustrates a flowchart showing a method 1600 that supports a cell DTX-based RAR window configuration in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a first control message that indicates one or more parameters for a DTX cycle associated with a serving cell, the DTX cycle including an active duration of the serving cell and an inactive duration of the serving cell. The operations of 1605 may be performed in accordance with examples as disclosed herein. In some examples, aspects of the operations of 1605 may be performed by a DTX component 1025 as described with reference to FIG. 10.

At 1610, the method may include receiving a second control message that indicates timing information for a RAR window associated with transmission of a RACH message that triggers a RAR message. The operations of 1610 may be performed in accordance with examples as disclosed herein. In some examples, aspects of the operations of 1610 may be performed by a RAR window component 1030 as described with reference to FIG. 10.

At 1615, the method may include receiving the RAR message during the RAR window in accordance with an alignment rule to align at least one boundary of the RAR window with at least one boundary of the active duration. The operations of 1615 may be performed in accordance with examples as disclosed herein. In some examples, aspects of the operations of 1615 may be performed by a RAR message component 1035 as described with reference to FIG. 10.

Figure 17:
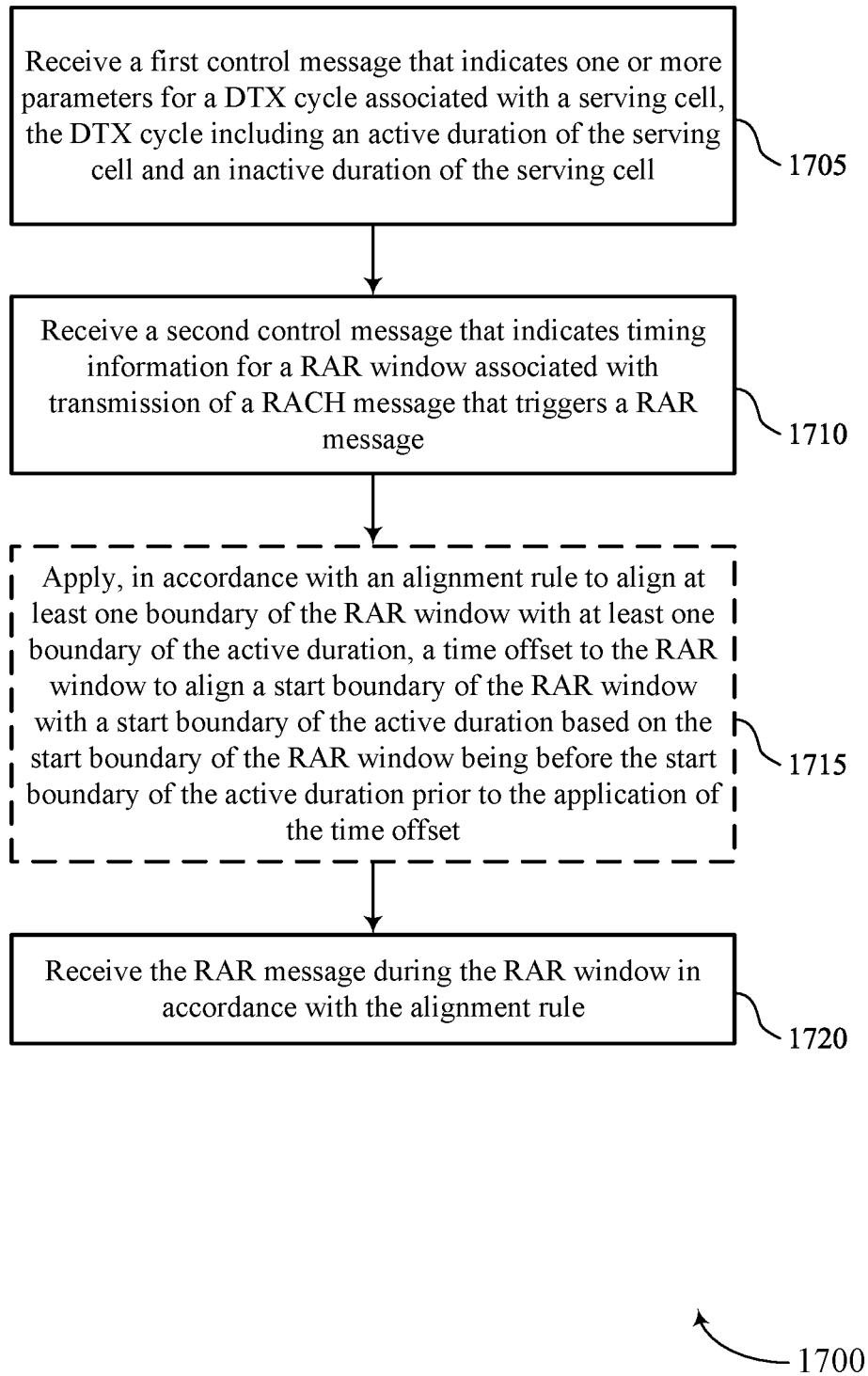

FIG. 17 illustrates a flowchart showing a method 1700 that supports a cell DTX-based RAR window configuration in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a first control message that indicates one or more parameters for a DTX cycle associated with a serving cell, the DTX cycle including an active duration of the serving cell and an inactive duration of the serving cell. The operations of 1705 may be performed in accordance with examples as disclosed herein. In some examples, aspects of the operations of 1705 may be performed by a DTX component 1025 as described with reference to FIG. 10.

At 1710, the method may include receiving a second control message that indicates timing information for a RAR window associated with transmission of a RACH message that triggers a RAR message. The operations of 1710 may be performed in accordance with examples as disclosed herein. In some examples, aspects of the operations of 1710 may be performed by a RAR window component 1030 as described with reference to FIG. 10.

At 1715, the method may include applying, in accordance with an alignment rule to align at least one boundary of the RAR window with at least one boundary of the active duration, a time offset to the RAR window to align a start boundary of the RAR window with a start boundary of the active duration based on the start boundary of the RAR window being before the start boundary of the active duration prior to the application of the time offset. The operations of 1715 may be performed in accordance with examples as disclosed herein. In some examples, aspects of the operations of 1715 may be performed by a RAR window component 1030 as described with reference to FIG. 10.

At 1720, the method may include receiving the RAR message during the RAR window in accordance with the alignment rule. The operations of 1720 may be performed in accordance with examples as disclosed herein. In some examples, aspects of the operations of 1720 may be performed by a RAR message component 1035 as described with reference to FIG. 10.

Figure 18:
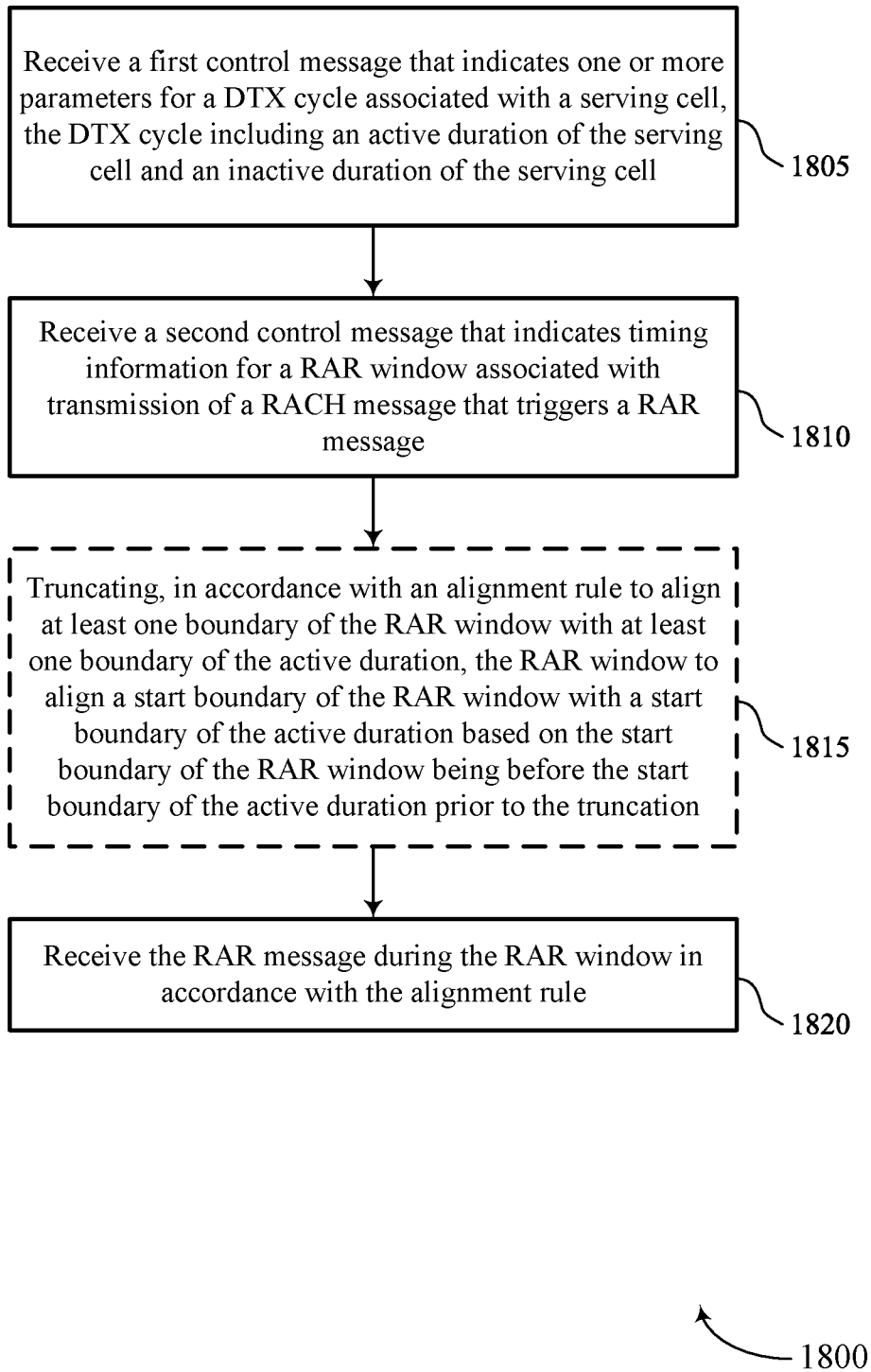

FIG. 18 illustrates a flowchart showing a method 1800 that supports a cell DTX-based RAR window configuration in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a first control message that indicates one or more parameters for a DTX cycle associated with a serving cell, the DTX cycle including an active duration of the serving cell and an inactive duration of the serving cell. The operations of 1805 may be performed in accordance with examples as disclosed herein. In some examples, aspects of the operations of 1805 may be performed by a DTX component 1025 as described with reference to FIG. 10.

At 1810, the method may include receiving a second control message that indicates timing information for a RAR window associated with transmission of a RACH message that triggers a RAR message. The operations of 1810 may be performed in accordance with examples as disclosed herein. In some examples, aspects of the operations of 1810 may be performed by a RAR window component 1030 as described with reference to FIG. 10.

At 1815, the method may include truncating, in accordance with an alignment rule to align at least one boundary of the RAR window with at least one boundary of the active duration, the RAR window to align a start boundary of the RAR window with a start boundary of the active duration based on the start boundary of the RAR window being before the start boundary of the active duration prior to the truncation. The operations of 1815 may be performed in accordance with examples as disclosed herein. In some examples, aspects of the operations of 1815 may be performed by a RAR window component 1030 as described with reference to FIG. 10.

At 1820, the method may include receiving the RAR message during the RAR window in accordance with the alignment rule. The operations of 1820 may be performed in accordance with examples as disclosed herein. In some examples, aspects of the operations of 1820 may be performed by a RAR message component 1035 as described with reference to FIG. 10.

Figure 19:
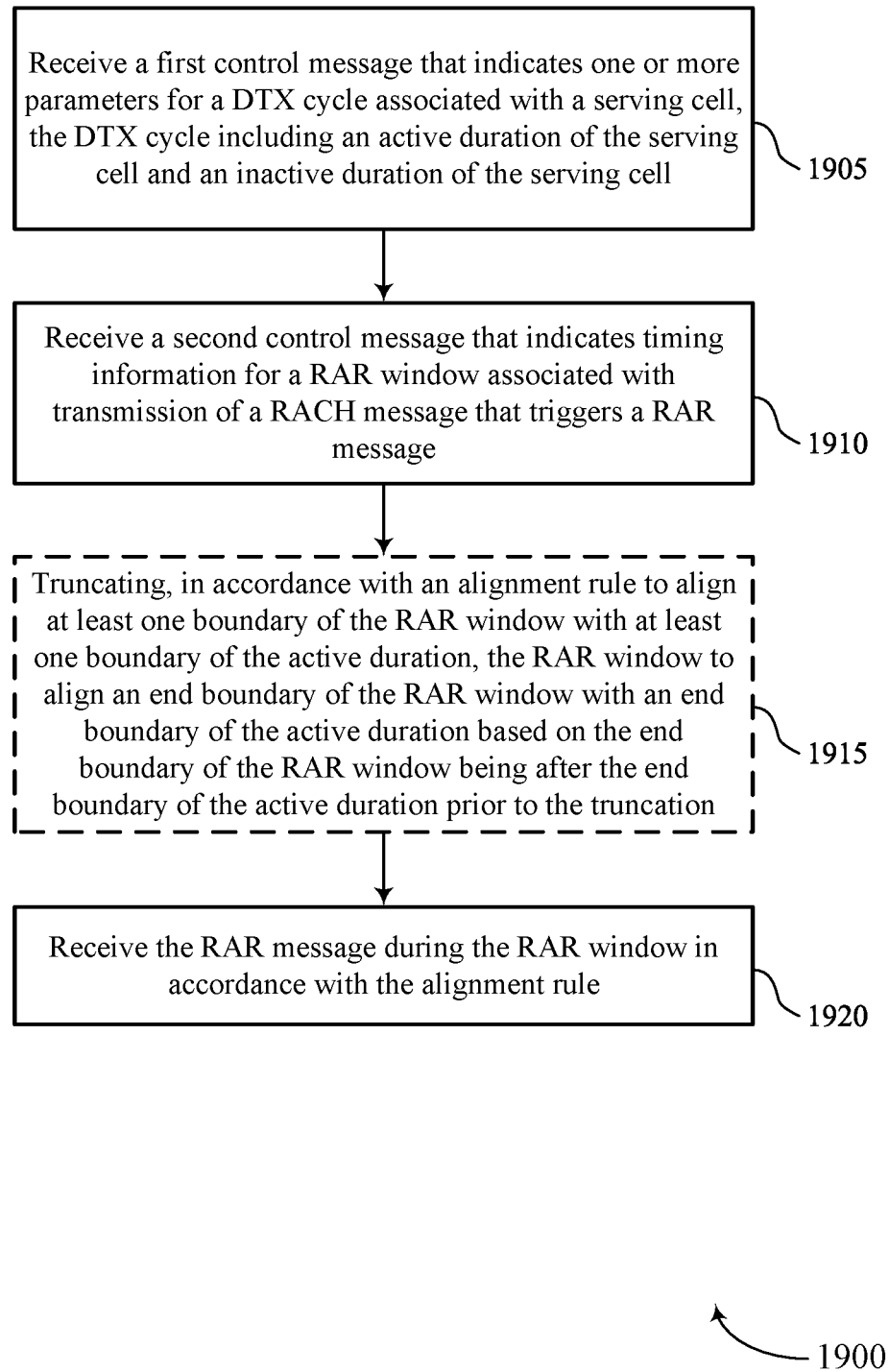

FIG. 19 illustrates a flowchart showing a method 1900 that supports a cell DTX-based RAR window configuration in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a first control message that indicates one or more parameters for a DTX cycle associated with a serving cell, the DTX cycle including an active duration of the serving cell and an inactive duration of the serving cell. The operations of 1905 may be performed in accordance with examples as disclosed herein. In some examples, aspects of the operations of 1905 may be performed by a DTX component 1025 as described with reference to FIG. 10.

At 1910, the method may include receiving a second control message that indicates timing information for a RAR window associated with transmission of a RACH message that triggers a RAR message. The operations of 1910 may be performed in accordance with examples as disclosed herein. In some examples, aspects of the operations of 1910 may be performed by a RAR window component 1030 as described with reference to FIG. 10.

At 1915, the method may include truncating, in accordance with an alignment rule to align at least one boundary of the RAR window with at least one boundary of the active duration, the RAR window to align an end boundary of the RAR window with an end boundary of the active duration based on the end boundary of the RAR window being after the end boundary of the active duration prior to the truncation. The operations of 1915 may be performed in accordance with examples as disclosed herein. In some examples, aspects of the operations of 1915 may be performed by a RAR window component 1030 as described with reference to FIG. 10.

At 1920, the method may include receiving the RAR message during the RAR window in accordance with the alignment rule. The operations of 1920 may be performed in accordance with examples as disclosed herein. In some examples, aspects of the operations of 1920 may be performed by a RAR message component 1035 as described with reference to FIG. 10.

Figure 20:
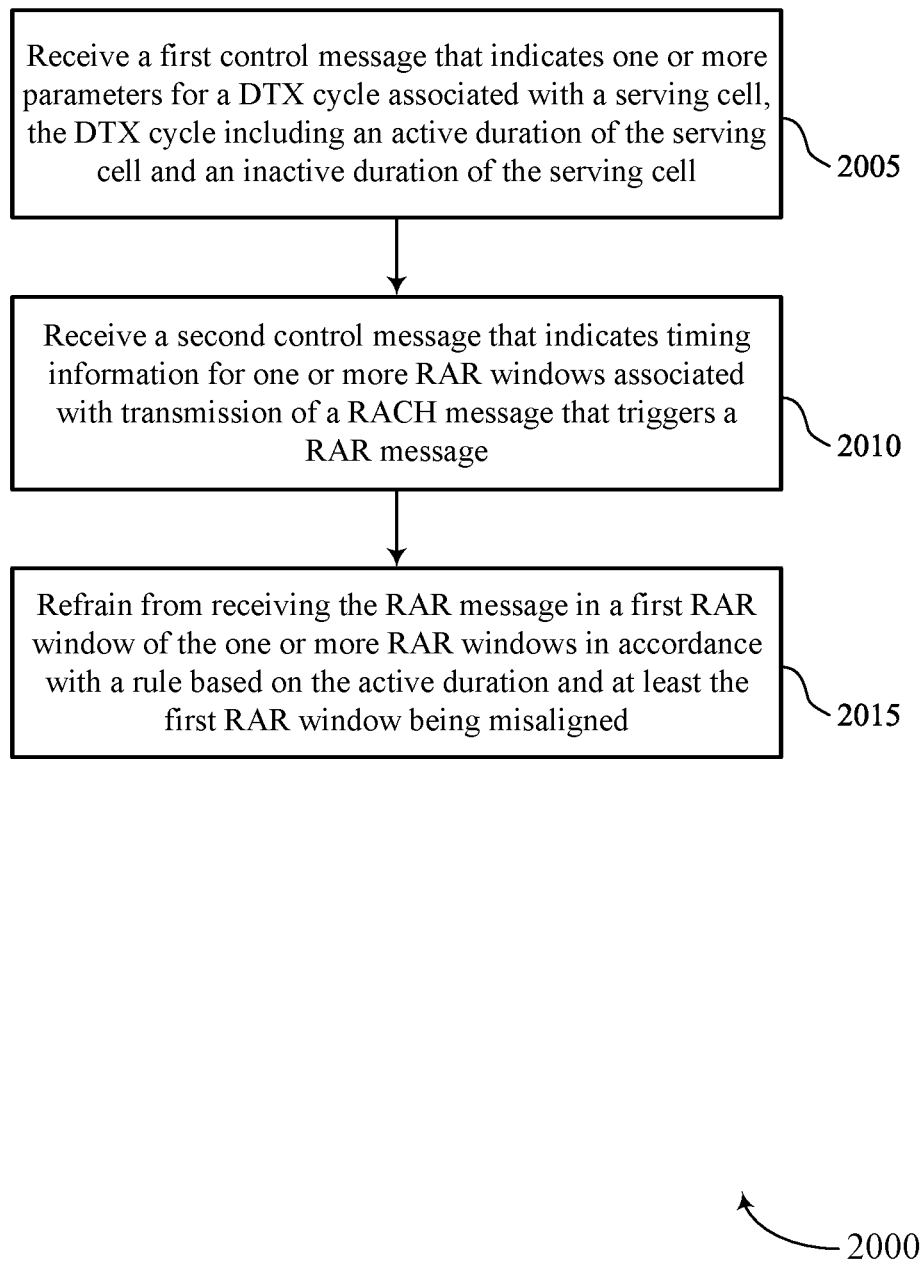

FIG. 20 illustrates a flowchart showing a method 2000 that supports a cell DTX-based RAR window configuration in accordance with one or more aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include receiving a first control message that indicates one or more parameters for a DTX cycle associated with a serving cell, the DTX cycle including an active duration of the serving cell and an inactive duration of the serving cell. The operations of 2005 may be performed in accordance with examples as disclosed herein. In some examples, aspects of the operations of 2005 may be performed by a DTX component 1025 as described with reference to FIG. 10.

At 2010, the method may include receiving a second control message that indicates timing information for one or more RAR windows associated with transmission of a RACH message that triggers a RAR message. The operations of 2010 may be performed in accordance with examples as disclosed herein. In some examples, aspects of the operations of 2010 may be performed by a RAR window component 1030 as described with reference to FIG. 10.

At 2015, the method may include refraining from receiving the RAR message in a first RAR window of the one or more RAR windows in accordance with a rule based on the active duration and at least the first RAR window being misaligned. The operations of 2015 may be performed in accordance with examples as disclosed herein. In some examples, aspects of the operations of 2015 may be performed by a RAR message component 1035 as described with reference to FIG. 10.

Figure 21:
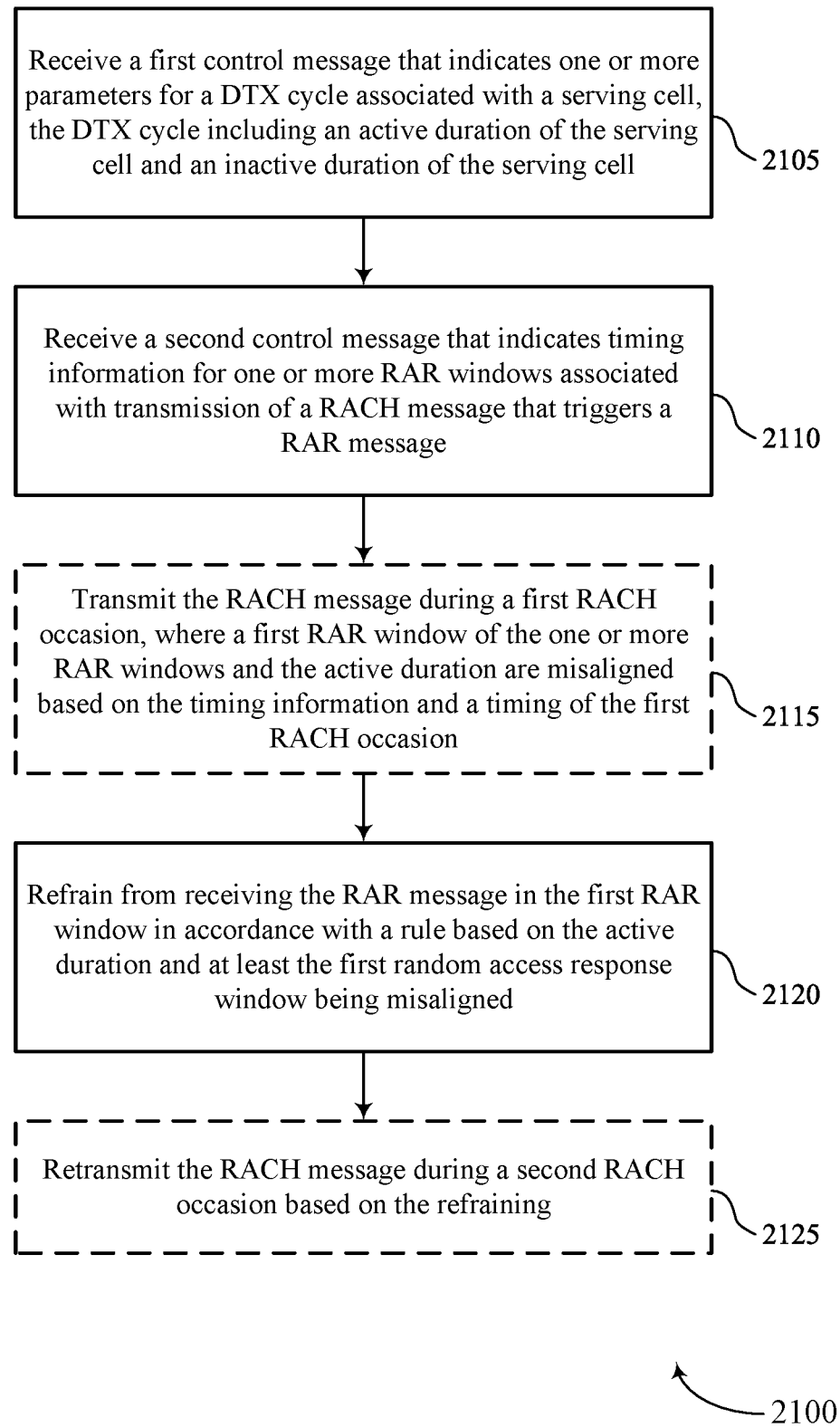

FIG. 21 illustrates a flowchart showing a method 2100 that supports a cell DTX-based RAR window configuration in accordance with one or more aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2105, the method may include receiving a first control message that indicates one or more parameters for a DTX cycle associated with a serving cell, the DTX cycle including an active duration of the serving cell and an inactive duration of the serving cell. The operations of 2105 may be performed in accordance with examples as disclosed herein. In some examples, aspects of the operations of 2105 may be performed by a DTX component 1025 as described with reference to FIG. 10.

At 2110, the method may include receiving a second control message that indicates timing information for one or more RAR windows associated with transmission of a RACH message that triggers a RAR message. The operations of 2110 may be performed in accordance with examples as disclosed herein. In some examples, aspects of the operations of 2110 may be performed by a RAR window component 1030 as described with reference to FIG. 10.

At 2115, the method may include transmitting the RACH message during a first RACH occasion, where a first RAR window of the one or more RAR windows and the active duration are misaligned based on the timing information and a timing of the first RACH occasion. The operations of 2115 may be performed in accordance with examples as disclosed herein. In some examples, aspects of the operations of 2115 may be performed by a RACH component 1040 as described with reference to FIG. 10.

At 2120, the method may include refraining from receiving the RAR message in a first RAR window of the one or more RAR windows in accordance with a rule based on the active duration and at least the first RAR window being misaligned. The operations of 2120 may be performed in accordance with examples as disclosed herein. In some examples, aspects of the operations of 2120 may be performed by a RAR message component 1035 as described with reference to FIG. 10.

At 2125, the method may include retransmitting the RACH message during a second RACH occasion based on the refraining. The operations of 2125 may be performed in accordance with examples as disclosed herein. In some examples, aspects of the operations of 2125 may be performed by a RACH component 1040 as described with reference to FIG. 10.

Figure 22:
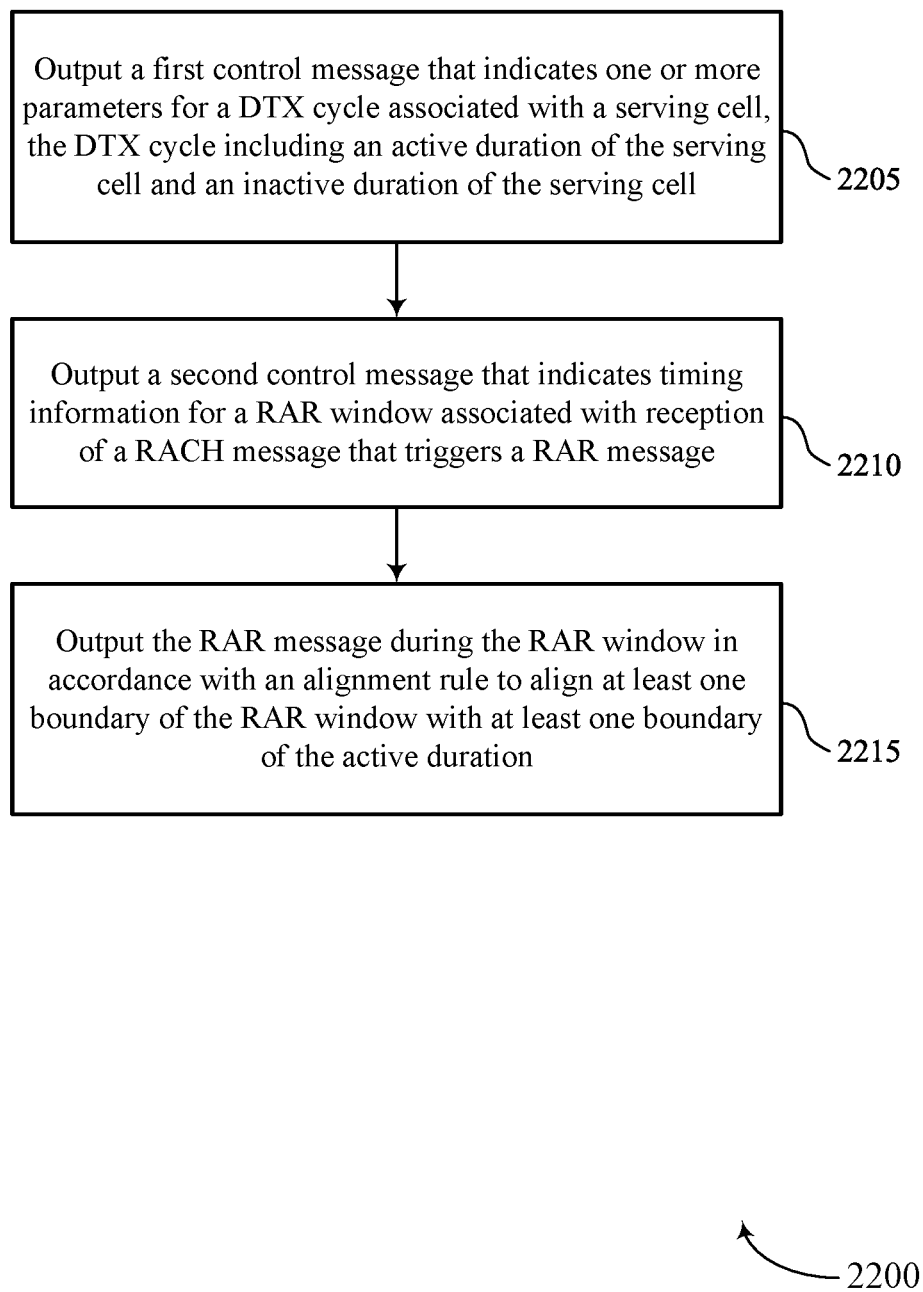

FIG. 22 illustrates a flowchart showing a method 2200 that supports a cell DTX-based RAR window configuration in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include outputting a first control message that indicates one or more parameters for a DTX cycle associated with a serving cell, the DTX cycle including an active duration of the serving cell and an inactive duration of the serving cell. The operations of 2205 may be performed in accordance with examples as disclosed herein. In some examples, aspects of the operations of 2205 may be performed by a DTX component 1425 as described with reference to FIG. 14.

At 2210, the method may include outputting a second control message that indicates timing information for a RAR window associated with reception of a RACH message that triggers a RAR message. The operations of 2210 may be performed in accordance with examples as disclosed herein. In some examples, aspects of the operations of 2210 may be performed by a RAR window component 1430 as described with reference to FIG. 14.

At 2215, the method may include outputting the RAR message during the RAR window in accordance with an alignment rule to align at least one boundary of the RAR window with at least one boundary of the active duration. The operations of 2215 may be performed in accordance with examples as disclosed herein. In some examples, aspects of the operations of 2215 may be performed by a RAR message component 1435 as described with reference to FIG. 14.

Figure 23:
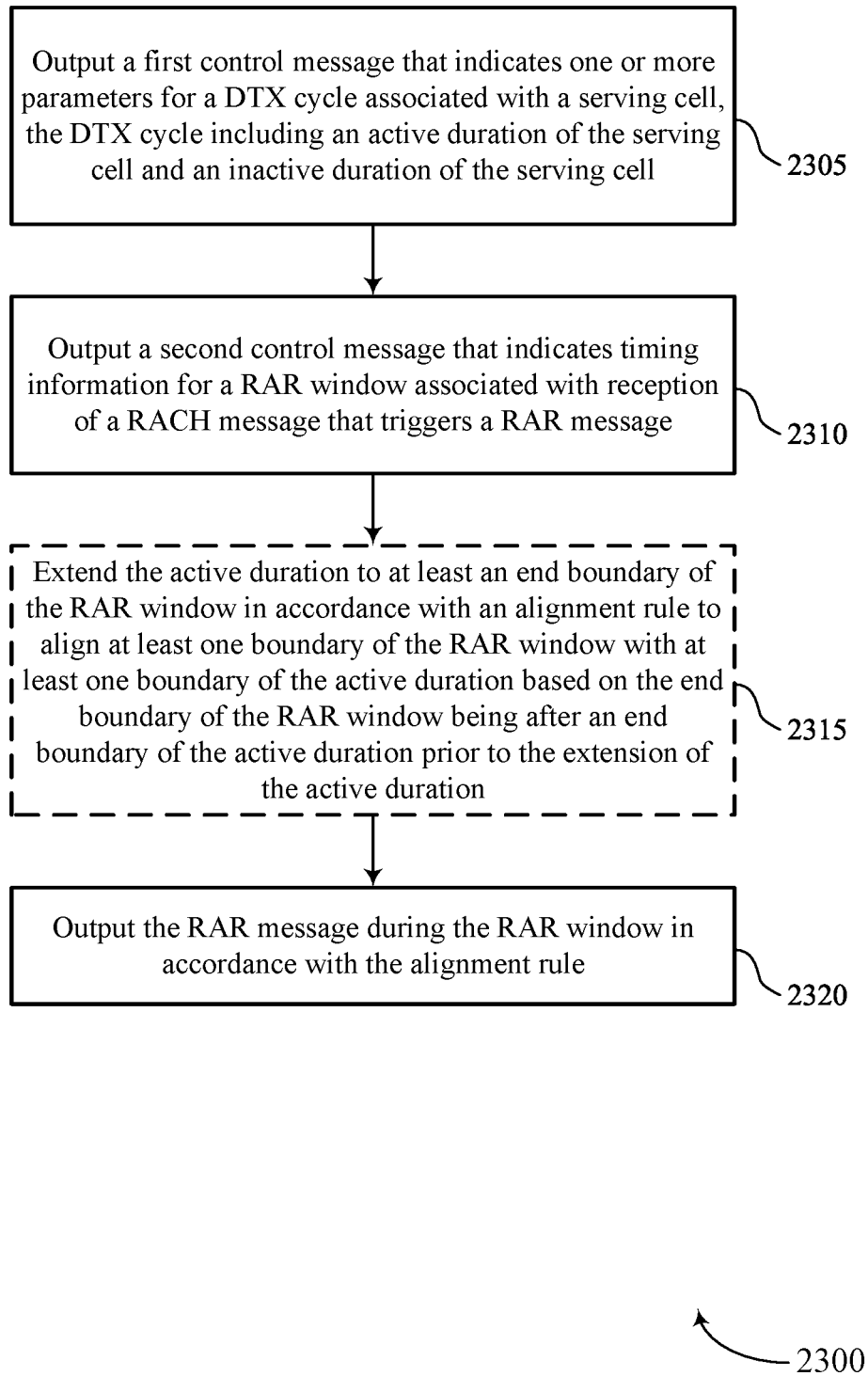

FIG. 23 illustrates a flowchart showing a method 2300 that supports a cell DTX-based RAR window configuration in accordance with one or more aspects of the present disclosure. The operations of the method 2300 may be implemented by a network entity or its components as described herein. For example, the operations of the method 2300 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include outputting a first control message that indicates one or more parameters for a DTX cycle associated with a serving cell, the DTX cycle including an active duration of the serving cell and an inactive duration of the serving cell. The operations of 2305 may be performed in accordance with examples as disclosed herein. In some examples, aspects of the operations of 2305 may be performed by a DTX component 1425 as described with reference to FIG. 14.

At 2310, the method may include outputting a second control message that indicates timing information for a RAR window associated with reception of a RACH message that triggers a RAR message. The operations of 2310 may be performed in accordance with examples as disclosed herein. In some examples, aspects of the operations of 2310 may be performed by a RAR window component 1430 as described with reference to FIG. 14.

At 2315, the method may include extending the active duration to at least an end boundary of the RAR window in accordance with an alignment rule to align at least one boundary of the RAR window with at least one boundary of the active duration based on the end boundary of the RAR window being after an end boundary of the active duration prior to the extension of the active duration. The operations of 2315 may be performed in accordance with examples as disclosed herein. In some examples, aspects of the operations of 2315 may be performed by a RAR window component 1430 as described with reference to FIG. 14.

At 2320, the method may include outputting the RAR message during the RAR window in accordance with the alignment rule. The operations of 2320 may be performed in accordance with examples as disclosed herein. In some examples, aspects of the operations of 2320 may be performed by a RAR message component 1435 as described with reference to FIG. 14.

Figure 24:
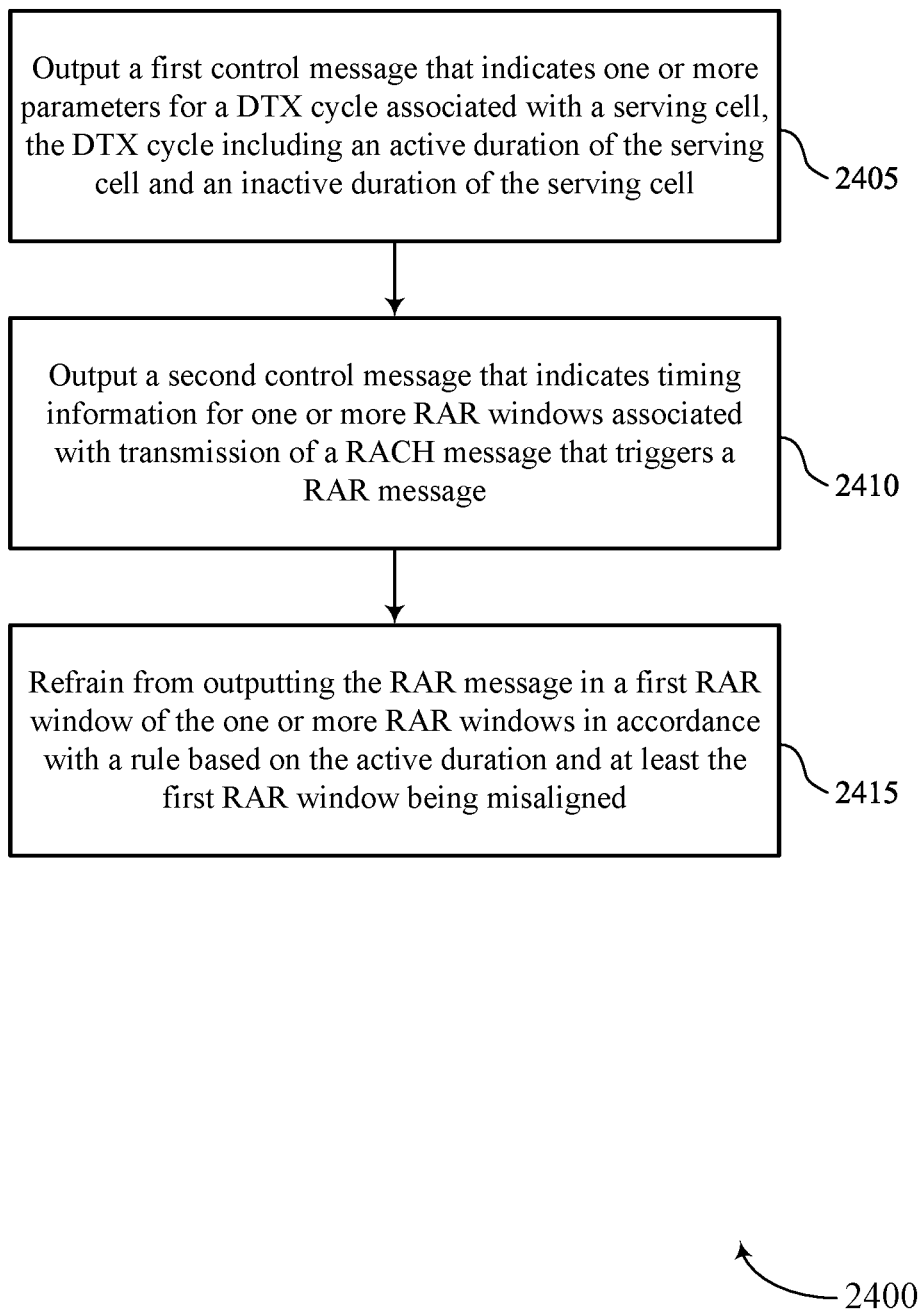

FIG. 24 illustrates a flowchart showing a method 2400 that supports a cell DTX-based RAR window configuration in accordance with one or more aspects of the present disclosure. The operations of the method 2400 may be implemented by a network entity or its components as described herein. For example, the operations of the method 2400 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2405, the method may include outputting a first control message that indicates one or more parameters for a DTX cycle associated with a serving cell, the DTX cycle including an active duration of the serving cell and an inactive duration of the serving cell. The operations of 2405 may be performed in accordance with examples as disclosed herein. In some examples, aspects of the operations of 2405 may be performed by a DTX component 1425 as described with reference to FIG. 14.

At 2410, the method may include outputting a second control message that indicates timing information for one or more RAR windows associated with transmission of a RACH message that triggers a RAR message. The operations of 2410 may be performed in accordance with examples as disclosed herein. In some examples, aspects of the operations of 2410 may be performed by a RAR window component 1430 as described with reference to FIG. 14.

At 2415, the method may include refraining from outputting the RAR message in a first RAR window of the one or more RAR windows in accordance with a rule based on the active duration and at least the first RAR window being misaligned. The operations of 2415 may be performed in accordance with examples as disclosed herein. In some examples, aspects of the operations of 2415 may be performed by a RAR message component 1435 as described with reference to FIG. 14.

Figure 25:
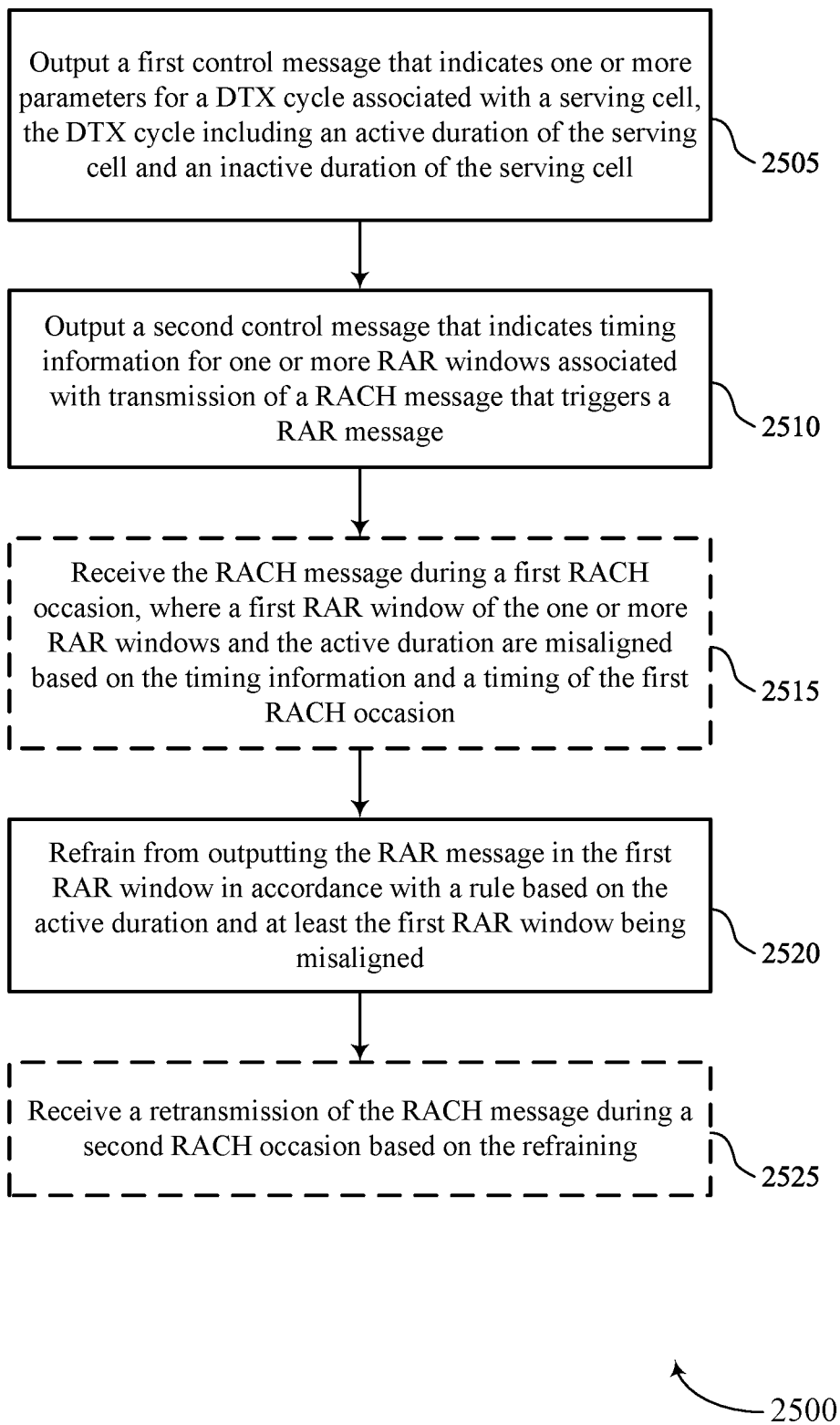

FIG. 25 illustrates a flowchart showing a method 2500 that supports a cell DTX-based RAR window configuration in accordance with one or more aspects of the present disclosure. The operations of the method 2500 may be implemented by a network entity or its components as described herein. For example, the operations of the method 2500 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2505, the method may include outputting a first control message that indicates one or more parameters for a DTX cycle associated with a serving cell, the DTX cycle including an active duration of the serving cell and an inactive duration of the serving cell. The operations of 2505 may be performed in accordance with examples as disclosed herein. In some examples, aspects of the operations of 2505 may be performed by a DTX component 1425 as described with reference to FIG. 14.

At 2510, the method may include outputting a second control message that indicates timing information for one or more RAR windows associated with transmission of a RACH message that triggers a RAR message. The operations of 2510 may be performed in accordance with examples as disclosed herein. In some examples, aspects of the operations of 2510 may be performed by a RAR window component 1430 as described with reference to FIG. 14.

At 2515, the method may include receiving the RACH message during a first RACH occasion, where a first RAR window of the one or more RAR windows and the active duration are misaligned based on the timing information and a timing of the first RACH occasion. The operations of 2515 may be performed in accordance with examples as disclosed herein. In some examples, aspects of the operations of 2515 may be performed by a RACH component 1440 as described with reference to FIG. 14.

At 2520, the method may include refraining from outputting the RAR message in a first RAR window of the one or more RAR windows in accordance with a rule based on the active duration and at least the first RAR window being misaligned. The operations of 2520 may be performed in accordance with examples as disclosed herein. In some examples, aspects of the operations of 2520 may be performed by a RAR message component 1435 as described with reference to FIG. 14.

At 2525, the method may include receiving a retransmission of the RACH message during a second RACH occasion based on the refraining. The operations of 2525 may be performed in accordance with examples as disclosed herein. In some examples, aspects of the operations of 2525 may be performed by a RACH component 1440 as described with reference to FIG. 14.

The following provides an overview of aspects of the present disclosure:

Aspect 1: A method for wireless communication at a UE, comprising: receiving a first control message that indicates one or more parameters for a DTX cycle associated with a serving cell, the DTX cycle comprising an active duration of the serving cell and an inactive duration of the serving cell; receiving a second control message that indicates timing information for a RAR window associated with transmission of a RACH message that triggers a RAR message; and receiving the RAR message during the RAR window in accordance with an alignment rule to align at least one boundary of the RAR window with at least one boundary of the active duration.

Aspect 2: The method of aspect 1, further comprising: transmitting the RACH message that triggers the RAR message, the at least one boundary of the RAR window being misaligned with the at least one boundary of the active duration based at least in part on a time of the transmission of the RACH message.

Aspect 3: The method of aspect 2, wherein the RAR window, the active duration, or a combination thereof, are adjusted in accordance with the alignment rule based at least in part on the misalignment.

Aspect 4: The method of any of aspects 1 through 3, further comprising: adjusting, in accordance with the alignment rule, the RAR window to align a start boundary of the RAR window with a start boundary of the active duration based at least in part on, prior to the adjustment, the start boundary of the RAR window being before the start boundary of the active duration.

Aspect 5: The method of any of aspects 1 through 3, further comprising: delaying, in accordance with the alignment rule, the RAR window to align a start boundary of the RAR window with a start boundary of the active duration based at least in part on, prior to the delay, the start boundary of the RAR window being before the start boundary of the active duration.

Aspect 6: The method of any of aspects 1 through 3, further comprising: applying, in accordance with the alignment rule, a time offset to the RAR window to align a start boundary of the RAR window with a start boundary of the active duration based at least in part on the start boundary of the RAR window being before the start boundary of the active duration prior to the application of the time offset.

Aspect 7: The method of any of aspects 1 through 3, further comprising: truncating, in accordance with the alignment rule, the RAR window to align a start boundary of the RAR window with a start boundary of the active duration based at least in part on the start boundary of the RAR window being before the start boundary of the active duration prior to the truncation.

Aspect 8: The method of any of aspects 1 through 7, further comprising: truncating, in accordance with the alignment rule, the RAR window to align an end boundary of the RAR window with an end boundary of the active duration based at least in part on the end boundary of the RAR window being after the end boundary of the active duration prior to the truncation.

Aspect 9: The method of any of aspects 1 through 7, wherein the active duration is extended to at least an end boundary of the RAR window in accordance with the alignment rule based at least in part on the end boundary of the RAR window being after an end boundary of the active duration prior to the extension of the active duration.

Aspect 10: The method of aspect 9, further comprising: adjusting, in accordance with the alignment rule, the end boundary of the RAR window to align with the end boundary of the active duration based at least in part on the extension of the active duration.

Aspect 11: The method of any of aspects 9 through 10, wherein a portion of the active duration that was extended is specific to communication of the RAR message and excludes communication of other messages.

Aspect 12: The method of any of aspects 9 through 10, further comprising: receiving a downlink message during a portion of the active duration that was extended.

Aspect 13: A method for wireless communication at a UE, comprising: receiving a first control message that indicates one or more parameters for a DTX cycle associated with a serving cell, the DTX cycle comprising an active duration of the serving cell and an inactive duration of the serving cell; receiving a second control message that indicates timing information for one or more RAR windows associated with transmission of a RACH message that triggers a RAR message; and refraining from receiving the RAR message in a first RAR window of the one or more RAR windows in accordance with a rule based at least in part on the active duration and at least the first RAR window being misaligned.

Aspect 14: The method of aspect 13, further comprising: transmitting the RACH message during a first RO, the first RAR window and the active duration being misaligned based at least in part on the timing information and a timing of the first RO; and retransmitting the RACH message during a second RO based at least in part on the refraining.

Aspect 15: The method of any of aspects 13 through 14, further comprising: receiving the RAR message in a second RAR window of the one or more RAR windows in accordance with the rule based at least in part on the active duration and the second RAR window being aligned.

Aspect 16: The method of aspect 13, further comprising: refraining from transmitting the RACH message during a RO based at least in part on the active duration and the first RAR window corresponding to the RO being misaligned.

Aspect 17: The method of aspect 16, further comprising: transmitting the RACH message during a second RO based at least in part on the active duration and a second RAR window corresponding to the second RO being aligned; and receiving the RAR message during the second RAR window.

Aspect 18: The method of any of aspects 13 through 17, wherein refraining from receiving the RAR message based at least in part on the active duration and at least the first RAR window being misaligned comprises: refraining from receiving the RAR message based at least in part on a start boundary of the first RAR window being before a start boundary of the active duration.

Aspect 19: A method for wireless communication at a network entity, comprising: outputting a first control message that indicates one or more parameters for a DTX cycle associated with a serving cell, the DTX cycle comprising an active duration of the serving cell and an inactive duration of the serving cell; outputting a second control message that indicates timing information for a RAR window associated with reception of a RACH message that triggers a RAR message; and outputting the RAR message during the RAR window in accordance with an alignment rule to align at least one boundary of the RAR window with at least one boundary of the active duration.

Aspect 20: The method of aspect 19, further comprising: receiving the RACH message that triggers the RAR message, the at least one boundary of the RAR window being misaligned with the at least one boundary of the active duration based at least in part on a time of the transmission of the RACH message.

Aspect 21: The method of aspect 20, wherein the RAR window, the active duration, or a combination thereof, are adjusted in accordance with the alignment rule based at least in part on the misalignment.

Aspect 22: The method of any of aspects 19 through 21, further comprising: extending the active duration to at least an end boundary of the RAR window in accordance with the alignment rule based at least in part on the end boundary of the RAR window being after an end boundary of the active duration prior to the extension of the active duration.

Aspect 23: The method of aspect 22, further comprising: outputting a downlink message during a portion of the active duration that was extended.

Aspect 24: The method of aspect 22, wherein a portion of the active duration that was extended is specific to communication of the RAR message and excludes communication of other messages.

Aspect 25: The method of any of aspects 22 through 24, wherein the end boundary of the RAR window response window is adjusted to align with the end boundary of the active duration based at least in part on the extension of the active duration.

Aspect 26: The method of any of aspects 19 through 21, wherein the RAR window is truncated to align an end boundary of the RAR window with an end boundary of the active duration based at least in part on the end boundary of the RAR window being after the end boundary of the active duration prior to the truncation.

Aspect 27: The method of any of aspects 19 through 26, wherein a time offset is applied to the RAR window to align a start boundary of the RAR window with a start boundary of the active duration based at least in part on the start boundary of the RAR window being before the start boundary of the active duration prior to the application of the time offset.

Aspect 28: The method of any of aspects 19 through 27, wherein the RAR window is truncated to align a start boundary of the RAR window with a start boundary of the active duration based at least in part on the start boundary of the RAR window being before the start boundary of the active duration prior to the truncation.

Aspect 29: A method for wireless communication at a network entity, comprising: outputting a first control message that indicates one or more parameters for a DTX cycle associated with a serving cell, the DTX cycle comprising an active duration of the serving cell and an inactive duration of the serving cell; outputting a second control message that indicates timing information for one or more RAR windows associated with transmission of a RACH message that triggers a RAR message; and refraining from outputting the RAR message in a first RAR window of the one or more RAR windows in accordance with a rule based at least in part on the active duration and at least the first RAR window being misaligned.

Aspect 30: The method of aspect 29, further comprising: receiving the RACH message during a first RO, the first RAR window and the active duration being misaligned based at least in part on the timing information and a timing of the first RO; and receiving a retransmission of the RACH message during a second RO based at least in part on the refraining.

Aspect 31: The method of any of aspects 29 through 30, further comprising: outputting the RAR message in a second RAR window of the one or more RAR windows in accordance with the rule based at least in part on the active duration and the second RAR window being aligned.

Aspect 32: The method of aspect 29, wherein refraining from outputting the RAR message based at least in part on the active duration and at least the first RAR window being misaligned comprises: refraining from outputting the RAR message based at least in part on a start boundary of the first RAR window being before a start boundary of the active duration.

Aspect 33: An apparatus for wireless communication at a UE, comprising a processor and memory coupled with the processor, the processor configured to perform a method of any of aspects 1 through 12.

Aspect 34: An apparatus for wireless communication at a UE, comprising at least one means for performing a method of any of aspects 1 through 12.

Aspect 35: A non-transitory computer-readable medium storing code for wireless communication at a UE, the code comprising instructions executable by a processor to perform a method of any of aspects 1 through 12.

Aspect 36: An apparatus for wireless communication at a UE, comprising a processor and memory coupled with the processor, the processor configured to perform a method of any of aspects 13 through 18.

Aspect 37: An apparatus for wireless communication at a UE, comprising at least one means for performing a method of any of aspects 13 through 18.

Aspect 38: A non-transitory computer-readable medium storing code for wireless communication at a UE, the code comprising instructions executable by a processor to perform a method of any of aspects 13 through 18.

Aspect 39: An apparatus for wireless communication at a network entity, comprising a processor and memory coupled with the processor, the processor configured to perform a method of any of aspects 19 through 28.

Aspect 40: An apparatus for wireless communication at a network entity, comprising at least one means for performing a method of any of aspects 19 through 28.

Aspect 41: A non-transitory computer-readable medium storing code for wireless communication at a network entity, the code comprising instructions executable by a processor to perform a method of any of aspects 19 through 28.

Aspect 42: An apparatus for wireless communication at a network entity, comprising a processor and memory coupled with the processor, the processor configured to perform a method of any of aspects 29 through 32.

Aspect 43: An apparatus for wireless communication at a network entity, comprising at least one means for performing a method of any of aspects 29 through 32.

Aspect 44: A non-transitory computer-readable medium storing code for wireless communication at a network entity, the code comprising instructions executable by a processor to perform a method of any of aspects 29 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive a first control message that indicates one or more parameters for a discontinuous transmission cycle associated with a serving cell, the discontinuous transmission cycle comprising an active duration of the serving cell and an inactive duration of the serving cell;
      receive a second control message that indicates timing information for a random access response window associated with transmission of a random access channel message that triggers a random access response message; and
      receive the random access response message during the random access response window in accordance with an alignment rule to align at least one boundary of the random access response window with at least one boundary of the active duration.

2. The apparatus of claim 1, wherein the one or more processors are configured to cause the UE to:
   transmit the random access channel message that triggers the random access response message, wherein the at least one boundary of the random access response window is misaligned with the at least one boundary of the active duration based at least in part on a time of the transmission of the random access channel message,
   wherein the random access response window, the active duration, or a combination thereof, are adjusted in accordance with the alignment rule based at least in part on the misalignment.

3. The apparatus of claim 1, wherein the one or more processors are configured to cause the UE to:
   adjust, in accordance with the alignment rule, the random access response window to align a start boundary of the random access response window with a start boundary of the active duration based at least in part on, prior to the adjustment, the start boundary of the random access response window being before the start boundary of the active duration.

4. The apparatus of claim 1, wherein the one or more processors are configured to cause the UE to:
   delay, in accordance with the alignment rule, the random access response window to align a start boundary of the random access response window with a start boundary of the active duration based at least in part on, prior to the delay, the start boundary of the random access response window being before the start boundary of the active duration.

5. The apparatus of claim 1, wherein the one or more processors are configured to cause the UE to:
   apply, in accordance with the alignment rule, a time offset to the random access response window to align a start boundary of the random access response window with a start boundary of the active duration based at least in part on the start boundary of the random access response window being before the start boundary of the active duration prior to application of the time offset.

6. The apparatus of claim 1, wherein the one or more processors are configured to cause the UE to:
truncate, in accordance with the alignment rule, the random access response window to align a start boundary of the random access response window with a start boundary of the active duration based at least in part on the start boundary of the random access response window being before the start boundary of the active duration prior to the truncation.

7. The apparatus of claim 1, wherein the one or more processors are configured to cause the UE to:
truncate, in accordance with the alignment rule, the random access response window to align an end boundary of the random access response window with an end boundary of the active duration based at least in part on the end boundary of the random access response window being after the end boundary of the active duration prior to the truncation.

8. The apparatus of claim 1, wherein the active duration is extended to at least an end boundary of the random access response window in accordance with the alignment rule based at least in part on the end boundary of the random access response window being after an end boundary of the active duration prior to extension of the active duration.

9. The apparatus of claim 8, wherein the one or more processors are configured to cause the UE to:
adjust, in accordance with the alignment rule, the end boundary of the random access response window to align with the end boundary of the active duration based at least in part on the extension of the active duration.

10. The apparatus of claim 8, wherein a portion of the active duration that was extended is specific to communication of the random access response message and excludes communication of other messages.

11. The apparatus of claim 8, further comprising:
one or more antennas, wherein the one or more processors are configured to cause the UE to:
receive, via the one or more antennas, a downlink message during a portion of the active duration that was extended.

12. An apparatus for wireless communication at a user equipment (UE), comprising:
one or more memories; and
one or more processors coupled with the one or more memories and configured to cause the UE to:
receive a first control message that indicates one or more parameters for a discontinuous transmission cycle associated with a serving cell, the discontinuous transmission cycle comprising an active duration of the serving cell and an inactive duration of the serving cell;
receive a second control message that indicates timing information for one or more random access response windows associated with transmission of a random access channel message that triggers a random access response message; and
refrain from receiving the random access response message in a first random access response window of the one or more random access response windows in accordance with a rule based at least in part on the active duration and at least the first random access response window being misaligned.

13. The apparatus of claim 12, wherein the one or more processors are configured to cause the UE to:
transmit the random access channel message during a first random access channel occasion, wherein the first random access response window and the active duration is misaligned based at least in part on the timing information and a timing of the first random access channel occasion; and
retransmit the random access channel message during a second random access channel occasion based at least in part on the refraining.

14. The apparatus of claim 12, further comprising:
one or more antennas, wherein the one or more processors are configured to cause the UE to:
receive, via the one or more antennas, the random access response message in a second random access response window of the one or more random access response windows in accordance with the rule based at least in part on the active duration and the second random access response window being aligned.

15. The apparatus of claim 12, wherein the one or more processors are configured to cause the UE to:
refrain from transmitting the random access channel message during a random access channel occasion based at least in part on the active duration and the first random access response window corresponding to the random access channel occasion being misaligned.

16. The apparatus of claim 15, wherein the one or more processors are configured to cause the UE to:
transmit the random access channel message during a second random access channel occasion based at least in part on the active duration and a second random access response window corresponding to the second random access channel occasion being aligned; and
receive the random access response message during the second random access response window.

17. The apparatus of claim 15, wherein, to refrain from receiving the random access response message based at least in part on the active duration and at least the first random access response window being misaligned, the one or more processors are configured to cause the UE to:
refrain from receiving the random access response message based at least in part on a start boundary of the first random access response window being before a start boundary of the active duration.

18. An apparatus for wireless communication at a network entity, comprising:
one or more memories; and
one or more processors coupled with the one or more memories and configured to cause the network entity to:
output a first control message that indicates one or more parameters for a discontinuous transmission cycle associated with a serving cell, the discontinuous transmission cycle comprising an active duration of the serving cell and an inactive duration of the serving cell;
output a second control message that indicates timing information for a random access response window associated with reception of a random access channel message that triggers a random access response message; and
output the random access response message during the random access response window in accordance with an alignment rule to align at least one boundary of the random access response window with at least one boundary of the active duration.

19. The apparatus of claim 18, wherein the one or more processors are configured to cause the network entity to:
receive the random access channel message that triggers the random access response message, wherein the at least one boundary of the random access response window is misaligned with the at least one boundary of the active duration based at least in part on a time of the transmission of the random access channel message, wherein the random access response window, the active duration, or a combination thereof, are adjusted in accordance with the alignment rule based at least in part on the misalignment.

20. The apparatus of claim 18, wherein the one or more processors are configured to cause the network entity to:
extend the active duration to at least an end boundary of the random access response window in accordance with the alignment rule based at least in part on the end boundary of the random access response window being after an end boundary of the active duration prior to extension of the active duration.

21. The apparatus of claim 20, further comprising:
one or more antennas, wherein the one or more processors are configured to cause the network entity to:
output, via the one or more antennas, a downlink message during a portion of the active duration that was extended.

22. The apparatus of claim 20, wherein a portion of the active duration that was extended is specific to communication of the random access response message and excludes communication of other messages.

23. The apparatus of claim 20, wherein the end boundary of the random access response window is adjusted to align with the end boundary of the active duration based at least in part on the extension of the active duration.

24. The apparatus of claim 18, wherein the random access response window is truncated to align an end boundary of the random access response window with an end boundary of the active duration based at least in part on the end boundary of the random access response window being after the end boundary of the active duration prior to the truncation.

25. The apparatus of claim 18, wherein a time offset is applied to the random access response window to align a start boundary of the random access response window with a start boundary of the active duration based at least in part on the start boundary of the random access response window being before the start boundary of the active duration prior to application of the time offset.

26. The apparatus of claim 18, wherein the random access response window is truncated to align a start boundary of the random access response window with a start boundary of the active duration based at least in part on the start boundary of the random access response window being before the start boundary of the active duration prior to truncation.

27. An apparatus for wireless communication at a network entity, comprising:
one or more memories; and
one or more processors coupled with the one or more memories and configured to cause the network entity to:
output a first control message that indicates one or more parameters for a discontinuous transmission cycle associated with a serving cell, the discontinuous transmission cycle comprising an active duration of the serving cell and an inactive duration of the serving cell;
output a second control message that indicates timing information for one or more random access response windows associated with transmission of a random access channel message that triggers a random access response message; and
refrain from outputting the random access response message in a first random access response window of the one or more random access response windows in accordance with a rule based at least in part on the active duration and at least the first random access response window being misaligned.

28. The apparatus of claim 27, wherein the one or more processors are configured to cause the network entity to:
receive the random access channel message during a first random access channel occasion, wherein the first random access response window and the active duration is misaligned based at least in part on the timing information and a timing of the first random access channel occasion; and
receive a retransmission of the random access channel message during a second random access channel occasion based at least in part on the refraining.

29. The apparatus of claim 27, further comprising:
one or more antennas, wherein the one or more processors are configured to cause the network entity to:
output, via the one or more antennas, the random access response message in a second random access response window of the one or more random access response windows in accordance with the rule based at least in part on the active duration and the second random access response window being aligned.

30. The apparatus of claim 27, wherein, to refrain from outputting the random access response message based at least in part on the active duration and at least the first random access response window being misaligned, the one or more processors are configured to cause the network entity to:
refrain from outputting the random access response message based at least in part on a start boundary of the first random access response window being before a start boundary of the active duration.

31. A method for wireless communication at a user equipment (UE), comprising:
receiving a first control message that indicates one or more parameters for a discontinuous transmission cycle associated with a serving cell, the discontinuous transmission cycle comprising an active duration of the serving cell and an inactive duration of the serving cell;
receiving a second control message that indicates timing information for a random access response window associated with transmission of a random access channel message that triggers a random access response message; and
receiving the random access response message during the random access response window in accordance with an alignment rule to align at least one boundary of the random access response window with at least one boundary of the active duration.

32. The method of claim 31, further comprising:
transmitting the random access channel message that triggers the random access response message, wherein the at least one boundary of the random access response window is misaligned with the at least one boundary of the active duration based at least in part on a time of the transmission of the random access channel message, wherein the random access response window, the active duration, or a combination thereof, are adjusted in accordance with the alignment rule based at least in part on the misalignment.

33. The method of claim 31, further comprising:
adjusting, in accordance with the alignment rule, the random access response window to align a start boundary of the random access response window with a start boundary of the active duration based at least in part on, prior to the adjustment, the start boundary of the random access response window being before the start boundary of the active duration.

34. The method of claim 31, further comprising:
delaying, in accordance with the alignment rule, the random access response window to align a start boundary of the random access response window with a start boundary of the active duration based at least in part on, prior to the delay, the start boundary of the random access response window being before the start boundary of the active duration.

35. The method of claim 31, further comprising:
applying, in accordance with the alignment rule, a time offset to the random access response window to align a start boundary of the random access response window with a start boundary of the active duration based at least in part on the start boundary of the random access response window being before the start boundary of the active duration prior to application of the time offset.

36. The method of claim 31, further comprising:
truncating, in accordance with the alignment rule, the random access response window to align a start boundary of the random access response window with a start boundary of the active duration based at least in part on the start boundary of the random access response window being before the start boundary of the active duration prior to the truncation.

37. The method of claim 31, further comprising:
truncating, in accordance with the alignment rule, the random access response window to align an end boundary of the random access response window with an end boundary of the active duration based at least in part on the end boundary of the random access response window being after the end boundary of the active duration prior to the truncation.

38. The method of claim 31, wherein the active duration is extended to at least an end boundary of the random access response window in accordance with the alignment rule based at least in part on the end boundary of the random access response window being after an end boundary of the active duration prior to extension of the active duration.

39. A method for wireless communication at a user equipment (UE), comprising:
receiving a first control message that indicates one or more parameters for a discontinuous transmission cycle associated with a serving cell, the discontinuous transmission cycle comprising an active duration of the serving cell and an inactive duration of the serving cell;
receiving a second control message that indicates timing information for one or more random access response windows associated with transmission of a random access channel message that triggers a random access response message; and
refraining from receiving the random access response message in a first random access response window of the one or more random access response windows in accordance with a rule based at least in part on the active duration and at least the first random access response window being misaligned.

40. The method of claim 39, further comprising:
transmitting the random access channel message during a first random access channel occasion, wherein the first random access response window and the active duration is misaligned based at least in part on the timing information and a timing of the first random access channel occasion; and
retransmitting the random access channel message during a second random access channel occasion based at least in part on the refraining.

41. The method of claim 39, further comprising:
receiving, via one or more antennas, the random access response message in a second random access response window of the one or more random access response windows in accordance with the rule based at least in part on the active duration and the second random access response window being aligned.

42. The method of claim 39, further comprising
refraining from transmitting the random access channel message during a random access channel occasion based at least in part on the active duration and the first random access response window corresponding to the random access channel occasion being misaligned.

43. A method for wireless communication at a network entity, comprising:
outputting a first control message that indicates one or more parameters for a discontinuous transmission cycle associated with a serving cell, the discontinuous transmission cycle comprising an active duration of the serving cell and an inactive duration of the serving cell;
outputting a second control message that indicates timing information for a random access response window associated with reception of a random access channel message that triggers a random access response message; and
outputting the random access response message during the random access response window in accordance with an alignment rule to align at least one boundary of the random access response window with at least one boundary of the active duration.

44. The method of claim 43, further comprising:
receiving the random access channel message that triggers the random access response message, wherein the at least one boundary of the random access response window is misaligned with the at least one boundary of the active duration based at least in part on a time of the transmission of the random access channel message,
wherein the random access response window, the active duration, or a combination thereof, are adjusted in accordance with the alignment rule based at least in part on the misalignment.

45. The method of claim 43, further comprising:
extending the active duration to at least an end boundary of the random access response window in accordance with the alignment rule based at least in part on the end boundary of the random access response window being after an end boundary of the active duration prior to extension of the active duration.

46. A method for wireless communication at a network entity, comprising:
outputting a first control message that indicates one or more parameters for a discontinuous transmission cycle associated with a serving cell, the discontinuous transmission cycle comprising an active duration of the serving cell and an inactive duration of the serving cell;

outputting a second control message that indicates timing information for one or more random access response windows associated with transmission of a random access channel message that triggers a random access response message; and refraining from outputting the random access response message in a first random access response window of the one or more random access response windows in accordance with a rule based at least in part on the active duration and at least the first random access response window being misaligned.

47. The method of claim 46, further comprising:

receiving the random access channel message during a first random access channel occasion, wherein the first random access response window and the active duration is misaligned based at least in part on the timing information and a timing of the first random access channel occasion; and receiving a retransmission of the random access channel message during a second random access channel occasion based at least in part on the refraining.

48. The method of claim 46, further comprising:

outputting, via one or more antennas, the random access response message in a second random access response window of the one or more random access response windows in accordance with the rule based at least in part on the active duration and the second random access response window being aligned.

49. The method of claim 46, wherein refraining from outputting the random access response message based at least in part on the active duration and at least the first random access response window being misaligned further comprises:

refraining from outputting the random access response message based at least in part on a start boundary of the first random access response window being before a start boundary of the active duration.

* * * * *